FIRST SELECTION CONTROL COUNTER

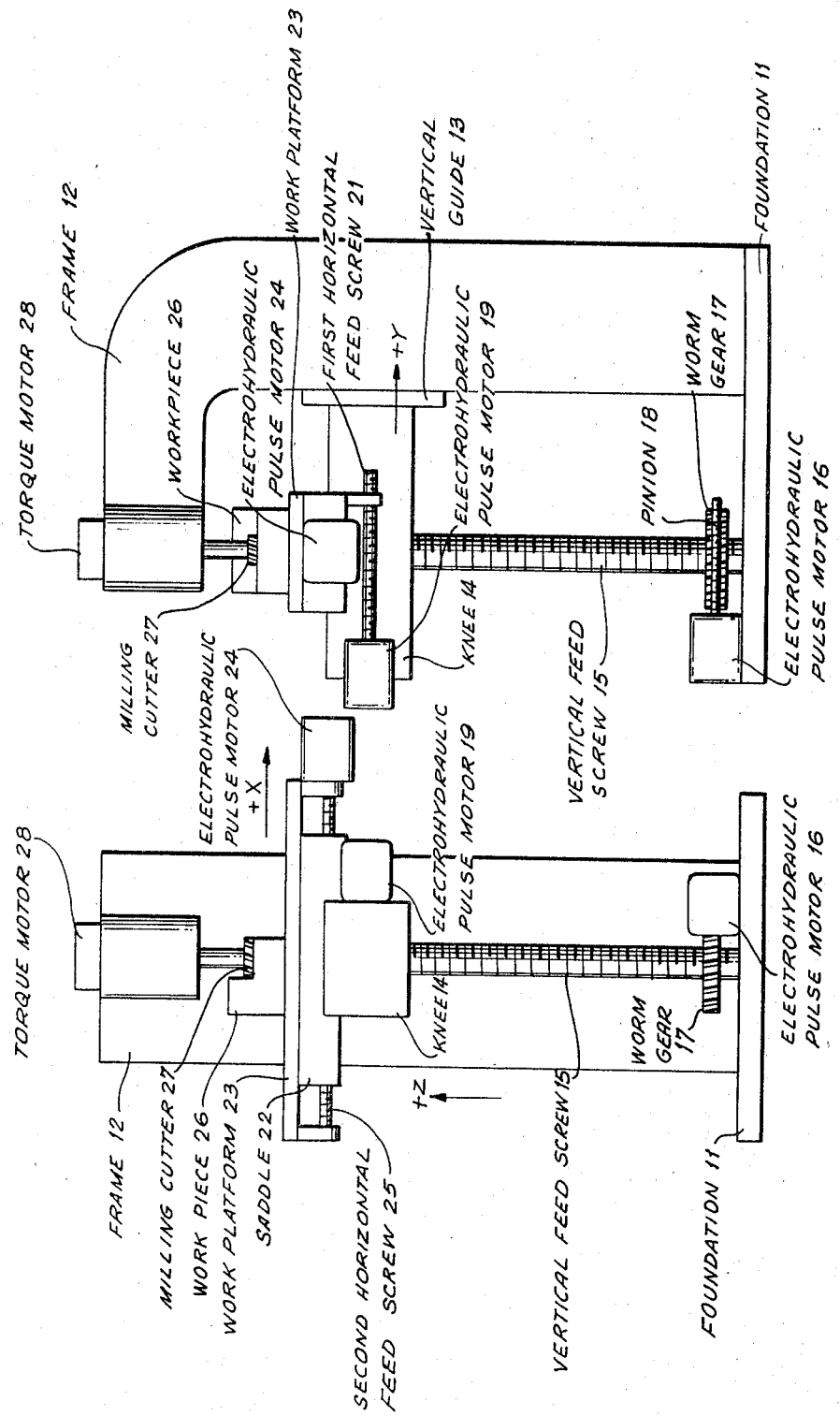

FIG. 13

| I8 I7 I6 I5 I4 I3 I2 I1 | CODE | | I8 I7 I6 I5 I4 I3 I2 I1 | CODE | |
|---|---|---|---|---|---|
| | | | ○   ○ | | H1 |
| ○ ○ | | C1 | ○ ○   ○ ○ | H | H2 |
| ○   ○ | | C2 | ○ ○   ○ ○ | | H3 |
| ○ ○ | | C3 | ○   ○ ○ ○ | | H4 |
| ○ ○ ○ ○ | | C4 | ○   ○ | | |
| ○ ○ | C | C5 | ○ ○   ○     ○ | J | |
| ○   ○ ○   ○ | | C6 | ○ ○   ○ ○ | | |
| ○   ○ ○ ○ | | C7 | ○   ○   ○ ○ | | |
| ○ ○ ○ ○ | | C8 | ○ ○   ○ ○ | | LA |
| ○ ○ | | D0 | ○   ○ ○   ○ | | LB |
| ○     ○ | | D1 | ○   ○ ○ ○ | L | LC |
| ○   ○ | | D2 | ○ ○   ○ ○ ○ ○ | | LD |
| ○ ○   ○ ○ | | D3 | ○   ○ | | KAI |
| ○   ○ | D | D4 | ○ ○ ○     ○ | | KAII |
| ○ ○   ○   ○ | | D5 | ○ ○ ○   ○ | | KAIII |
| ○ ○   ○ ○ | | D6 | ○   ○     ○ ○ | K | KAIV |
| ○   ○ ○ ○ | | D7 | ○ ○ ○   ○ | | KBI |
| ○ ○ | | D8 | ○   ○   ○   ○ | | KBII |
| ○ ○ ○   ○ | | D9 | ○   ○   ○ ○ | | KBIII |
| | | | ○ ○ ○   ○ ○ ○ | | KBIV |
| ○ ○   ○ ○ | F | | ○ ○ ○ ○ | | KCI |
| ○         ○ | | GL | ○     ○ ○     ○ | | KCII |
| ○ ○     ○ ○ | G | GR | ○     ○ ○   ○ | | KCIII |
| | | | ○ ○ ○ ○   ○ ○ | | KCIV |
| | | | ○     ○ ○ ○ | M | |

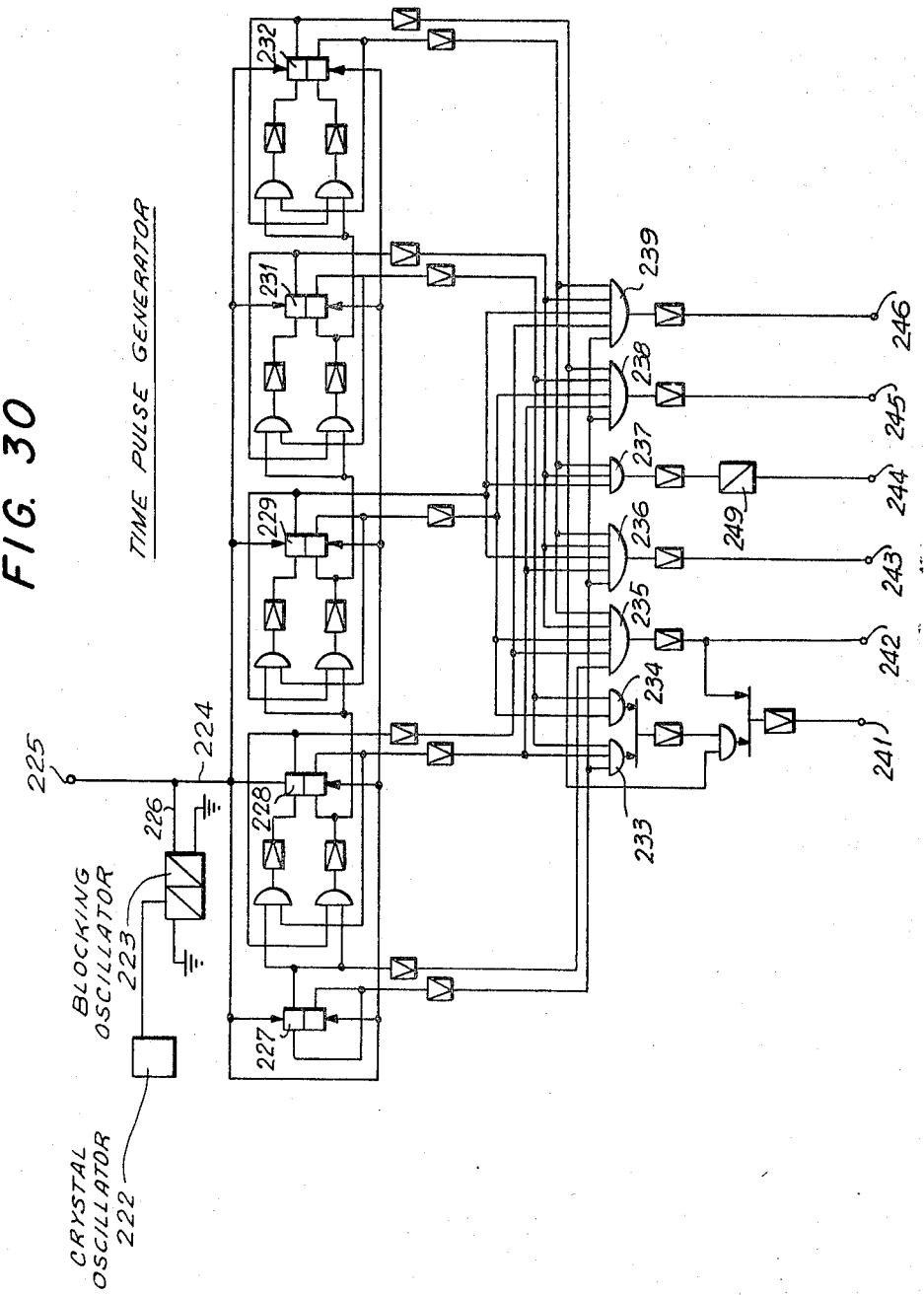

FIG. 32

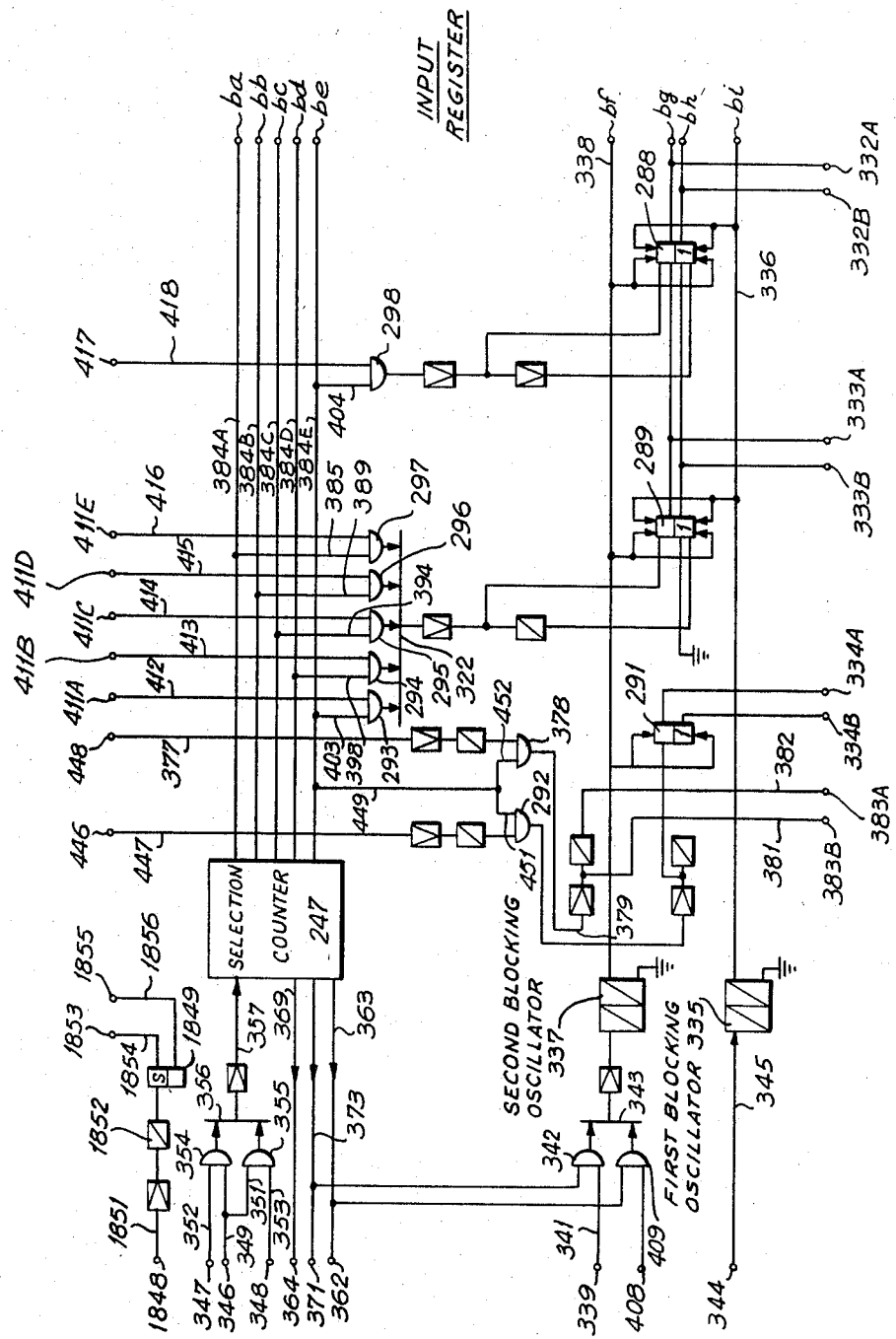

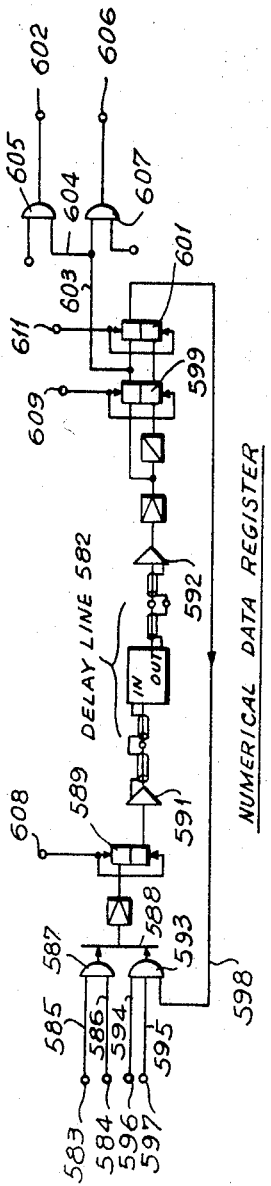
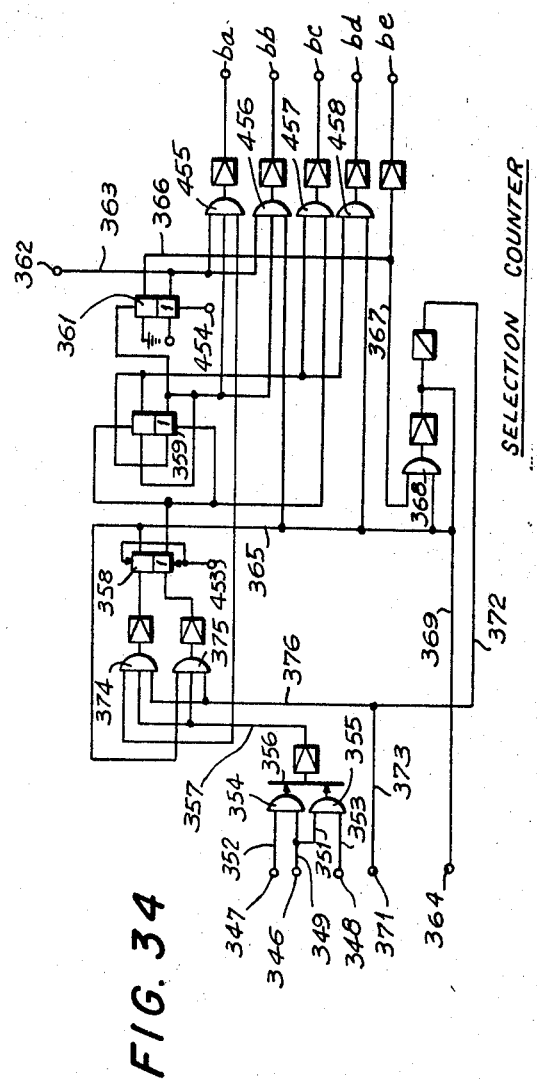
FIG. 36
FIG. 34

DECODER

G CODE REGISTER

H CODE REGISTER

FEED PULSE GENERATOR

1 BIT DELAY CIRCUIT

2 BIT DELAY CIRCUIT

J CODE REGISTER

L CODE REGISTER

COMPLEMENTARY CIRCUIT

FULL ADDER

PARITY BIT CIRCUIT

SECOND GATE CIRCUIT

PARITY CHECKING CIRCUIT

GATE CONTROL SIGNAL GENERATOR

FIRST GATE CONTROL CIRCUIT

FIRST GATE CIRCUIT

United States Patent Office 3,430,121
Patented Feb. 25, 1969

3,430,121
DIGITAL CONTROL SYSTEM FOR MACHINE TOOLS INCLUDING TOOL RADIUS OFFSET AND STEPPING MOTOR DRIVE
Norito Yoshitake, Yoshihiro Hashimoto, and Kengo Kobayashi, Kawasaki-shi, Japan, assignors to Fujitsu Limited, Kawasaki, Japan, a corporation of Japan
Continuation-in-part of application Ser. No. 179,162, Mar. 12, 1962. This application June 15, 1966, Ser. No. 557,741
Claims priority, application Japan, Mar. 13, 1961, 36/8,869
U.S. Cl. 318—162    3 Claims
Int. Cl. H02p 7/18, 7/38, 7/52

ABSTRACT OF THE DISCLOSURE

Numerical data of a determined cutting pattern is supplied to one input of a pulse distributor and control circuit of a digital control system for machine tools and cutter offset magnitude data and cutter offset direction data of a cutter for a workpiece is supplied to another input of the pulse distributor and control circuit. The pulse distributor and control circuit includes a computer for making predetermined calculations with data supplied thereto, which calculations include a required cutting pattern based upon the determined cutting pattern but corrected for the magnitude and direction of offset of the cutter relative to the axis of rotation of such cutter.

---

The present application is a continuation-in-part application of copending patent application Ser. No. 179,162, filed Mar. 12, 1962.

The present invention relates to a digital control system for machine tools or other instruments. More particularly, the present invention relates to a digital control system for moving a movable platform, tool holder, workpiece holder or other machine-controlled object in response to a digital input and in a three-dimensional system. A milling machine or a lathe, for example, may be controlled by the digital control system of the present invention. A platform supporting the workpiece is moved under three-dimensional control with relation to cutting, abrading or the like tool. The digital control system for machine tools or the like of the present invention corrects for the offset of radius of the tool which provides cutting, abrading or the like operation. The digital control system of the present invention is an improvement over the pulse distribution system of copending patent application Ser. No. 114,267, filed June 1, 1961, by Tohru Motooka et al.

Tht principal object of the present invention is to provide a new and improved digital control system for machine tools or the like.

An object of the present invention is to provide a digital control system for a machine tool or the like which corrects for the offset or radius of the tool when the tool has an offset cutting, abrading or the like edge.

In accordance with the present invention, a digital control system for machine tools and the like includes a workpiece, a work platform supporting the workpiece, a cutter in operative proximity with the workpiece rotating about an axis of rotation, and motors coupled to the work platform for moving the work platform relative to the cutter under control by the digital control system for cutting the workpiece in a predetermined pattern. The digital control system comprises a pulse distributor and control unit having inputs and outputs connected to and supplying distributed pulses to the motors for providing and distributing pulses in accordance with supplied data for actuating the motors to move the work platform along a determined cutting pattern in a determined coordinate system. The pulse distributor and control unit comprises a computer for making predetermined calculations with data supplied thereto, the predetermined calculations including a revised cutting pattern based upon the determined cutting pattern but corrected for the magnitude and direction of offset of the cutter relative to the axis of rotation of said cutter. A first input connected to an input of the pulse distributor and control unit supplies numerical data of a determined cutting pattern to the pulse distributor and control unit. A second input connected to another input of the pulse distributor and control unit supplies cutter offset magnitude data and cutter offset direction data of the cutter to the pulse distributor and control unit.

In order that the present invention may be readily carried into effect, it will now be described with reference to the accompanying drawings, wherein:

FIG. 4 is a front elevation of a vertical milling machine which may utilize the digital control system of the present invention;

FIG. 5 is a side elevation of the milling machine of FIG. 4;

FIG. 13 is a tabulation of the various codes utilized in the digital control system of the present invention;

Figure 27:
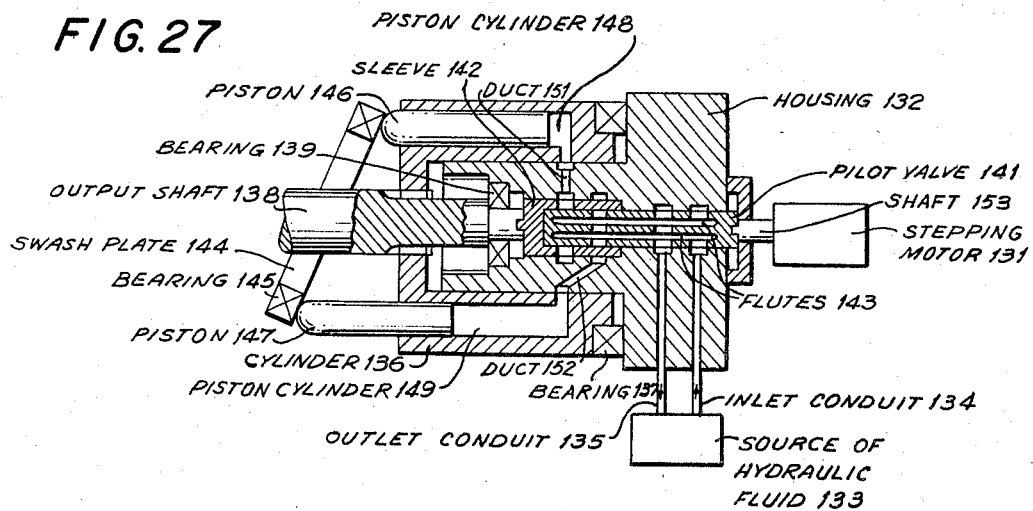
Figure 28:
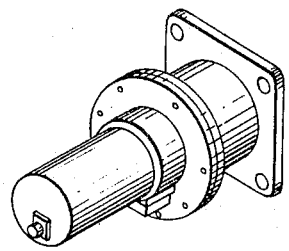
Figure 50:
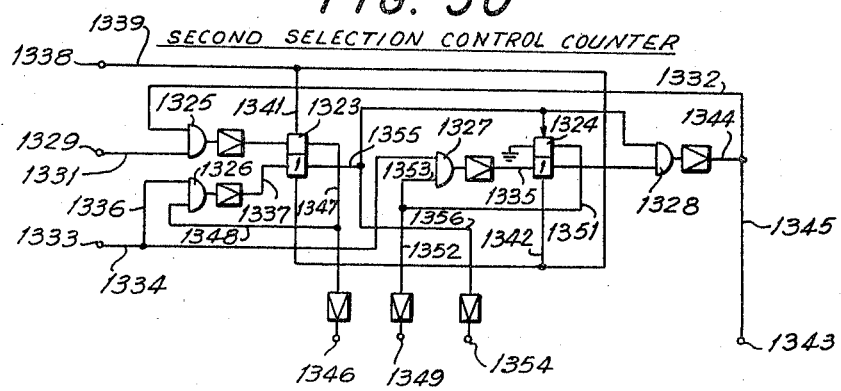
Figure 51:
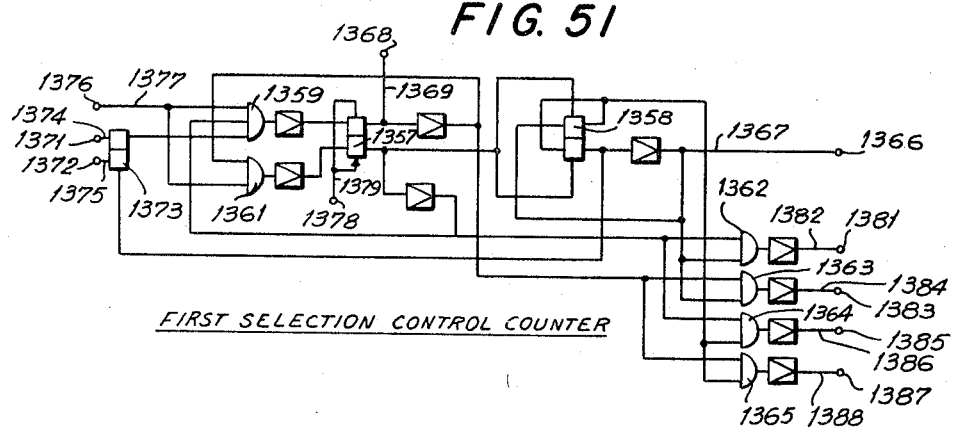
Figure 12:
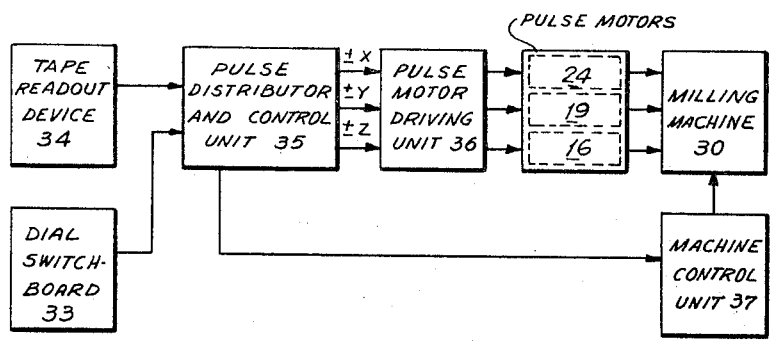
FIG. 12 is a block diagram of an embodiment of the digital control system of the present invention as utilized with a milling machine.
Figure 25:
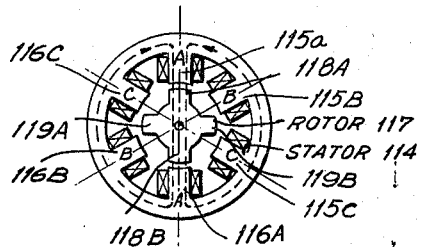
Figure 26:
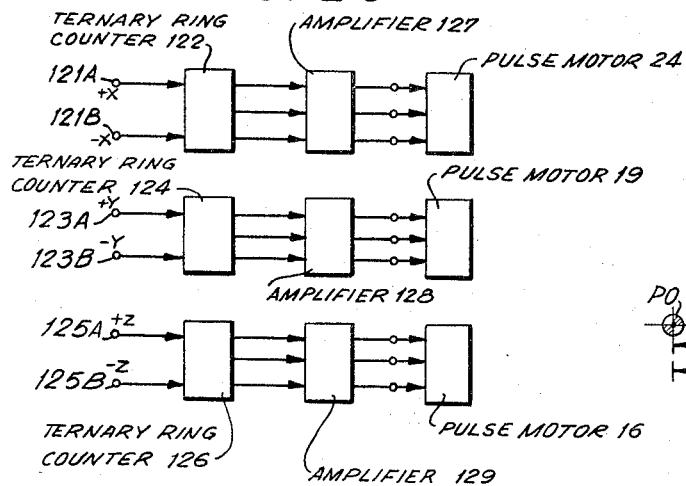
Figure 59:
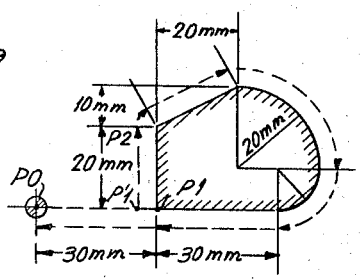
Figure 29:
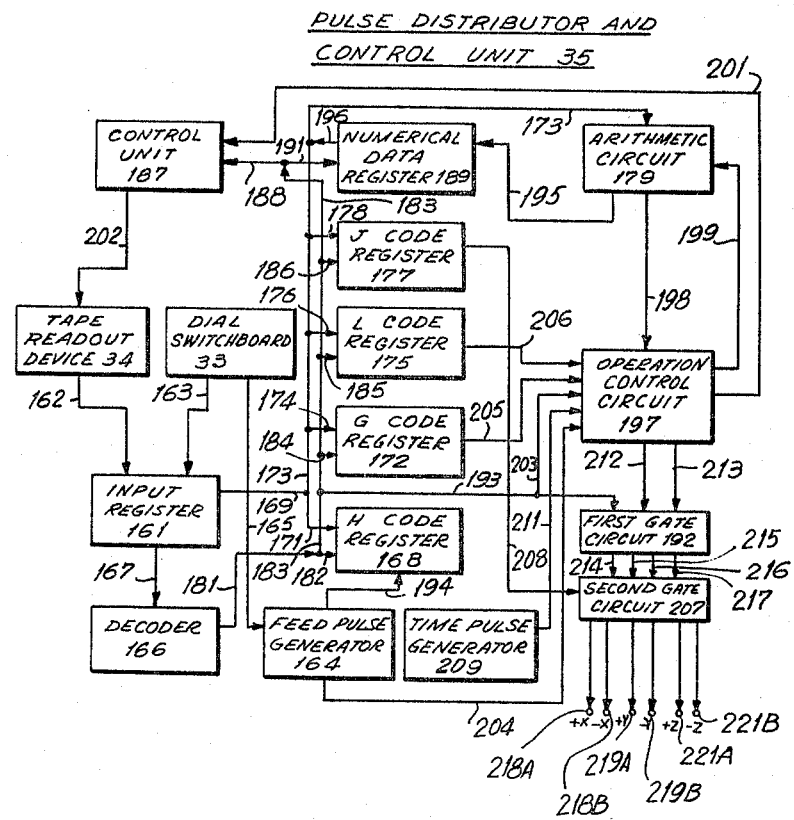
Figure 31:
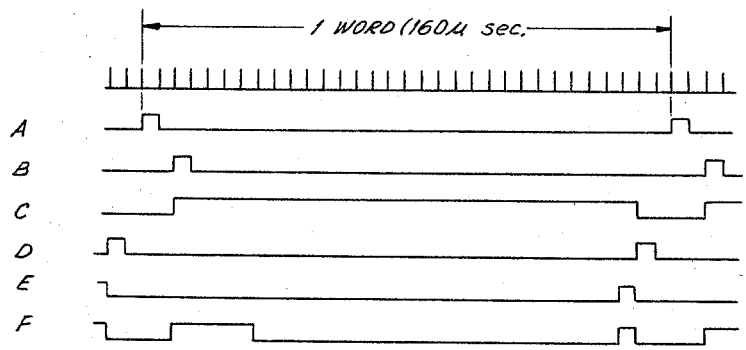
Figure 33B:
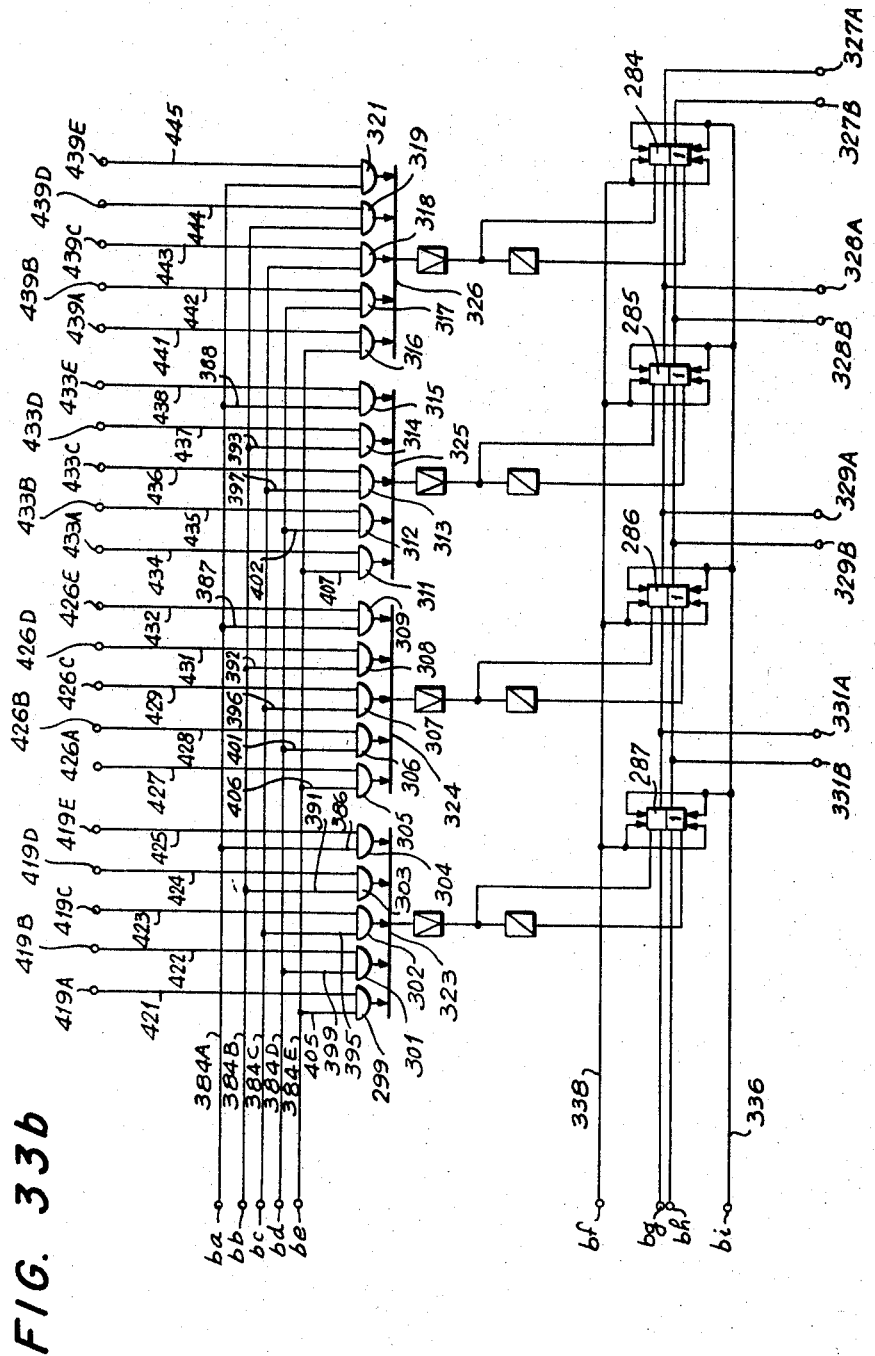
Figure 35A:
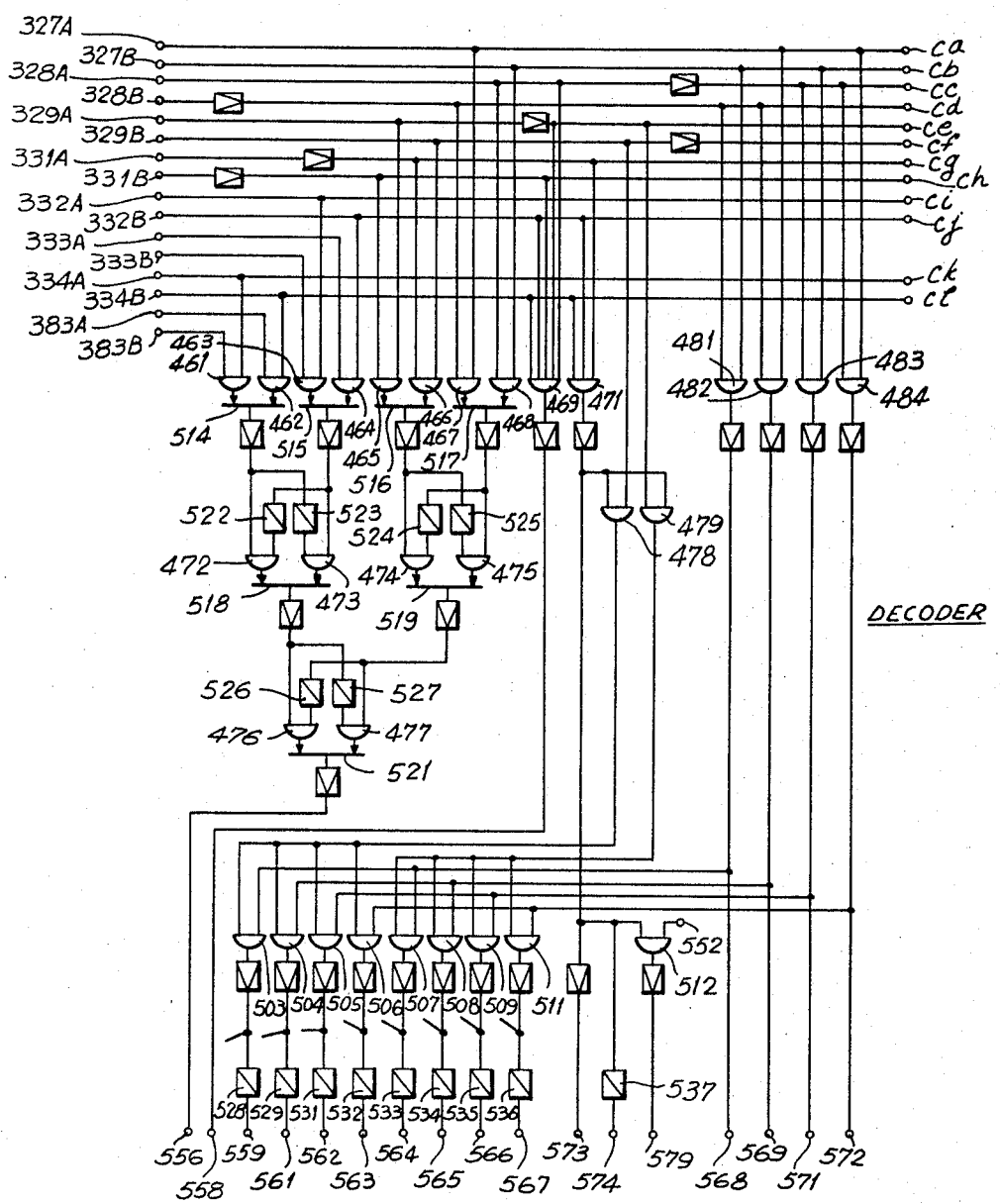
Figure 35B:
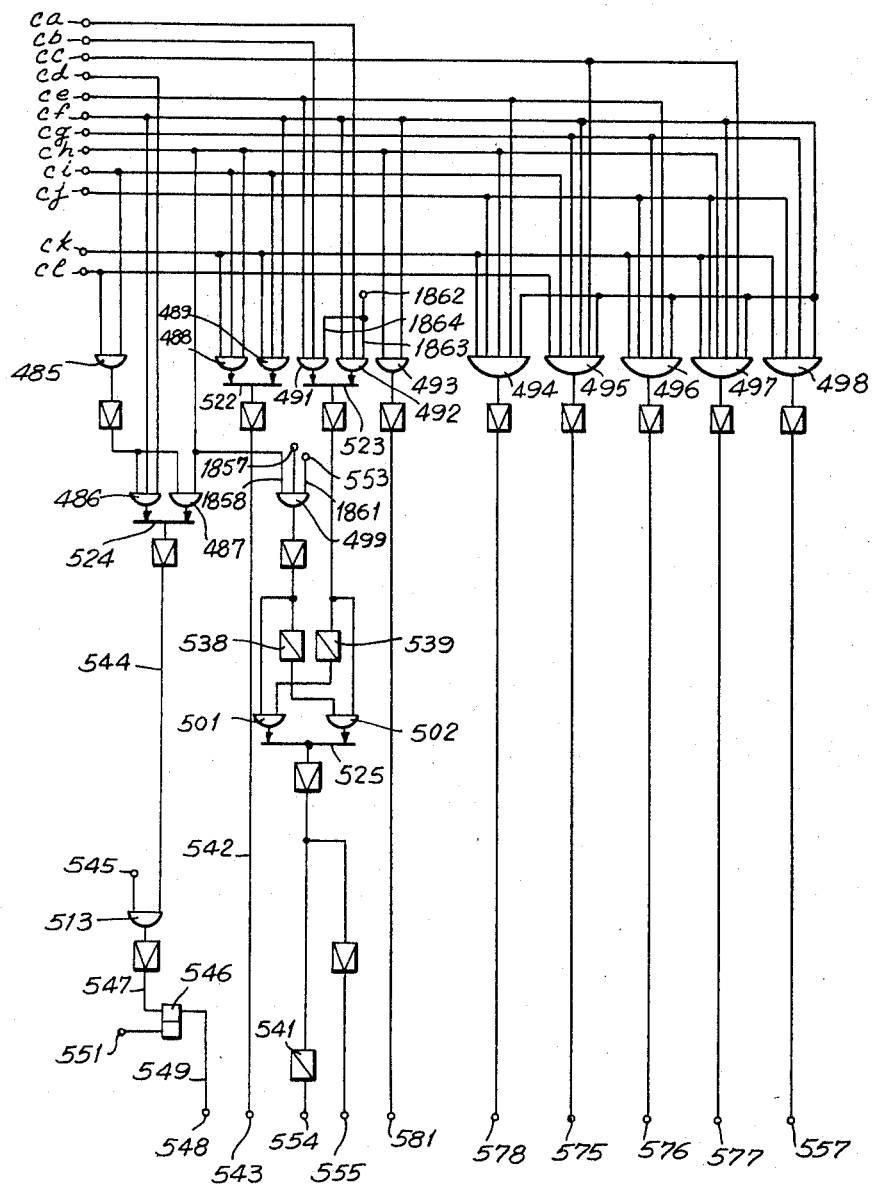
Figure 37:
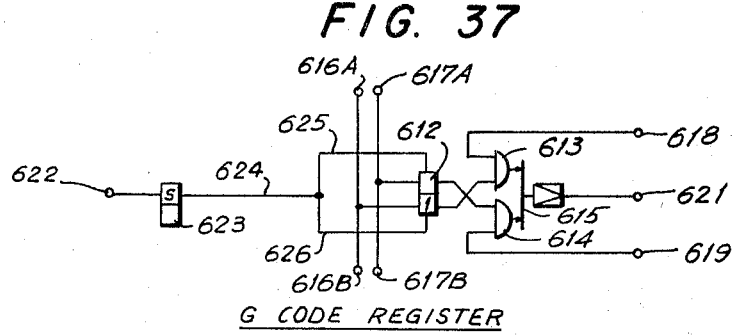
Figure 38:
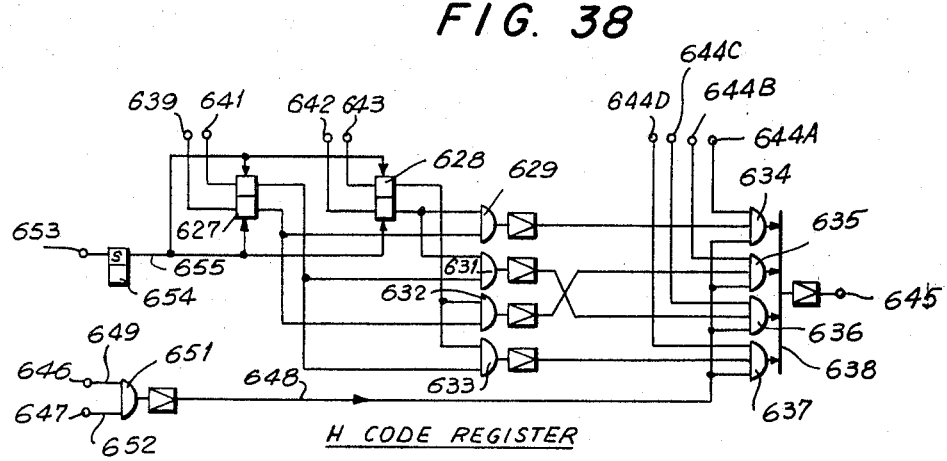
Figure 39:
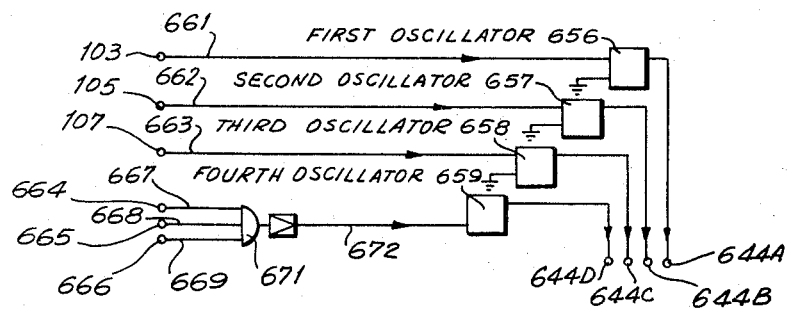
Figure 43:
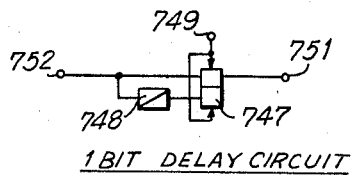
Figure 44:
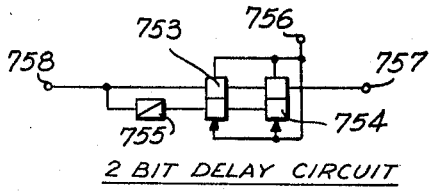
Figure 40:
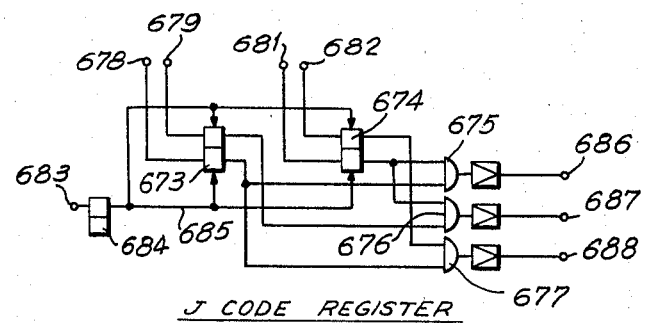
Figure 41:
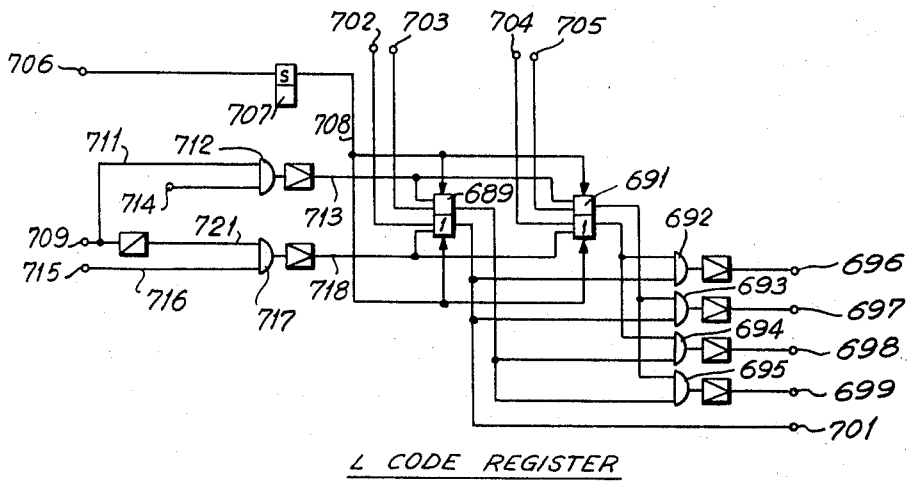
Figure 42A:
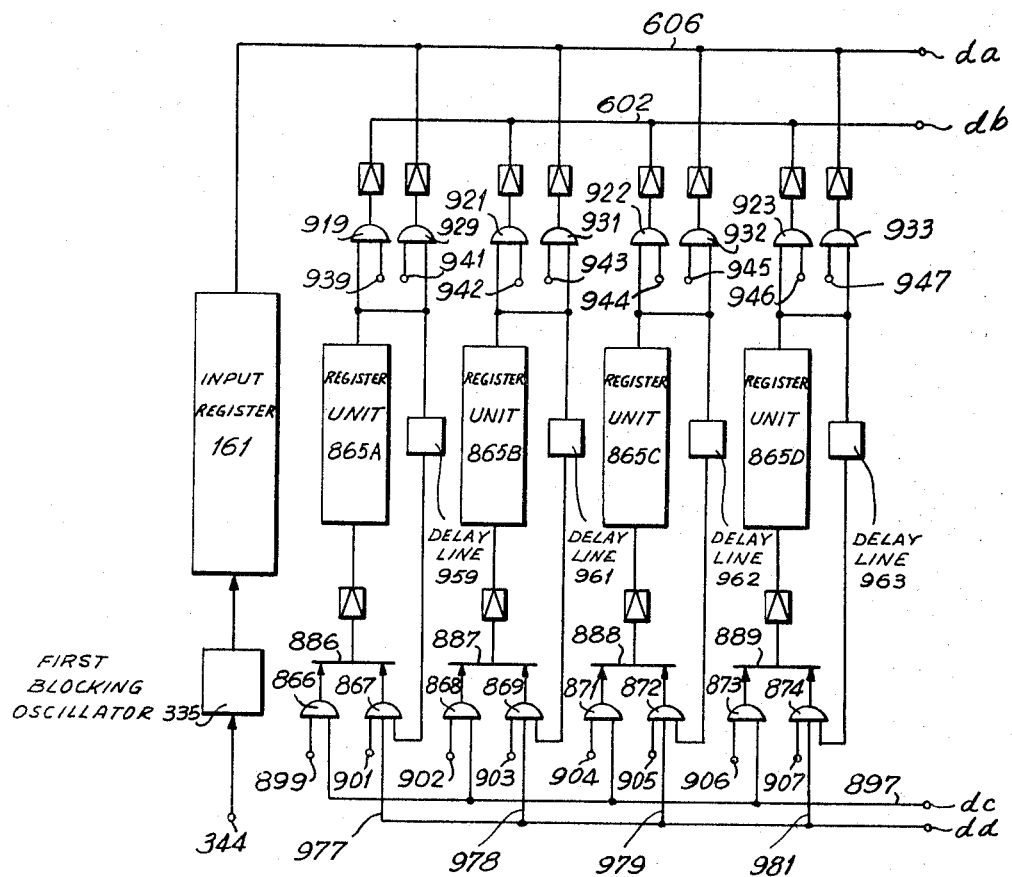
Figure 42B:
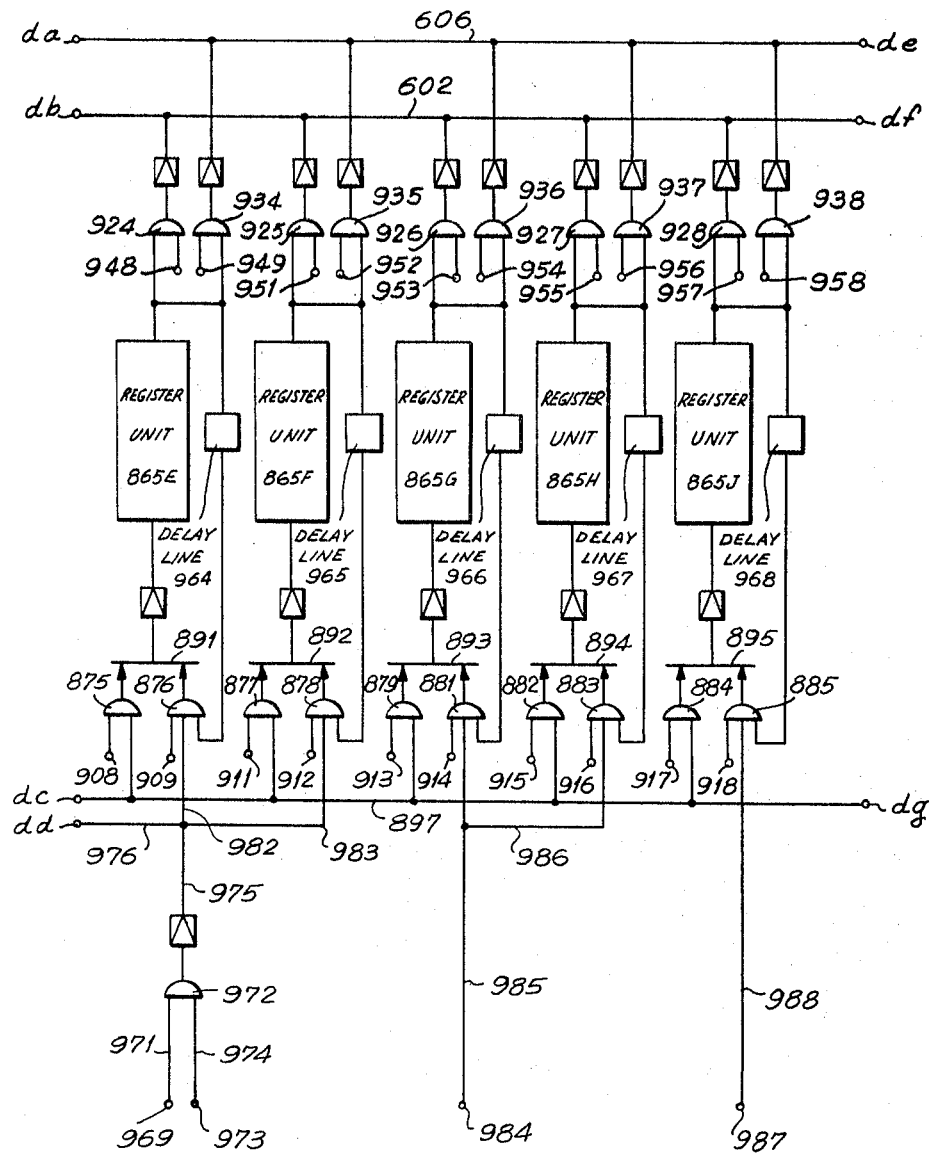
Figure 42C:
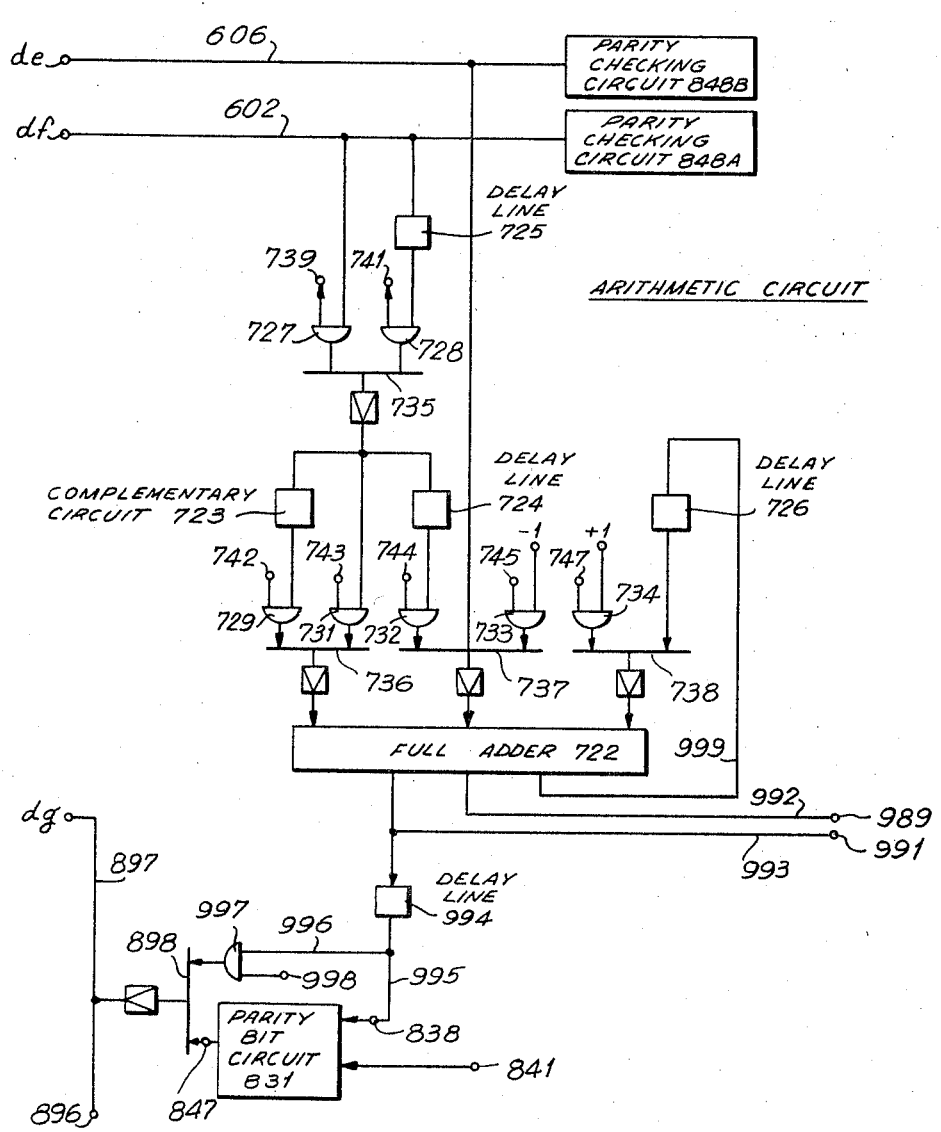
Figure 45:
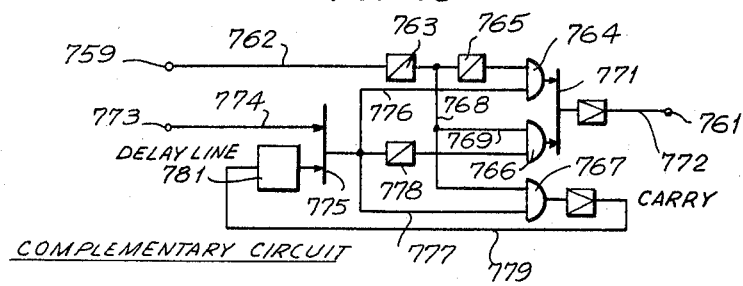
Figure 46:
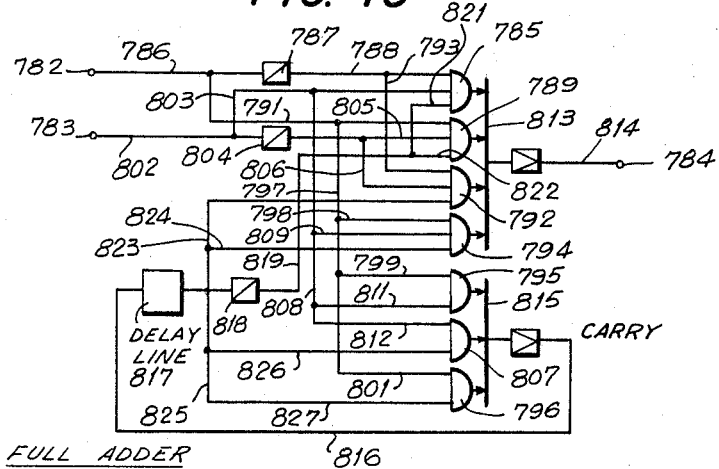
Figure 47:
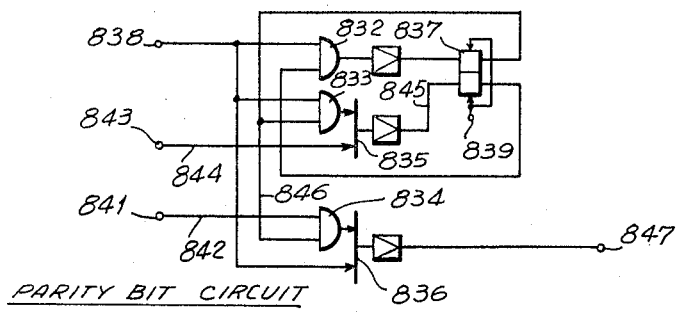
Figure 58:
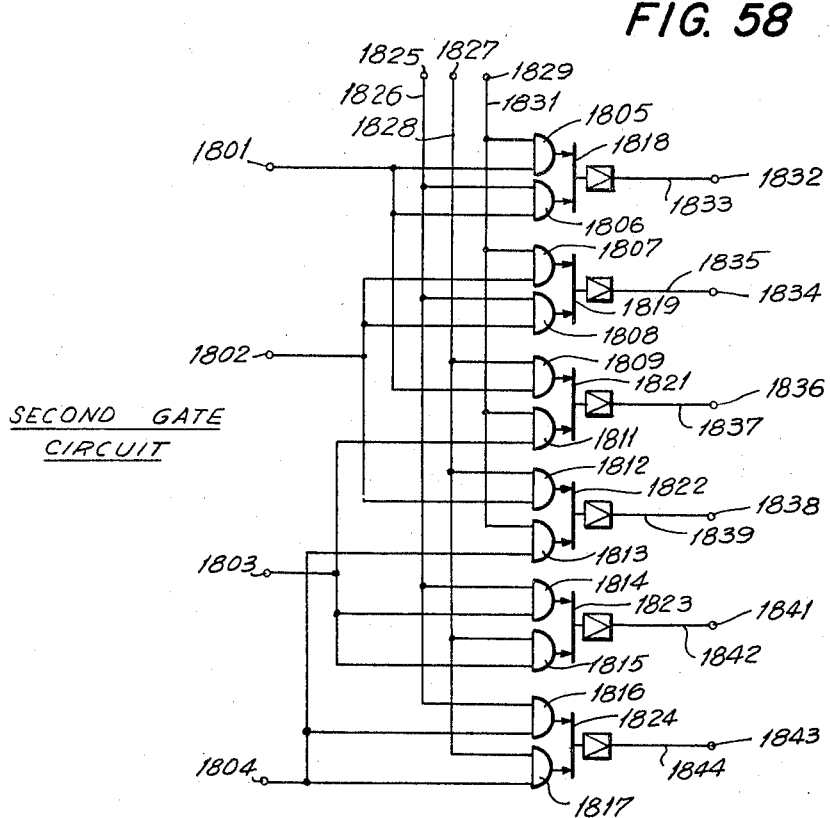
Figure 48:
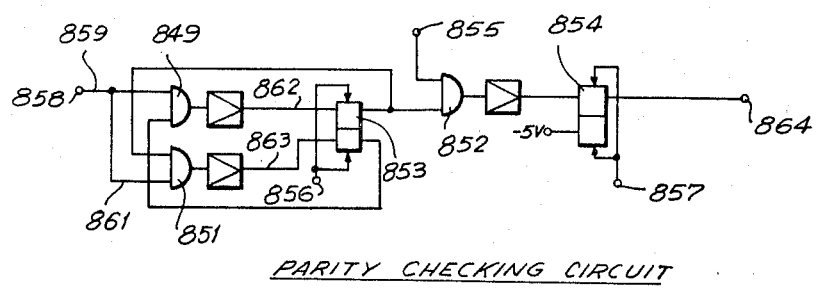
Figure 49A:
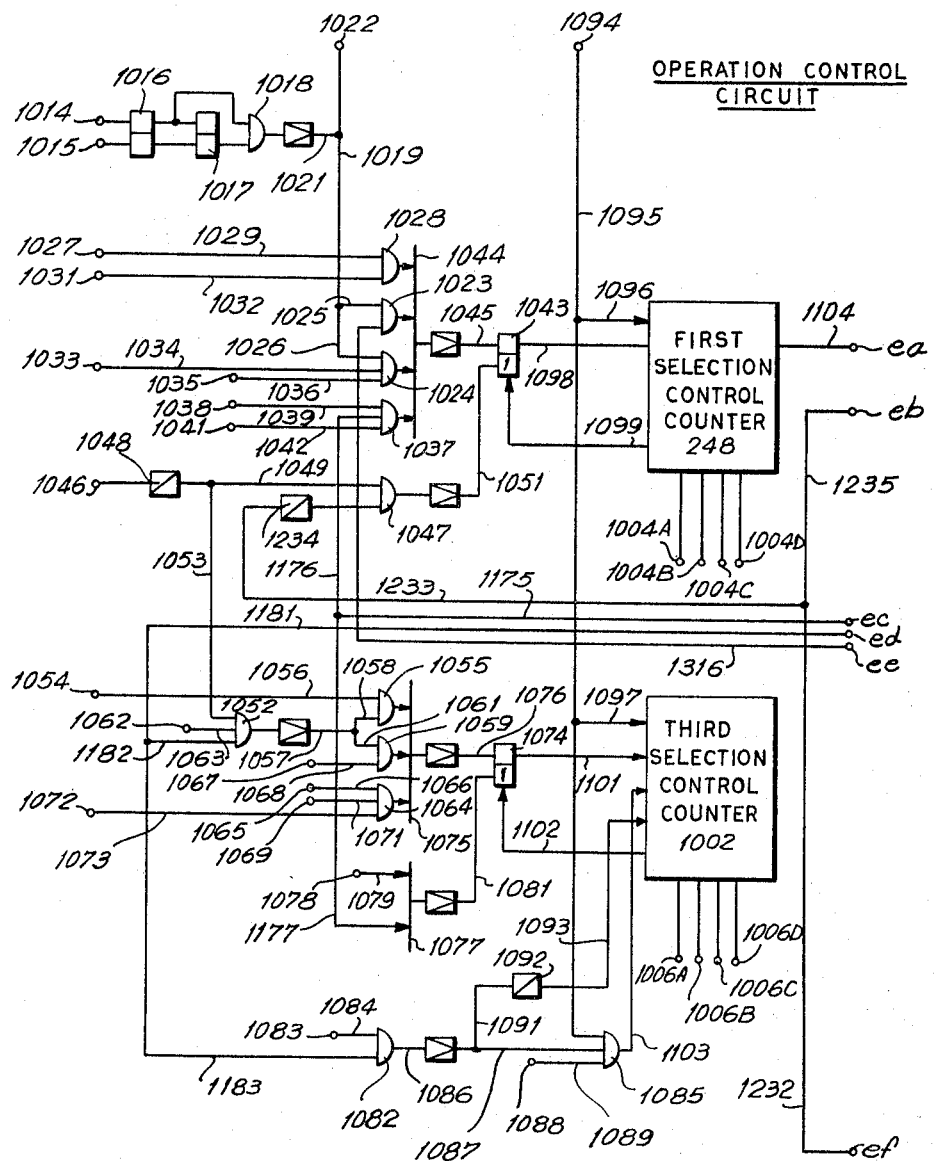
Figure 49B:
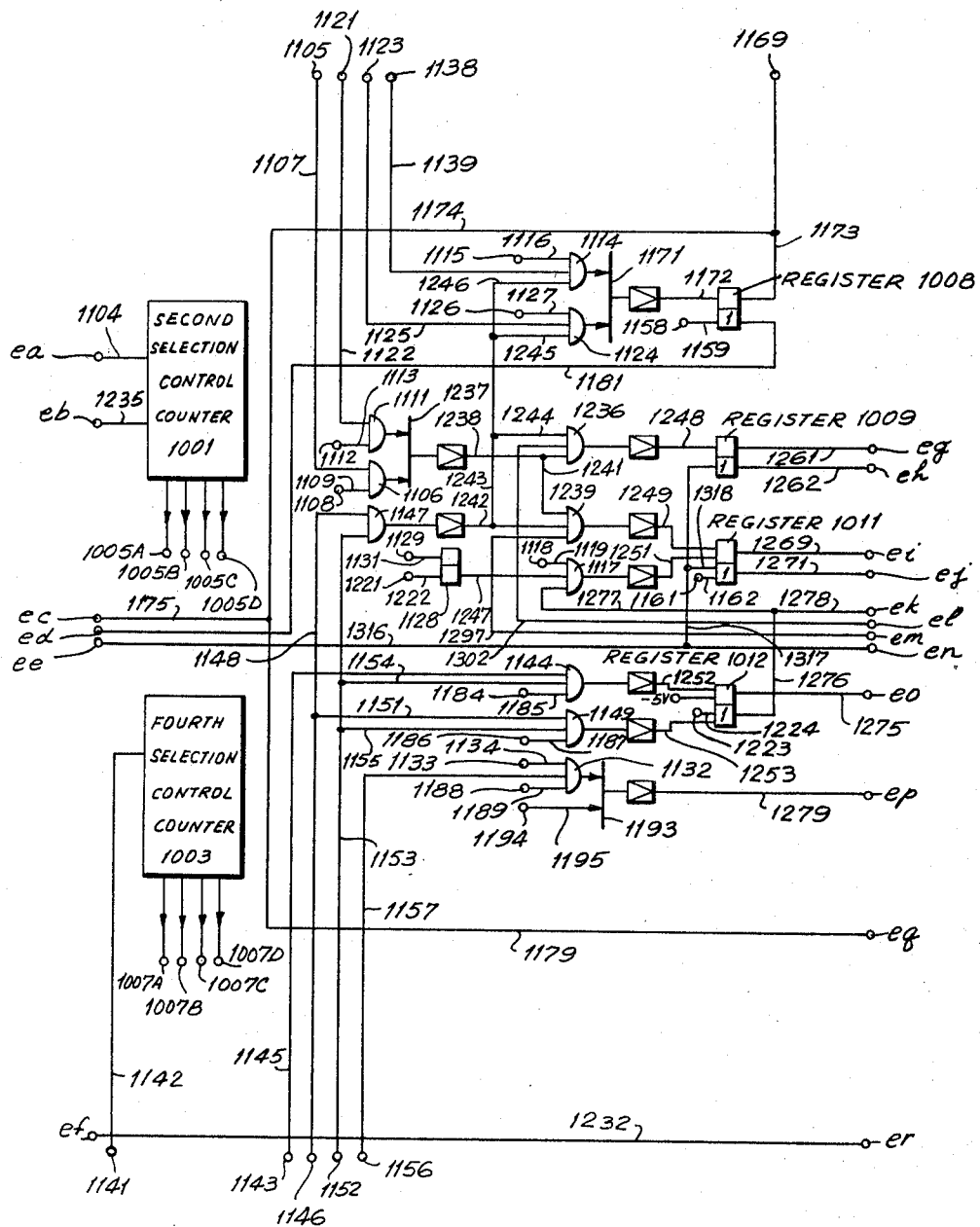
Figure 49C:
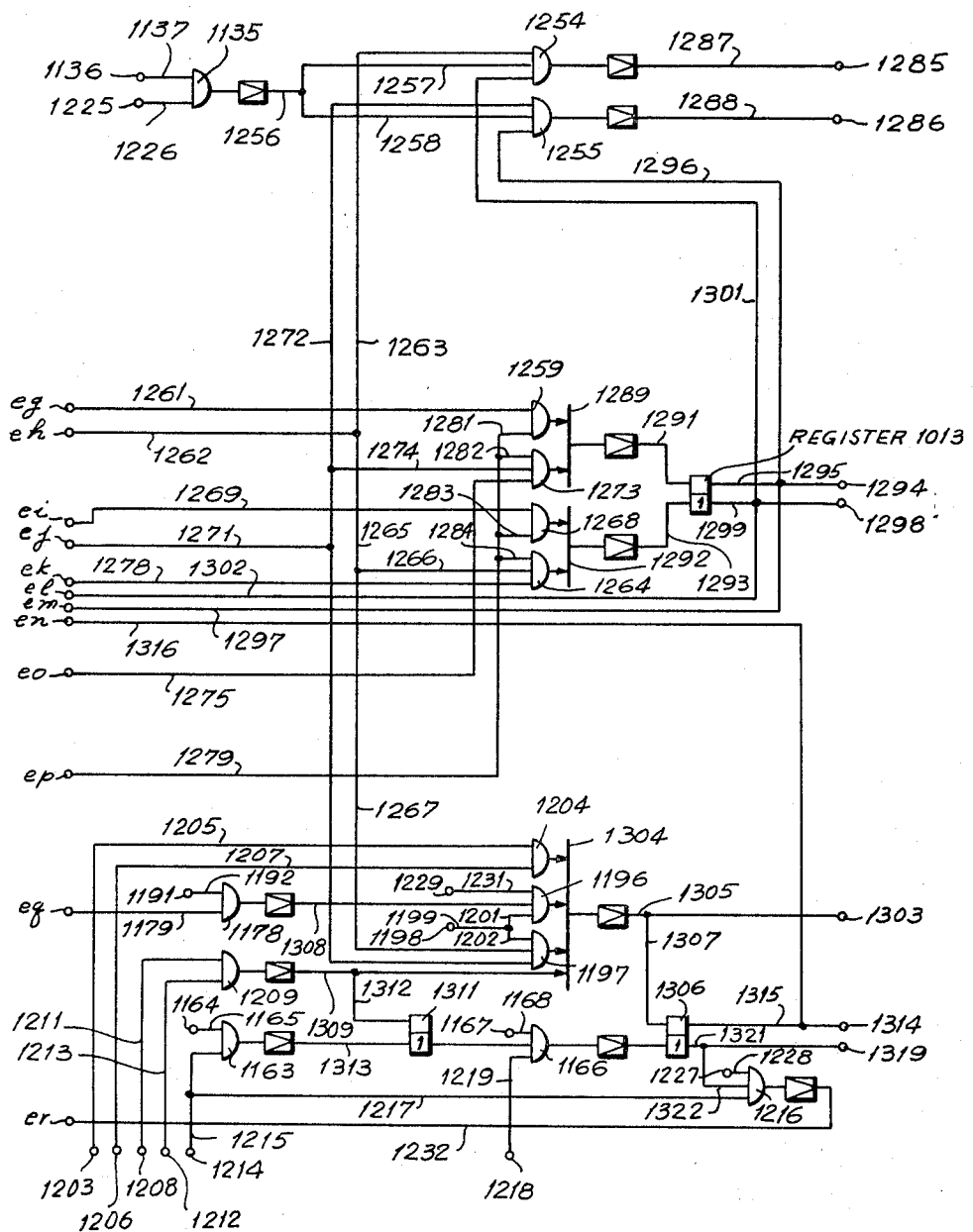
Figure 52:
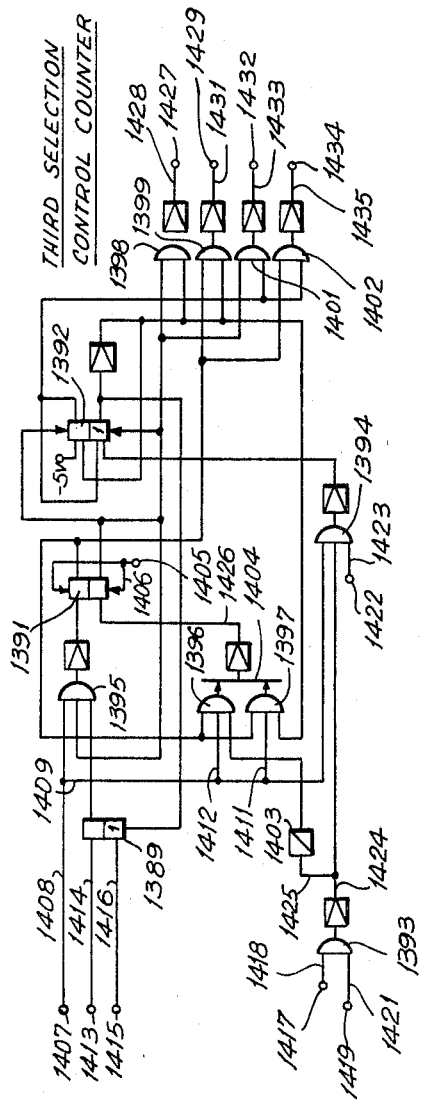
Figure 53:
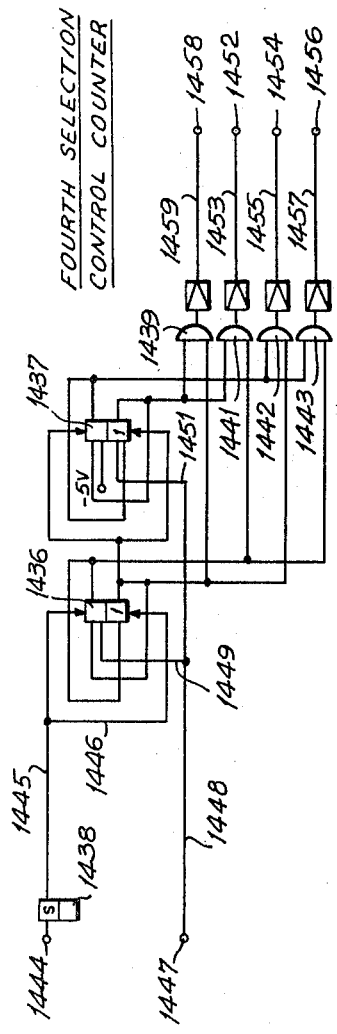
Figure 54A:
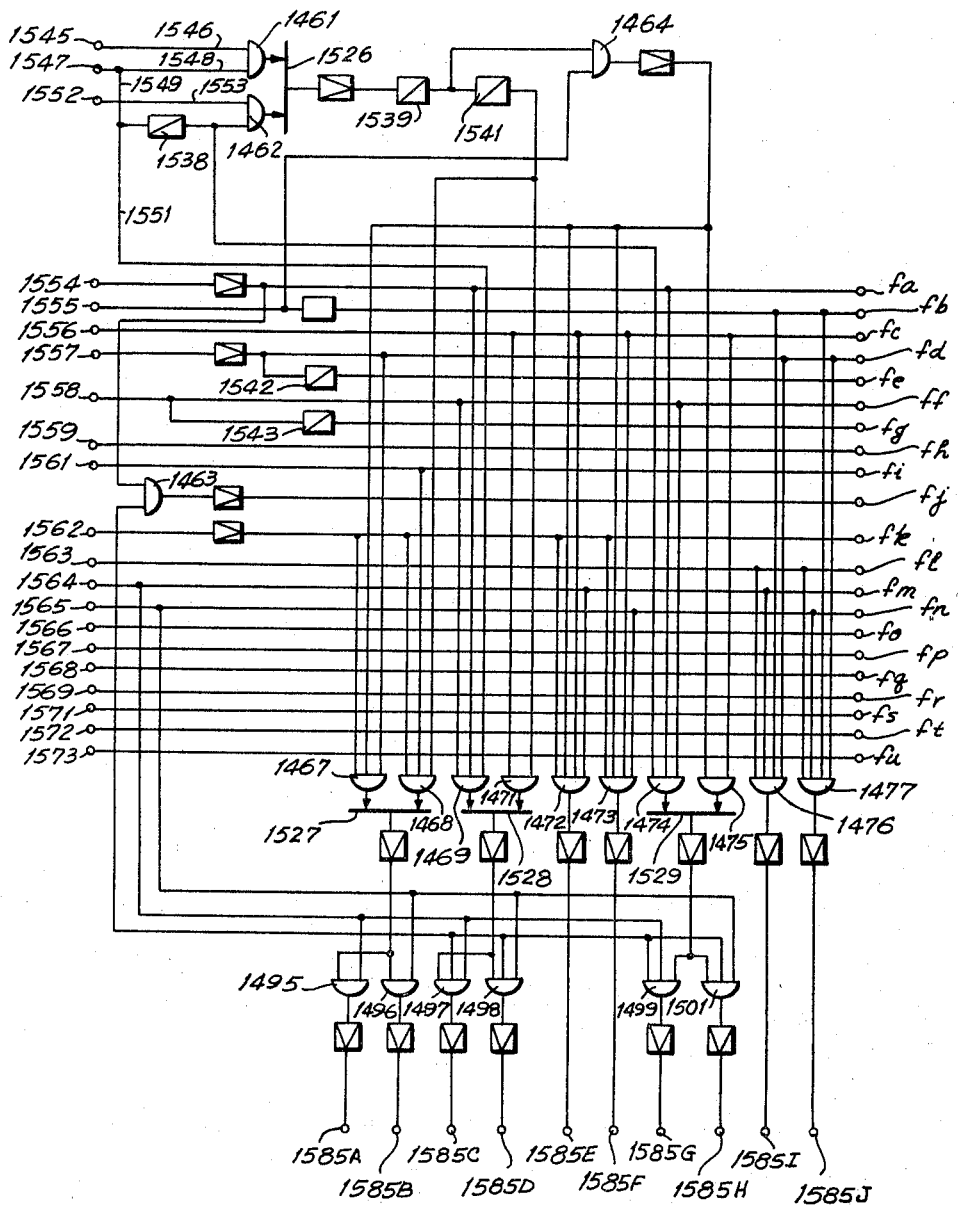
Figure 54B:
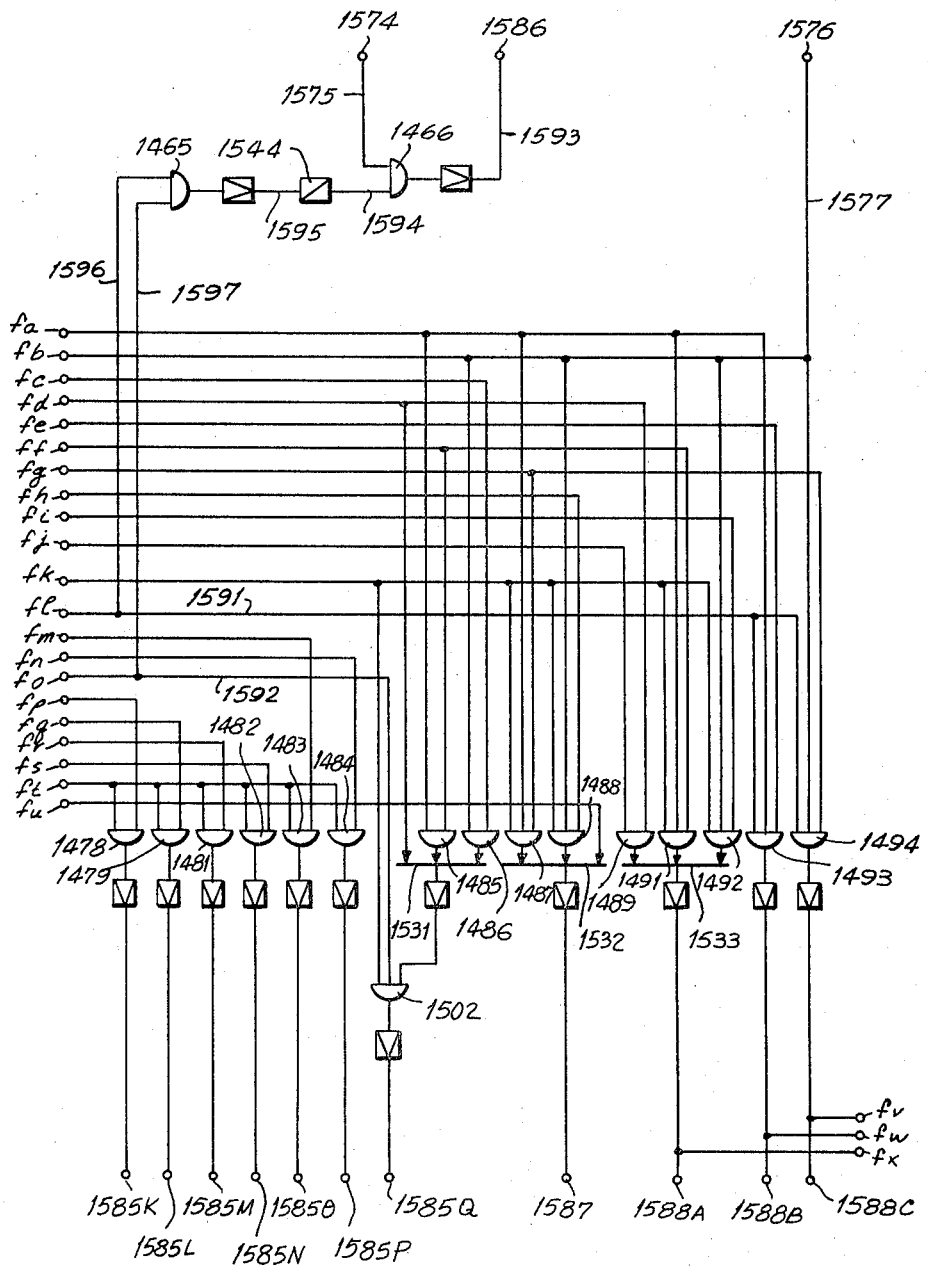
Figure 54C:
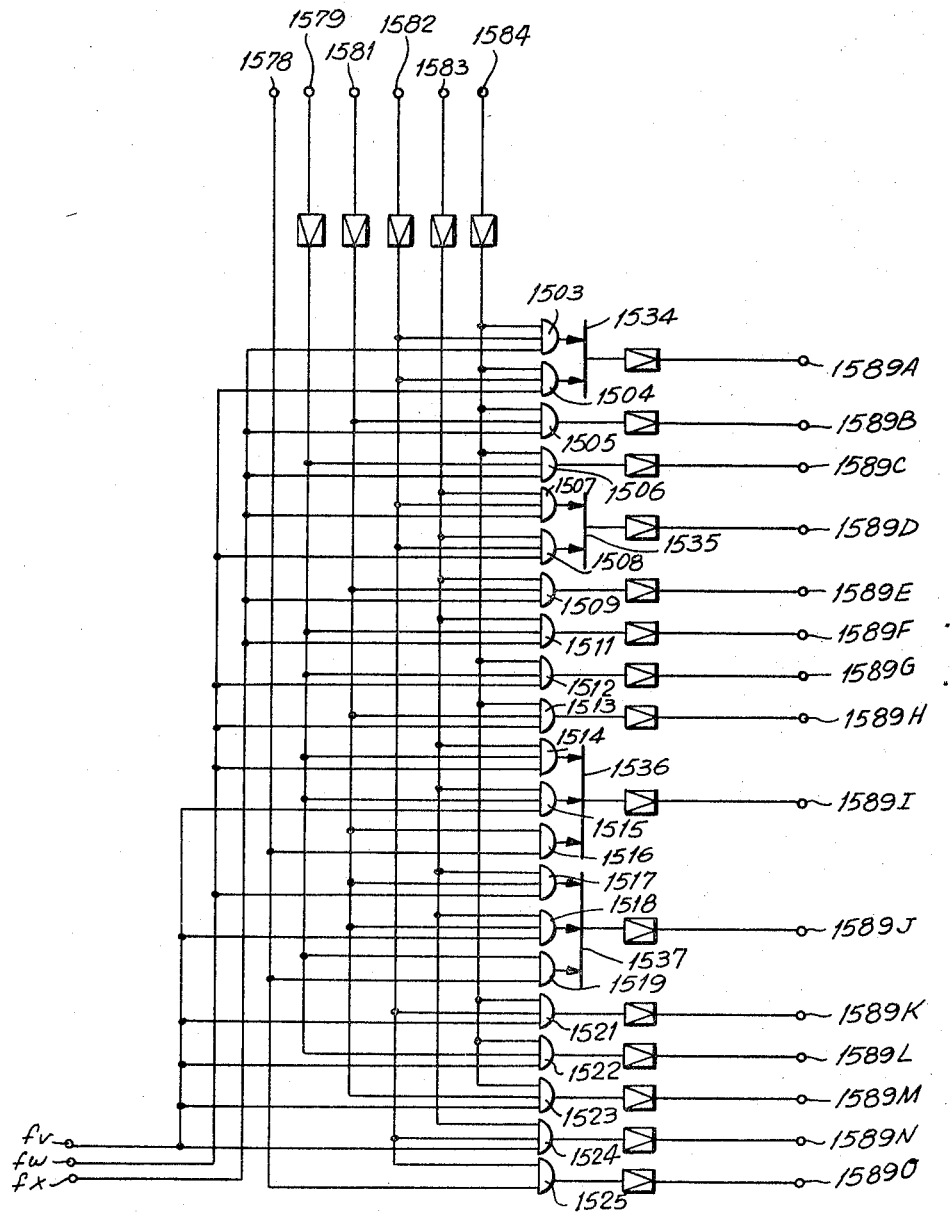
Figure 55A:
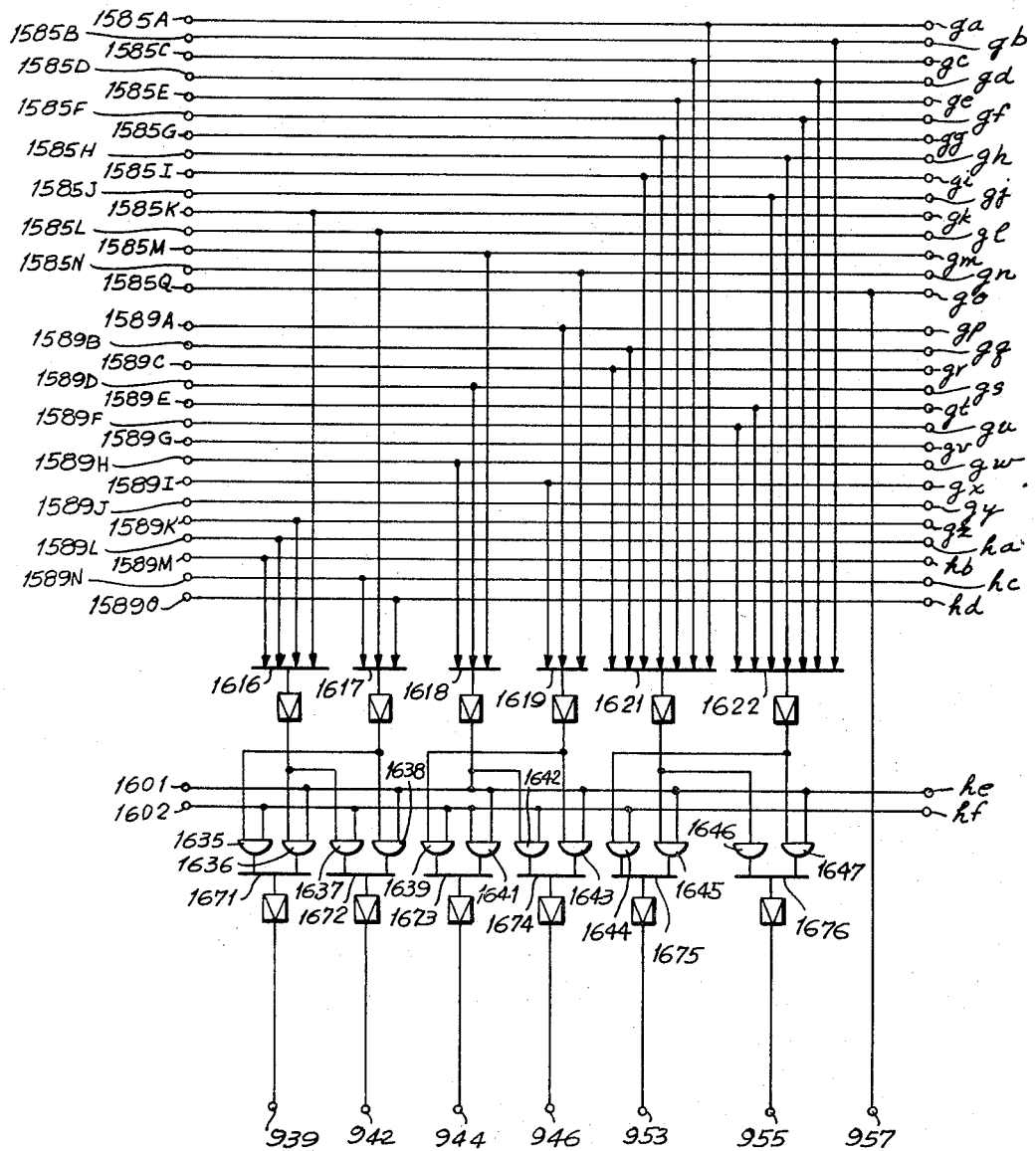
Figure 55B:
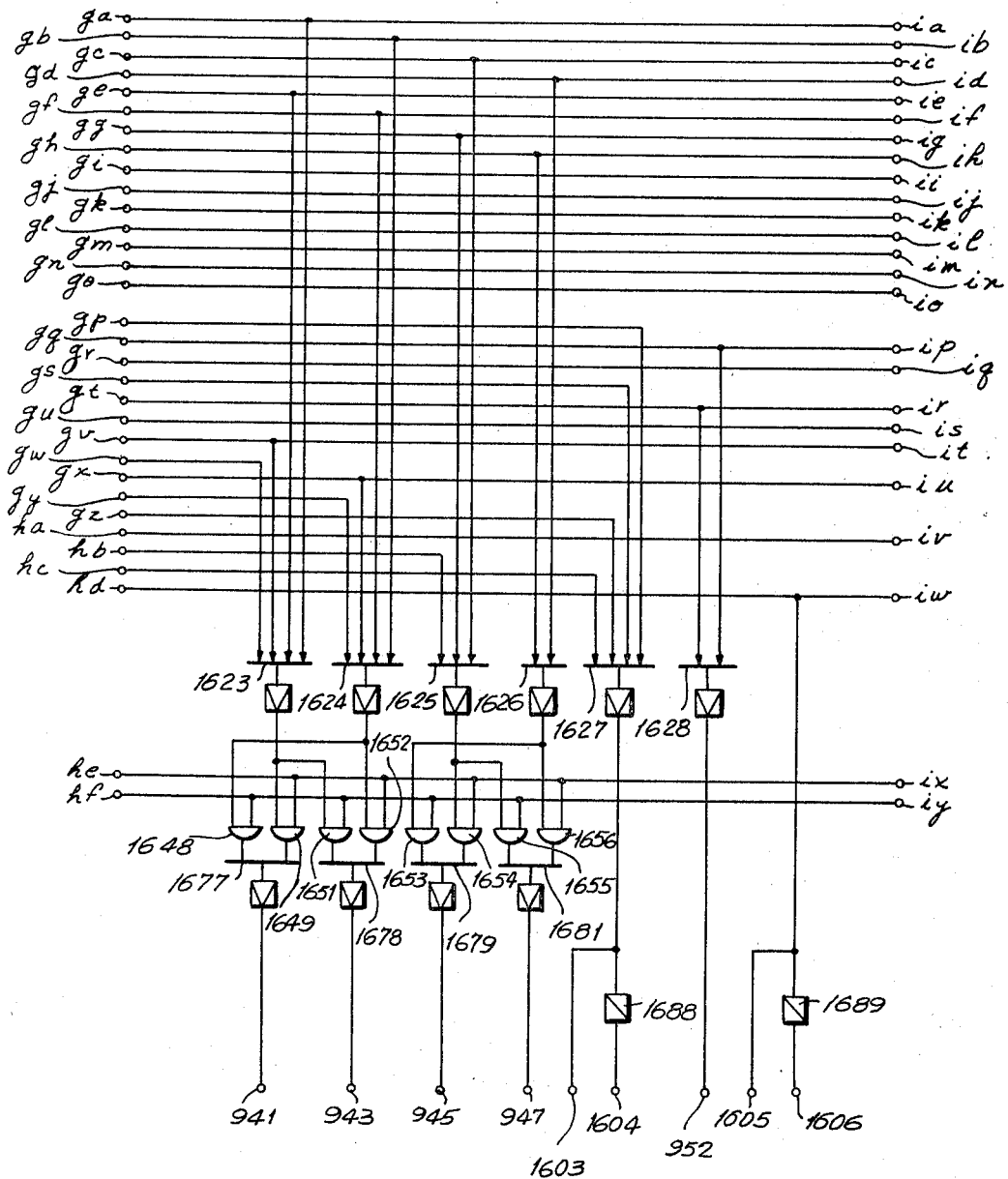
Figure 55C:
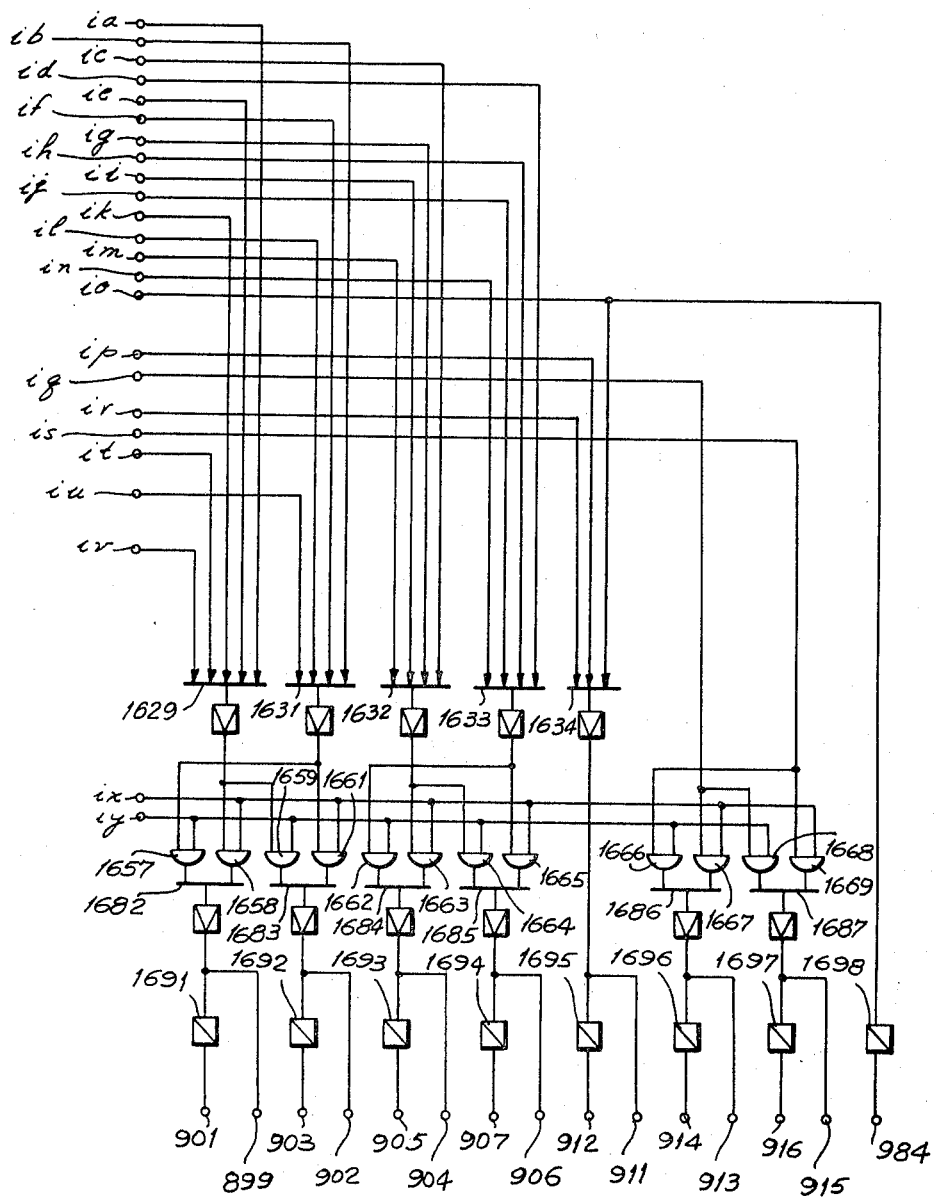
Figure 56:
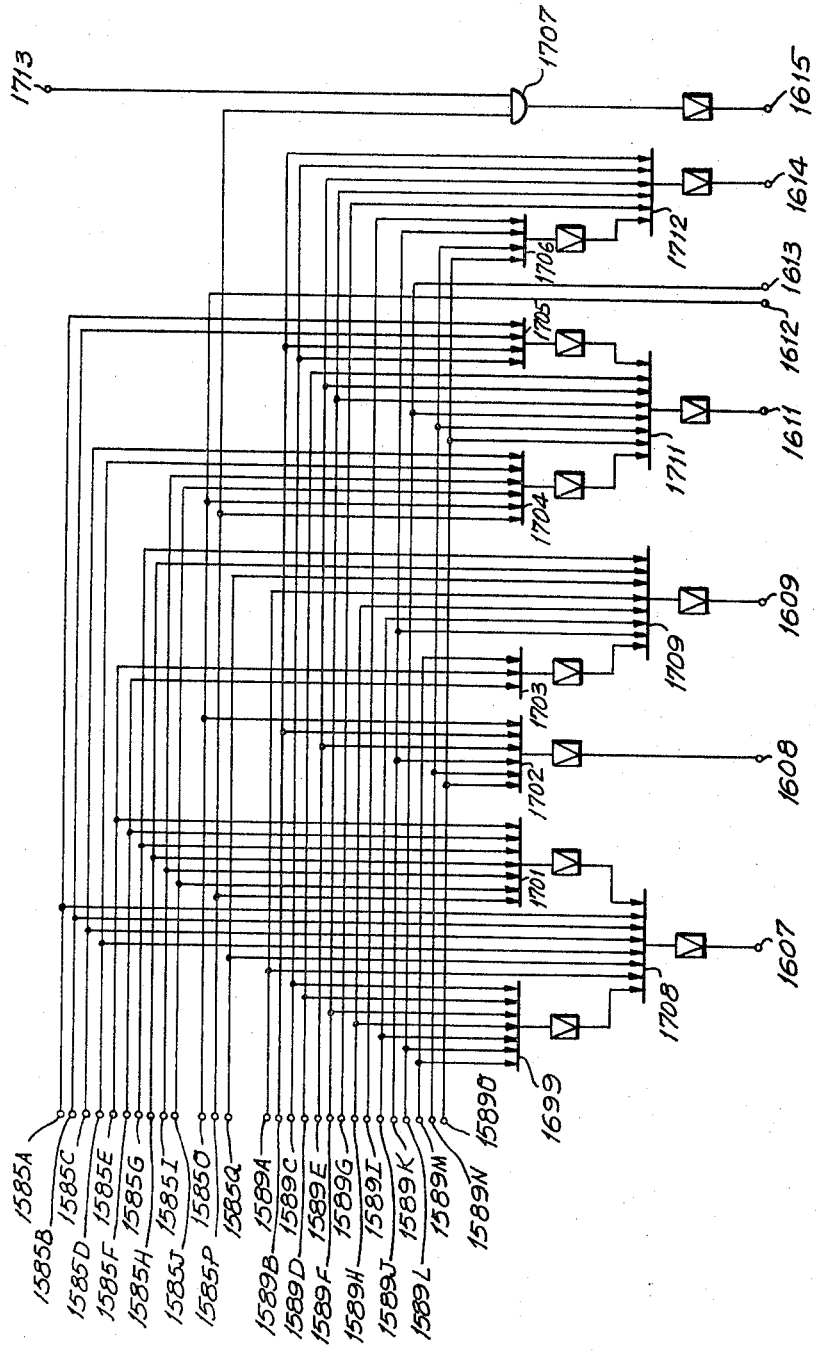
Figure 57:
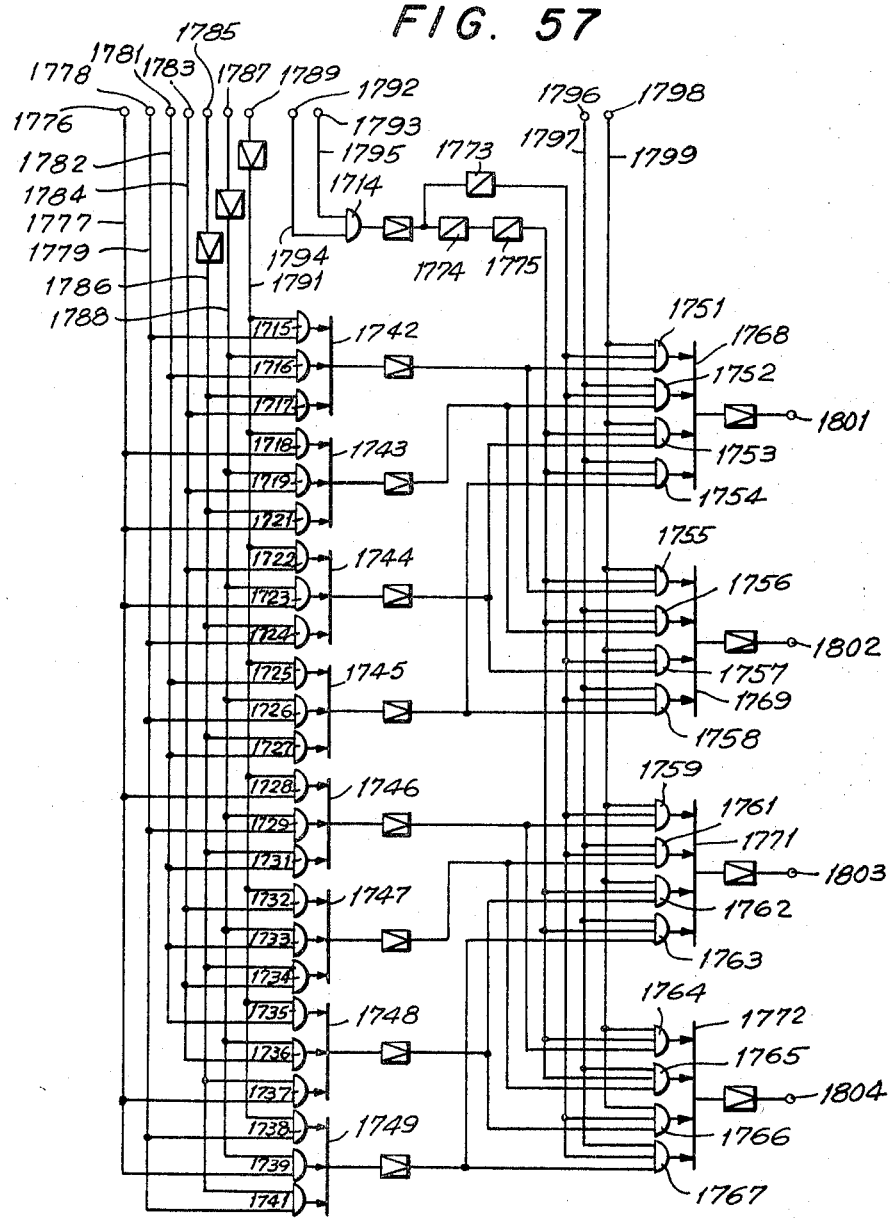

FIG. 25 is an axial section of an embodiment of an electric stepping motor which may be utilized in each of the electrohydraulic pulse motors 24, 19 and 16 of FIGS. 4 and 5;

FIG. 26 is a block diagram of an embodiment of a pulse motor driving unit which may be utilized as the pulse motor driving unit 36 of FIG. 12;

FIG. 27 is a view, partly in section, of an embodiment of an electrohydraulic pulse motor which may be utilized as each of the electrohydraulic pulse motors 24, 19 and 16 of FIGS. 4 and 5;

FIG. 28 is a perspective view of the electrohydraulic pulse motor of FIG. 27;

FIG. 29 is a block diagram of an embodiment of a pulse distributor and control unit which may be utilized as the pulse distributor and control unit 35 of FIG. 12, and includes the tape readout device 34 and the dial switchboard 33 of FIG. 12;

FIG. 30 is a circuit diagram of an embodiment of a time pulse generator 209 of the pulse distributor and control unit 35 of FIG. 29;

FIG. 31 is a graphical presentation of the various clock pulses produced by the time pulse generator of FIG. 30;

Figure 32:
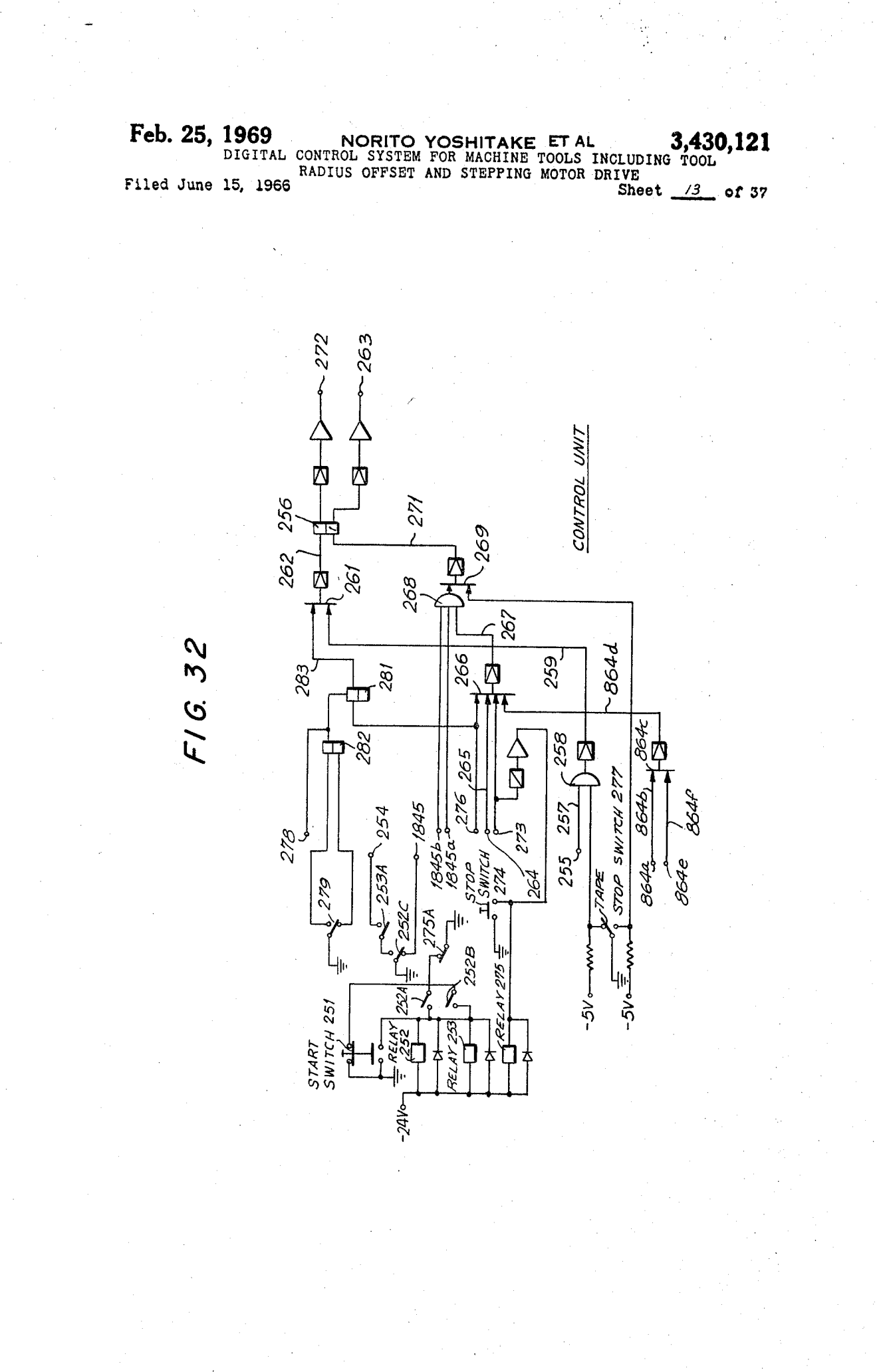

FIG. 32 is a circuit diagram of an embodiment of a control unit which may be utilized as the control unit 187 of the pulse distributor and control unit 35 of FIG. 29;

FIGS. 33a and 33b are a circuit diagram of an embodiment of an input register which may be utilized as the input register 161 of the pulse distributor and control unit 35 of FIG. 29;

FIG. 34 is a circuit diagram of an embodiment of a selection counter which may be utilized as the selection counter 247 of the input register of FIGS. 33a and 33b;

FIGS. 35a and 35b are a circuit diagram of an embodiment of a decoder which may be utilized as the decoder 166 of the pulse distributor and control unit 35 of FIG. 29;

FIG. 36 is a circuit diagram of an embodiment of a register unit of a numerical data register which may be utilized as a register unit of the numerical data register 189 of the pulse distributor and control unit 35 of FIG. 29;

FIG. 37 is a circuit diagram of an embodiment of a G code register which may be utilized as the G code register 172 of the pulse distributor and control unit 35 of FIG. 29;

FIG. 38 is a circuit diagram of an embodiment of an H code register which may be utilized as the H code register 168 of the pulse distributor and control unit 35 of FIG. 29;

FIG. 39 is a block diagram of an embodiment of a feed pulse generator which may be utilized as the feed pulse generator 164 of the pulse distributor and control unit 35 of FIG. 29;

FIG. 40 is a block diagram of an embodiment of a J code register which may be utilized as the J code register 177 of the pulse distributor and control unit 35 of FIG. 29;

FIG. 41 is a block diagram of an embodiment of an L code register which may be utilized as the L code register 175 of the pulse distributor and control unit 35 of FIG. 29;

FIGS. 42a, 42b and 42c are a block and circuit diagram of an embodiment of an arithmetic circuit which may be utilized as the arithmetic circuit 179 of the pulse distributor and control unit 35 of FIG. 29;

FIG. 43 is a block diagram of an embodiment of a one bit delay circuit which may be utilized as each of the one bit delay lines 725 and 726 of FIG. 42c;

FIG. 44 is a block diagram of an embodiment of a two bit delay circuit which may be utilized as the two bit delay line 724 of the arithmetic circuit 179 of FIG. 42c;

FIG. 45 is a block diagram of an embodiment of a complementary circuit which may be utilized as the complementary circuit 723 of the arithmetic circuit 179 of FIG. 42c;

FIG. 46 is a block diagram of an embodiment of a full adder which may be utilized as the full adder 722 of the arithmetic circuit 179 of FIG. 42c;

FIG. 47 is a block diagram of an embodiment of a parity bit circuit which may be utilized as the parity bit circuit 831 of the arithmetic circuit 179 of FIG. 42c;

FIG. 48 is a block diagram of an embodiment of a parity checking circuit which may be utilized as each of the parity checking circuits 848A and 848B of the arithmetic circuit 179 of FIGS. 42a, 42b and 42c;

FIGS. 49a, 49b and 49c are an embodiment of an operation control circuit which may be utilized as the operation control circuit 197 of the pulse distributor and control unit 35 of FIG. 29;

FIG. 50 is a block diagram of an embodiment of a selection control counter which may be utilized as the second selection control counter 1001 of the operation control circuit of FIGS. 49a, 49b and 49c;

FIG. 51 is a block diagram of an embodiment of a selection control counter which may be utilized as the first selection control counter 248 of the operation control circuit of FIGS. 49a, 49b and 49c;

FIG. 52 is a block diagram of an embodiment of a selection control counter which may be utilized as the third selection control counter 1002 of the operation control circuit of FIGS. 49a, 49b and 49c;

FIG. 53 is a block diagram of an embodiment of a selection control counter which may be utilized as the fourth selection control counter 1003 of the operation control circuit of FIGS. 49a, 49b and 49c;

FIGS. 54a, 54b and 54c are a block diagram of an embodiment of a gate control signal generator which may be utilized as the gate control signal generator of the operation control circuit 197 of the pulse distributor and control unit 35 of FIG. 29;

FIGS. 55a, 55b and 55c are a block diagram of an embodiment of a first gate control circuit which may be utilized as the first gate control circuit of the operation control circuit 197 of the pulse distributor and control unit 35 of FIG. 29;

FIG. 56 is a circuit diagram of an embodiment of a second gate control circuit which may be utilized as the second gate control circuit of the operation control circuit 197 of the pulse distributor and control unit 35 of FIG. 29;

FIG. 57 is a circuit diagram of an embodiment of a first gate circuit which may be utilized as the first gate circuit 192 of the pulse distributor and control unit 35 of FIG. 29;

FIG. 58 is a circuit diagram of an embodiment of a second gate circuit which may be utilized as the second gate circuit 207 of the pulse distributor and control unit 35 of FIG. 29; and FIG. 59 is a schematic view of a pattern cut by the digital control system of the present invention.

As described in copending application Ser. No. 114,267, according to a known principle of machine-tool control by digital pulses, such pulses are supplied to the feed control of the machine in accordance with Cartesian coordinates of the particular straight or curved path of the desired machining operation, so that the pulses are distributed along the path, between its starting point and end point, and any instantaneous position is the accumulated or integrated result of the preceding pulses. The instantaneous position of the tool relative to the workpiece is continuously checked to determine whether it is located on the positive or negative area of the given path in the coordinate reference system. This system of pulse distribution is illustrated by the curved path of FIG. 1, and the straight paths of FIGS. 2 and 3.

Figure 1:
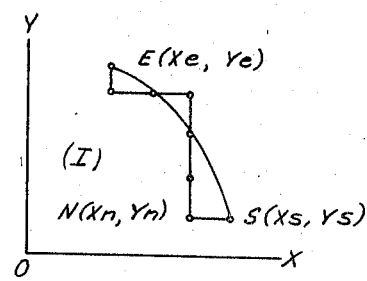
FIG. 1 is a graphical presentation of digital pulse distribution for the control of machinery along an arc.

FIGS. 4 and 5 provide a more complete understanding of FIG. 1. FIGS. 4 and 5 show a machine tool which embodies the principles illustrated in FIGS. 1, 2 and 3.

In FIGS. 4 and 5, a machine foundation 11 supports a heavy upright and horizontally overhanging frame 12. A vertical guide 13 secured to the vertical portion of the frame 12 supports a vertically movable knee 14 for vertical movement. A heavy vertical feed screw 15 threadedly engages the knee 14 in a suitable threaded recess of said knee and is seated in a suitable unthreaded recess formed in the foundation 11 for free rotary motion. Rotation of the feed screw 15 imparts vertical motion to the knee 14 without causing relative translatory motion between the foundation 11 and said feed screw. A reversible and controllable electrohydraulic pulse motor 16 mounted on the foundation 11 imparts rotary motion to the vertical feed screw 15 via a suitable drive coupling such as, for example, a worm gear 17 and a pinion 18 keyed to said vertical feed screw and threadedly engaged with said worm gear.

Secured to the knee 14 is another controllable and reversible electrohydraulic pulse motor 19 which drives an axially extending first horizontal feed screw 21. A saddle 22 is movably mounted on the knee 14 for horizontal movement across said knee. The saddle 22 threadedly engages the horizontal feed screw 21 in a manner which transmits the rotation of the motor 19 as horizontal movement of said saddle. A work platform 23 is movably mounted on the saddle 22 for movement transverse to said saddle. The work platform 23 is moved horizontally by a third controllable and reversible electrohydraulic pulse motor 24 which is mounted on said work platform. A second horizontal feed screw 25 driven by the motor 24 threadedly engages the work platform 23 in a manner which transmits the rotation of said motor as horizontal movement of said work platform transverse to the saddle 22. A workpiece 26 is suitably affixed to the work platform 23 by any suitable means. A milling cutter 27 is supported by the frame 12 for rotation in a horizontal plane and is rotated by a torque motor 28 mounted on said frame.

In operation, when the motor 24 is energized, it moves the work platform 23 horizontally relative to the saddle 22 and the knee 14. For illustrative purposes, movement of the work platform 23 to the right, as shown in FIG. 4, is selected as movement in the +X direction. When the motor 19 is energized. it moves the saddle 22 and the work platform 23 horizontally relative to the knee 14 at right angles to the movement imparted by the motor 24, to the right and left as shown in FIG. 5. Movement of the work platform 23 to the right, as shown in FIG. 5, is thus considered movement in the +Y direction. When the motor 16 is energized, it moves the work platform 23 in a vertical direction, perpendicular to the plane of the X, Y coordinates. The vertical movement is thus movement in the +Z direction. The rotation of the vertical feed screw 15 by the motor 16 results in vertical movement not only of the work platform 23, but also of the knee 14 and the saddle 22. The workpiece 26 may therefore be moved to any point via any number of directions at any time in an X, Z plane, a Y, Z plane or an X, Y plane.

In the machine tool of FIGS. 4 and 5, all movements in the directions of the X, Y and Z axes are accomplished, as described. by the work platform 23. A ball nut threaded member of great precision (not shown in the figures) transforms the rotary torque of each of the electrohydraulic pulse motors 16, 19 and 24 to a corresponding linear motion of the work platform 23. The work platform 23 moves 0.01 mm. in the corresponding direction for each rotary step of each of the electrohydraulic pulse motors 16, 19 and 24.

Figure 2:
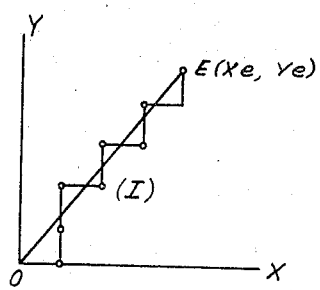
FIG. 2 is a graphical presentation of digital pulse distribution for the control of machinery along a line.
Figure 3:
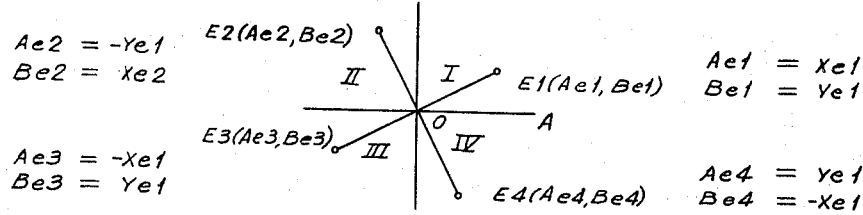
FIG. 3 is a graphical presentation of digital pulse distribution for the control of machinery along lines in the different quadrants, as related to the first quadrant.
Figure 6:
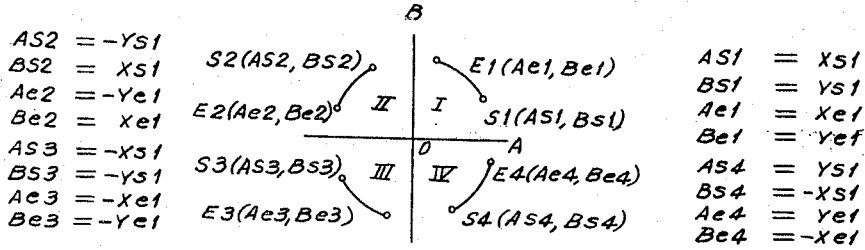
FIG. 6 is a graphical presentation of digital pulse distribution for the control of machinery along arcs extending in counterclockwise direction in the different quadrants, as related to the first quadrant.
Figure 7:
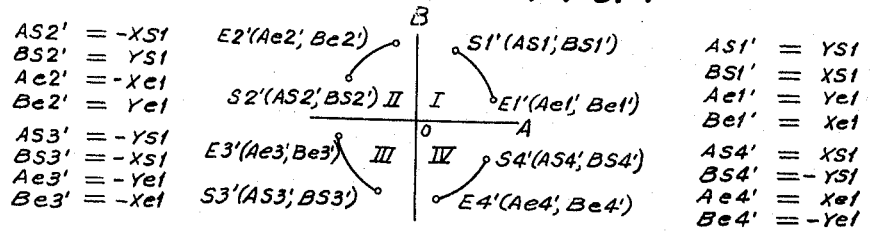
FIG. 7 is a graphical presentation of digital pulse distribution for the control of machinery along arcs extending in clockwise direction in the different quadrants, as related to the first quadrant.

A first principal aspect of the digital control or pulse distribution system is pulse distribution for a counterclockwise extending arc positioned in the first quadrant and having an axis at the origin of the two coordinate X, Y system, as shown in FIG. 1, and for a straight line starting at and extending from the origin, as shown in FIG. 2. A second principal aspect is pulse distribution for an arc positioned in each of the four quadrants and having an axis at the origin of the two coordinate X, Y system or A, B system, as shown in FIGS. 6 and 7, and for a straight line starting at and extending from the origin in each of the four quadrants, as shown in FIG. 3; the pulse distribution being replaced by a pulse distribution for the arc or line as repositioned in the first quadrant, as shown in FIGS. 1 and 2. A third principal aspect of the digital control of pulse distribution system is redistribution in the three coordinate X, Y, Z system of pulses distributed in the two coordinate X. Y or A, B system.

The foregoing three principal aspects of the digital control or pulse distribution system are achieved by the pulse distribution system of copending application Ser. No. 114,267 and the system for carrying the pulse distribution into effect is fully described in said copending application.

FIG. 1 shows, by way of a rectangular coordinate graph having X and Y axes, a curve having a starting point S located relative to the Cartesian coordinate axes at the point $Xs$, $Ys$, and an end point E located at the point $Xe$, $Ye$. The $X$ and $Y$ axes represent the mutually perpendicular directions such as, for example, horizontal directions, in which a movable workpiece may be moved relative to the cutting tool of a machine tool such as, for example, the vertical milling machine of FIGS. 4 and 5. The curve SE represents the predetermined path to be followed by the workpiece relative to the cutting tool. Alternatively, the curve SE may represent the path to be followed by the cutting tool relative to the workpiece. Thus, the direction X may represent the component of motion of the workpiece relative to the cutter, or the motion of the cutter relative to the workpiece, in one horizontal direction, and the Y direction represents the component of movement of the workpiece relative to the cutter, or the motion of the cutter relative to the workpiece, in a horizontal direction perpendicular to the X direction. The position of the workpiece relative to the cutting tool, or the position of the cutting tool relative to the workpiece, in any X, Y plane relative to an origin, is designated X, Y. X represents the displacement from the origin in the X direction and Y represents the displacement from the origin in the Y direction.

The X, Y coordinate value $Xn$, $Yn$ of any point N on the arc SE of FIG. 1 is indicated by the equation (1) $\quad N = (Xn^2 + Yn^2) - Xs^2 + Ys^2) = 0$ Thus, if the point N is anywhere in the first quadrant, it may be either on the arc SE, in which case N=zero, on the positive side of the arc, in which case N>zero, or on the negative side of said arc, in which case N<zero. Then, (2) $$N = (Xn^2 + Yn^2) - (Xs^2 + Ys^2) \genfrac{}{}{0pt}{}{<}{>} 0$$

If the pulse distribution system is utilized in accordance with Equation 2, and a negative pulse is provided in the direction of the X axis when the point is either on the arc SE or on the positive side of the arc, and a positive pulse is provided in the direction of the Y axis when the point is on the negative side of said arc, and the pulse distribution is terminated when the point N attains the same coordinates as the end point E, the pulse distribution for the arc SE will be satisfactorily completed. The coincidence of the point N with the end point E of the arc SE is determined by (3) $$Q = Xe - Xn$$

in the X axis direction, and (4) $$Q = Yn - Ye$$

in the Y axis direction.

When $Q \equiv$ zero in both Equations 3 and 4, the pulse distribution is terminated and the point N has a coordinate value which is provided by the curve corresponding to the number of pulses distributed in the X and Y axis directions added to or subtracted from the start point S.

Since in FIG. 1, the start point S of the arc SE is on said arc, N=0 in Equation 2 with respect to said start point, so that a negative X direction pulse is distributed. Then, if the point N is determined after the distribution of the negative X direction pulse, N is <zero, so that a Y direction pulse is then distributed. Thereafter, the pulse distribution point N is determined and negative X or Y direction pulses are distributed. When the coordinate value of the point N is Xe, Ye, which is the coordinate value of the end point E of the arc SE, the pulse distribution is terminated. Thus, the pulse distribution is completed, vertically and horizontally, along a curve corresponding to the curve SE to an accuracy of ± one pulse.

If the work platform 23 (FIGS. 4 and 5) is displaced in the negative X and Y directions in accordance with the negative X and Y pulses, a determined distance for each pulse, said work platform is thereby displaced along the arc SE in the X, Y plane. Thus, a cutting operation approximately along the curve SE is performed by the machine tool cutter 27 upon the workpiece 26 (FIGS. 4 and 5).

As described, FIG. 1 is an illustration of digital pulse distribution for the control of machinery along an arc. The arc is shown in X, Y coordinates extending from a starting point S having coordinates Xs, Ys to an end point E having coordinates Xe, Ye. The X and Y axes represent the mutually perpendicular directions such as, for example, in a horizontal plane, in which the workpiece 26 (FIGS. 4 and 5) may be moved relative to the milling cutter 27 (FIGS. 4 and 5). The curve SE of FIG. 1 represents the path to be followed by the workpiece relative to the cutting tool or by the cutting tool relative to the workpiece. In order to follow the curve SE with the workpiece or cutting tool, the digital control system must first produce a pulse for the X axis. The position of the pulse relative to the curve SE is then determined in the manner described in copending application Ser. No. 114,267. The electrohydraulic pulse motors 24, 19 and 16 are then operated by pulses distributed for the curve SE in accordance with such pulses and the work platform 23 is moved correspondingly relative to the milling cutter 27 (FIGS. 4 and 5). The workpiece 26 is then milled in correspondence with the curve SE or in correspondence with any of the basic cutting patterns in which the digital control system of the present invention operates.

The straight line of FIG. 2 extends from the coordinate origin to the end point E in the first quadrant of the X, Y plane. A point N, having the coordinates Xn, Yn, on the line OE is defined by Equation 5, whereas when the point N is in the first quadrant but not on the line OE, it is determined by Equation 6. When the point N is on the line, N=zero in Equation 6. When the point N is on the positive side of the line OE, N>zero, and when the point N is on the negative side of the line OE, N<zero.

(5) $$N = XeYn - XnYe = 0$$

(6) $$N = XeYn - XnYe \gtreqless 0$$

If an X direction pulse is distributed when $N > 0$ and a Y direction pulse is distributed when $N < 0$, and if the pulse distribution is terminated when the coordinates of the N point are those of the end point E, the pulse distribution for the line OE will be satisfactorily completed. The only difference between the pulse distribution for the arc SE and the pulse distribution for the line OE is that a negative X pulse is provided in the case of the arc whereas a positive X pulse is provided in the case of the line. The coincidence of the point N with the end point E of the line OE is determined by (7) $$Q = Xn - Xe \gtreqless 0$$

and (8) $$Q = Yn - Ye \gtreqless 0$$

FIG. 3 illustrates a coordinate system A, B forming four quadrants, with a straight line in each of the four quadrants. The lines OE1, OE2, OE3 and OE4 are positioned in the first, second, third and fourth quadrants. The coordinate system A, B is in the A, B plane. The line in each quadrant may be relocated in the first quadrant by conversion of the coordinates A and B to the coordinates X and Y in the X, Y plane, as shown in Table I.

TABLE I

| Line located in | X | Y |
|---|---|---|
| First quadrant | X=+A | Y=+B |
| Second quadrant | X=+B | Y=−A |
| Third quadrant | X=−A | Y=−B |
| Fourth quadrant | X=−B | Y=+A |

FIG. 6 shows the coordinate system A, B with an arc extending in counterclockwise direction in each of the four quadrants. The arc S2E2, the arc S3E3 and the arc S4E4 in each of the second, third and fourth quadrants, respectively, may be relocated in the first quadrant by conversion of the coordinates A and B to the coordinates X and Y, as shown in Table II, since the X direction for pulse distribution is negative.

TABLE II

| Arc located in | X | Y |
|---|---|---|
| First quadrant | −X=−A | Y=+B |
| Second quadrant | −X=−B | Y=−A |
| Third quadrant | −X=+A | Y=−B |
| Fourth quadrant | −X=+B | Y=+A |

FIG. 7 shows the coordinate system A, B with an arc extending in clockwise direction in each of the four quadrants. The arc S2′E2′, the arc S3′E3′ and the arc S4′E4′ in each of the second, third and fourth quadrants, respectively, may be relocated in the first quadrant by conversion of the coordinates A and B to the coordinates X and Y, as shown in Table III.

TABLE III

| Arc located in | X | Y |
|---|---|---|
| First quadrant | −X=−B | Y=+A |
| Second qaudrant | −X=+A | Y=+B |
| Third quadrant | −X=+B | Y=−A |
| Fourth quadrant | −X=−A | Y=−B |

Distributed pulses in the A, B coordinate system in the A, B plane are redistributed in a three-dimensional, three coordinate system, by a J code, which determines in which plane of the X, Y, Z system the curve is positioned. The J code, for redistribution of pulses to the proper plane, is set forth in Table IV.

TABLE IV.—J CODE
[For redistribution of pulses to proper plane]

| Coordinate | XY Plane | XZ Plane | XZ Plane |
|---|---|---|---|
| +A | +X | +Y | +X |
| −A | −X | −Y | −X |
| +B | +Y | +Z | +Z |
| −B | −Y | −Z | −Z |

The three principal aspects of the control system are thus achieved with facility and rapidity, as well as accuracy, by the pulse distribution system of the copending application Ser. No. 114,267.

In the pulse distribution system of the copending patent application Ser. No. 114,267, pulses are distributed for a straight line or an arc in three-dimensional coordinates X, Y and Z. In accordance with the distributed pulses, the cutting operation is effected by the moving of the work platform relative to the cutting tool, as hereinbefore described with reference to FIGS. 4 and 5. This system does not, however, account for or take into consideration the radius or diameter of the cutter or cutting tool or the like. In a milling machine, for example, the machine tool comprises a rotating cutter which rotates around its axis. Thus, the radius of the cutter must be taken into consideration whenever a cutting operation is undertaken. This requires, in a system of the type of copending application Ser. No. 114,267, which does not provide for the cutting tool radius, the preliminary preparation of an approximate curve, derived from the curve to be cut and taking into account the radius of the cutting tool, to serve as the cutting guide. Also, in order to undertake the cutting operation on the basis of the preliminarily prepared approximate curve, the cutter radius must be offset from such curve, so that computations must be made for a corrected locus to relocate the axis of the cutter. The system of copending patent application Ser. No. 114,267 then would involve such required preparation and computations in order to account for the cutter radius. Each time a cutter is worn or abraded due to long use or damage, or each time a cutter is so damaged that it must be replaced, the computation or calculation must be undertaken for the new cutter. The radius of the new cutter must be determined and the corrected locus must be determined by the calculations. This entails considerable programming work for the preparation of input information or data required for the digital control system.

The digital control system of the present invention considerably simplifies the complicated and considerable programming system previously required for preparing the input information or data. Input information or data may comprise that which indicates the kind of curve to be cut and the type of cutting operation to be undertaken, and that which indicates the magnitude and direction of offset of the cutter. These two types of input information or data may be applied to a pulse distributor through corresponding input data inputs. The pulse distributor calculates the corrected locus by offsetting in the required magnitude and direction from the curve to be cut. The pulse distribution is then undertaken in accordance with the corrected locus required for pulse distribution and in accordance with the curve required due to cutter offset and is accomplished by the pulse distributor in accordance with the calculations.

The digital control system of the present invention prepares numerical data to determine the cutting curve from the outer dimensions of the workpiece as indicated on the initial cutting drawing. The numerical data and other information and data are supplied to the pulse distributor through a first input data arrangement. Simultaneously, data indicating the magnitude and direction of the cutter offset, and any other necessary data, are supplied to the pulse distributor through a second input data arrangement. The calculation is then made on the basis of the supplied data to accord with the cutter offset and the corrected locus, and the pulse distributor distributes pulses in accordance with the calculation. The distributed pulses are then distributed to a digital servo system which controls the movement of the workpiece and cutting tool relative to each other.

The first input data arrangement for supplying the numerical data and other data to the pulse distributor may comprise, for example, an information storage and reproducing device such as, for example, a magnetic recording tape and magnetic readout head or a punched tape and perforation readout head. The second input data arrangement for supplying data to the pulse distributor may comprise, for example, a switchboard such as a dial switchboard with dial switches, a push-button switchboard with push buttons, or other suitable manual switchboard.

The digital control system of the present invention operates in four basic cutting patterns, although many other cutting patterns may be followed. The four basic cutting patterns may be combined and subdivided in various combinations, as will be hereinafter described, in accordance with the input data to the pulse distributor. The four basic cutting patterns are limited to the first quadrant of two dimensions X and Y, in order to maintain the clarity of the description.

Figure 8:
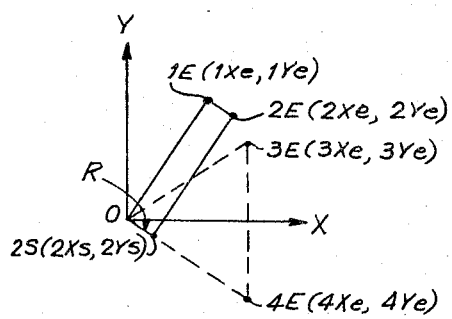
FIG. 8 is a graphical presentation of the first basic cutting pattern in which the digital control system of the present invention operates.

FIG. 8 illustrates the first of the four basic cutting patterns, which is a configuration including a straight line. The initial straight line extends from the origin to the point 1E, which has the coordinates $1Xe$, $1Ye$. The corrected locus of the initial straight line is the straight line which extends from a start point 2S to an end point 2E. The start point 2S has the coordinates $2Xs$, $2Ys$ and the end point 2E has the coordinates $2Xe$, $2Ye$. The corrected locus 2S, 2E is provided by offsetting the cutter of the machine tool a distance R from the initial locus OE, which is determined in accordance with numerical data supplied to the pulse distributor via the first input data arrangement.

After the initial locus OE is determined in accordance with the numerical data supplied to the pulse distributor via the first input data arrangement, pulse distribution is undertaken for the straight line O, 2S, which is the distance R required for offset of the cutter. Then, the pulse distribution is for the corrected locus 2S, 2E. The determination and pulse distribution is accomplished by first storing the data for the coordinates of the initial end point 1E in a register which stores data supplied to the pulse distributor via the first input data arrangement. The cutter offset magnitude R data is stored in the second input data arrangement. Then, the square $R^2$ of the cutter offset magnitude or distance R is calculated in the arithmetic circuit of the pulse distributor.

After the magnitude $R^2$ is calculated, pulses for the straight line O, 2S are distributed to the work platform moving motors, to move the work platform so that the axis or center of the cutter relative to the workpiece is offset by a distance equal to the magnitude R of the straight line O, 2S. The line O, 2S is perpendicular to the line O, 1E, so the pulse distribution for the line O, 2S is equivalent to the cutter offset magnitude R for a straight line O, 3E which extends from the origin to the end point 3E. The end point 3E, having coordinates $3Xe$, $3Ye$, is replaced by the end point 1E. Furthermore, as described with reference to FIGS. 3, 6 and 7, the pulse distribution may be accomplished by replacing coordinates, so that the pulses provided by the distribution for the line O, 3E may be considered as being in the positive X direction and in the negative Y direction.

If pulses are again distributed by the pulse distributor for the line O, 1E, after the pulse distribution for the line O, 2S to provide cutter offset is completed, the work platform may be directly controlled in its movement along the corrected locus 2S, 2E by the distribution pulses already provided, since the pulses for the cutter offset magnitude O, 2S have already been distributed. When the pulse distribution for the corrected locus 2S, 2E is completed, another pulse distribution may be undertaken for the line 2S, 2E, if necessary, and the axis or center of the cutter may be moved to the end point 1E of the line O, 1E. Since the work platform is thus moved an equal distance in the opposite direction from the cutter offset, the pulse distribution for the straight line 2E, 1E may be undertaken with the same component data as computed for the cutter offset O, 2S. The cutter offset may be accomplished by an operation which is the reverse of that described.

Figure 9:
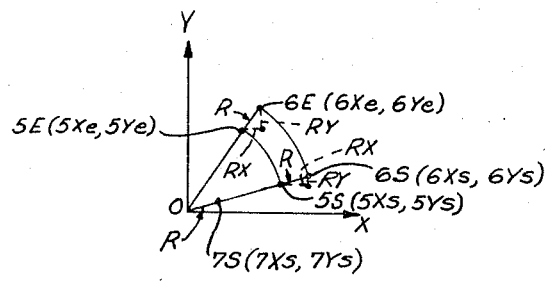
FIG. 9 is a graphical presentation of the second and third basic cutting patterns in which the digital control system of the present invention operates.

FIG. 9 illustrates the second of the four basic cutting patterns, which is a configuration including arcs. The initial arc to be cut is the arc 5S, 5E. The start point 5S has the coordinates $5Xs$, $5Ys$ and the end point 5E has the coordinates $5Xe$, $5Ye$. Distributing pulses offset the cutter by a magnitude R along the straight line 5S, 6S and pulses are then distributed for the corrected locus 6S, 6E has the coordinates $6Xs$, $6Ys$ and the end point 6E of the corrected locus has the coordinates $6Xe$, $6Ye$.

Data for the start point 5S and end point 5E of the initial arc 5S, 5E to be cut, and for the cutter offset magnitude R, is supplied to the pulse distributor via the first and second input data arrangements. As in the case of the straight line of FIG. 8, $R^2$ is calculated and the cutter offset is then provided. The cutter offset is accomplished by distributing pulses along the line O, 5S for only a distance R, equal to the offset magnitude, to the start point 7S. The start point 7S has coordinates $7Xs$, $7Ys$. The start point 6S and the end point 6E coordinates of the corrected locus 6S, 6E are then calculated. The coordinates $6Xs$, $6Ys$ of the start point 6S may be provided by simply adding or subtracting the results of the calculation for pulse distribution for cutter offset to or from the coordinates $5Xs$, $5Ys$ of the start point 5S. The coordinates $6Xe$, $6Ye$ of the end point 6E may be provided by adding or subtracting the results of the calculation for pulse distribution for cutter offset to or from the coordinates $5Xe$, $5Ye$ of the end point 5E.

After the start point 6S and the end point 6E of the corrected locus 6S, 6E are provided in the foregoing operations, pulses for the corrected locus 6S, 6E are distributed from said start point to said end point in the manner described with reference to FIG. 1. If pulses are distributed for the line segment 6E, 5E, as necessary, the axis of the cutter will return to the end point 5E of the initial arc 5S, 5E. The pulse distribution may be accomplished by utilization of the result of the calculation for the end point 2E (FIG. 8) of the corrected locus 2S, 2E of FIG. 8 in the same manner as in FIG. 8. The cutter offset direction may be reversed in the aforedescribed manner.

FIG. 9 also illustrates the third of the four basic cutting patterns, which is a configuration including an arc joined to another arc or to a straight line. The initial arc 5S, 5E of FIG. 9 is the arc to be cut and flows into another arc or line which is assumed to have been previously cut. Thus, the start point 5S of the initial arc, as well as the start point 6S of the corrected locus, each coincides with the corresponding end point of the previously cut arc or line and with the corrected locus thereof, respectively. The X and Y coordinates of the line segment 5S, 6S have thus been calculated for the previous cutting operation.

If the axis of the cutter has not yet been returned from the end point of the corrected locus to the end point of the arc or line, the axis of the cutter may be considered to be at the start point 6S of the corrected locus, because the cutter has already been offset. Thus, pulse distribution for cutter offset need not be provided. Only calculations for determining the start point 6S and the end point 6E of the corrected locus 6S, 6E need be undertaken, and as soon as such calculations are completed, pulses are immediately distributed for the correct locus 6S, 6E. The calculation for the determination of the start point 6S of the corrected locus is undertaken by adding or subtracting the X and Y coordinates, joining the end point of the corrected locus already cut, and the end point of the arc or line still to be cut to or from the start point 5S. This simplifies considerably the calculation for the determination of the start point 6S of the corrected locus, and, in fact, may be considered to eliminate such calculation. The pulses are distributed in the same manner when another arc is joined to and flows into the arc 5S, 5E.

When a straight line is connected to the arc 5S, 5E of FIG. 9, the aforedescribed cutter offset operation is dispensed with and pulses are distributed for the straight line starting at the end point 5E, since cutter offset has already been completed. The pulse distribution for the corrected locus is then undertaken in the aforementioned manner.

Figure 10:
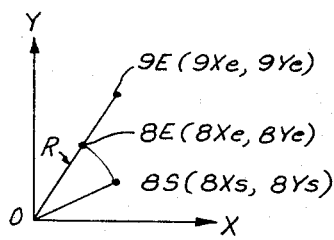
FIG. 10 is a graphical presentation of the fourth basic cutting pattern in which the digital control system of the present invention operates.

FIG. 10 illustrates the fourth of the four basic cutting patterns, which is a configuration including joined arcs. The fourth basic cutting pattern is utilized when the adjacent arcs and lines, previously cut, are not joined and do not flow into each other, so that the connecting arc of said fourth pattern is joined between and forms a continuous pattern with said adjacent arcs and lines. The fourth pattern arc thus functions as an additional bridging link. The bridging arc must have a radius magnitude equal to the magnitude R of the cutter offset. The axis of the arc is the origin and the arc extends from a start point 8S, having coordinates $8Xs$, $8Ys$, to an end point 8E, having coordinates $8Xe$, $8Ye$. The coordinates of the start and end points 8S and 8E, respectively, of the bridging arc 8S, 8E, are the same as the start or end points of the arcs or lines which are bridged by said bridging arc.

In FIG. 10, the axis of the bridging arc 8S, 8E is the same as the start and end points O of the lines and/or arcs to be bridged. The start point 8S of the bridging arc 8S, 8E is the same as the start or end point 8S of the corrected locus of one of the lines or arcs to be bridged, and the end point 8E of said bridging arc is the same as the start or end point 8E of the corrected locus of the other of the lines or arcs to be bridged. Accordingly the coordinates of the start point 8S may be provided from the X and Y coordinates of the cutter offset distance R, which coordinates have already been provided for the one line or arc to be connected. The cordinates of the end point 8E may be provided from the cutter offset calculation for the other line or arc to be connected, or from the start point of the corrected locus as described, or from the calculations for the determination of the coordinates of the start point of said other line or arc. This is especially so if the other line or arc to be connected is an arc. If the other line or arc to be connected is a straight line, the coordinates of the end point 8E may be provided from the coordinates of the end point of said other line by the cutter offset calculation. Pulses for the arc 8S, 8E, thus provided, may be distributed in the aforedescribed manner.

As previously mentioned, an advantage of the digital control system of the present invention is the considerable simplification of the programming system. This is due to the fact that numerical data is supplied via the first input data arrangement, cutter offset magnitude and direction are supplied via the second input data arrangement through separate supply arrangements. Since there is no need to prepare curve data to anticipate the magnitude of cutter offset, as in co-pending application Ser. No. 114,267, the numerical data supplied via the first input data arrangement may be determined directly from the work piece, as depicted in the cutting drawing provided. This greatly facilitates the determination of the numerical data.

Since the cutter offset magnitude is included with the data supplied via the second input data arrangement, and since the first and second input data arrangements are independent from each other, the data supplied via the first input data arrangement may be utilized even if the cutter diameter is changed because it is replaced or because it is worn or abraded. In the pulse distribution system of copending application Ser. No. 114,267, a change of the cutter diameter produces an error in the results, unless numerical data in the first input data arrangement is redetermined.

Various workpieces may be cut by utilization of the same data if the cutter offset magnitude and direction data are redetermined. If, for example, a press trimming die or gauge die is to be cut, either the male or the female counterpart die may be cut from the same numerical data, by providing either a positive cutter offset direction or a negative cutter offset direction. If the cutter offset magnitude is redetermined, the workpieces may be cut with dimensions which deviate from the initial cutting locus indicated by the numerical data. Other advantages of the digital control system of the present invention will be indicated in the following disclosure.

Figure 11:
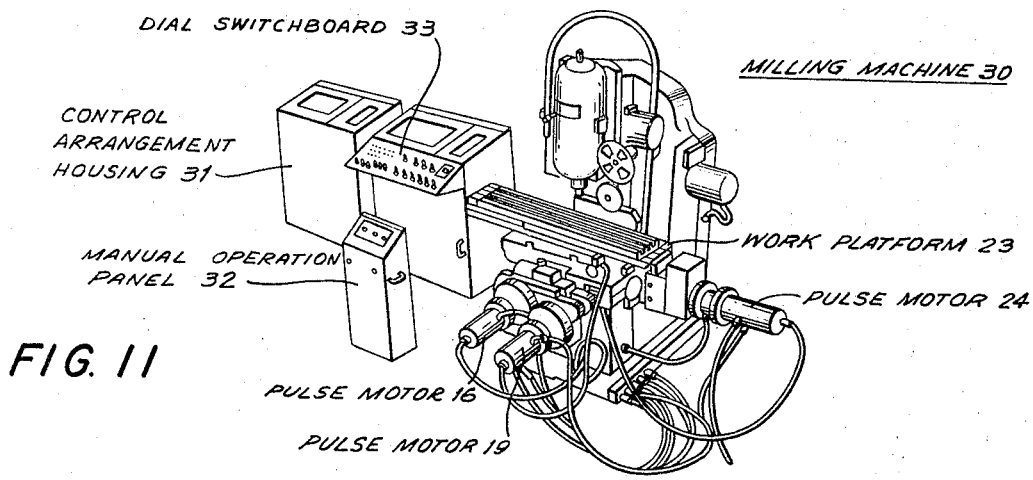
FIG. 11 is a perspective view of an embodiment of a milling machine which may be utilized with the digital control system of the present invention.

FIG. 11 illustrates a milling machine 30 which may be utilized with the digital control system of the present invention. The digital control system includes the control arrangement housing 31 and the manual operation panel 32, which include the aforediscussed control arrangement components such as the pulse distributor and the first and second input data arrangements. The work platform 23 (FIGS. 4 and 5) is moved in the directions of the X, Y and Z axes by the pulse motors 24, 19 and 16, respectively (FIGS. 4 and 5). The dial switchboard 33, which functions as the second input data arrangement, is included in the control arrangement and comprises a stop switch and a start switch.

FIG. 12 illustrates an embodiment of the digital control system of the present invention as utilized with a milling machine. In the digital control system of FIG. 12, the first input data arrangement comprises a tape readout device 34 and the second input data arrangement comprises the dial switchboard 33 (FIG. 11). A pulse distributor and control unit 35 is the principal component of the digital control system. The data provided by the tape readout device 34 and the data provided by the dial switchboard 33 are supplied to the pulse distributor and control unit 35, which distributes pulses to a motor driving unit 36. The pulse motor driving unit 36 energizes the pulse motors 24, 19 and 16 to position the work platform (FIGS. 4 and 5) in the X, Y and Z directions relative to the cutter of the milling machine 30 (FIG. 11). A machine control unit 37 is controlled via the pulse distributor and control unit 35 and functions to control the operation of the milling machine 30. The machine control unit 37 preferably controls the operation of the milling machine 30 in accordance with a code recorded in a tape in a suitable manner.

FIG. 13 tabulates the various codes utilized in the digital control system of the present invention. Although the codes utilized are eight unit or eight bit codes, since the eighth bit or unit I8 is not utilized, the codes are, for practical purposes, seven bit or seven unit codes. When an error is made in the perforated tape, all eight code bit or unit positions are perforated in order to eliminate the error. This is the only circumstance in which the eighth code bit position is perforated. This prevents the perforation of all eight bit positions from being considered an error when a parity check by even number is utilized.

In FIG. 13, the horizontal holes in the left-hand portion of each of the two columns under the headings I1, I2 I3, I4, I5, I6, I7 and I8 indicate the perforations in the tape and show the space relation between the perforations of a horizontal row. The right-hand portion of each of the two columns indicates the definition of each horizontal row of perforations.

The C code comprises eight signals C1, C2, C3, C4, C5, C6, C7 and C8 and is utilized to control the milling machine 30 (FIG. 12), for example, to stop and start the cutter oil feed system, to stop and start the axial rotation of the cutter, and so on. These control signals are thus not directly related to the invention and may be provided by any suitable source.

The D code comprises ten signals D0, D1, D2, D3, D4, D5, D6, D7, D8 and D9 representing decimal system numerals 0, 1, 2, 3, 4, 5, 6, 7, 8 and 9. The seventh bit position I7 of the code always indicates a space and the fifth bit position I5 always indicates a mark. Thus, the D code is in actuality a five bit code including the check bit I6. The D code is utilized in parallel form when it is read out from the tape readout device 34 and from the dial switchboard 33 (FIG. 12) and supplied to the input registers, hereinafter described. The D code is utilized in series form when it is transferred from the input register to arithmetic or computer circuits or to other registers.

The F code is utilized as a space code to identify two adjacent D codes when a plurality of D codes are continuously supplied as input data.

The G code comprises two signals GL and GR. The signal GL indicates that the workpiece 26 (FIGS. 4 and 5) is positioned to the left of the milling cutter 27 (FIGS. 4 and 5) facing toward the direction of movement of said cutter. The signal GR indicates that the workpiece 26 is positioned to the right of the milling cutter facing toward the direction of movement of said cutter. The signals GL and GR thus determine the diameter, offset and offset direction of the cutter. The function of the G code is explained hereinafter.

The H code comprises four signals H1, H2, H3 and H4 indicating the speed of distribution of pulses transferred from the pulse distributor and control unit 35 (FIG. 12) for milling machine control and for work platform movement speed control.

The J code comprises three signals XY, YZ and XZ. The J code signal XY indicates that the curve to be cut is in, and pulses are to be distributed to, the XY plane. The J code signal YZ indicates that the curve to be cut is in, and pulses are to be distributed to, the YZ plane. The J code signal XZ indicates that the curve to be cut is in, and pulses are to be distributed to, the XZ plane.

The K code comprises twelve signals KAI, KAII, KAIII, KAIV, KBI, KBII, KBIII, KBIV, KCI, KCII, KCIII and KCIV. The KA signals indicate a counterclockwise extending arc, KAI indicating that the arc is in the first quadrant, KAII indicating that the arc is in the second quadrant, KAIII indicating that the arc is in the third quadrant and KAIV indicating that the arc is in the fourth quadrant. The KB signals indicate a clockwise extending arc, KBI indicating that the arc is in the first quadrant, KBII indicating that the arc is in the second quadrant, KBIII indicating that the arc is in the third quadrant and KBIV indicating that the arc is in the fourth quadrant. The KC signals indicate a straight line, KCI indicating that the line is in the first quadrant, KCII indicating that the line is in the second quadrant, KCIII indicating that the line is in the third quadrant and KCIV indicating that the line is in the fourth quadrant.

The L code comprises four signals LA, LB, LC and LD, each indicating a different instruction. The signals LA, LB, LC and LD together encompass all the cutting patterns and simplify to a great extent the programming of the input data. The LA signal is utilized for instruction when the cutter offset has been previously provided. If the pattern to be cut is an arc, as shown in FIG. 9, extending from start point 5S to end pont 5E, the coordinates of the start point 6S of the corrected locus are determined by the addition or subtraction of the X, Y components of the cutter offset, which have been previously determined for the previously cut pattern, to or from the start point 5S. The coordinates of the end point 6E of the corrected locus are determined by the calculation for the determination of the cutter offset, hereinafter referred to as the offset calculation, utilizing the coordinates of the end point 5E of the initial arc 5S, 5E. When the coordinates 6Xs, 6Ys for the start point 6S and the coordinates 6Xe, 6Ye for the end point 6E are determined, pulse distribution is undertaken for the corrected locus. The pulse distribution is accomplished in the aforedescribed manner.

If the pattern to be cut is a straight line, as shown in FIG. 8, since the cutter offset has been previously determined for the previously cut pattern, the same pulse distribution as for the corrected locus 2S, 2E is provided if the X, Y coordinates of the cutter offset magnitude R, previously determined for the previously cut pattern, are stored and pulse distribution is undertaken for the line.

The LA signal is most frequently utilized for practical control purposes, so that unless the L code is specifically designated, the control arrangement operates in the same manner as if the LA signal is designated.

The LB signal is utilized when the offset calculation and the pulse distribution have been completed for a connecting or bridging arc which flows into and joins a pair of disconnected arcs or lines, as shown in FIG. 10. The LB signal controls the cutter offset operation and the cutter axis return to the initial pattern to be cut. If the pattern to be cut is an arc, as shown in FIG. 10 pulses are distributed in the aforedescribed manner for the arc 8S, 8E.

Figure 14:
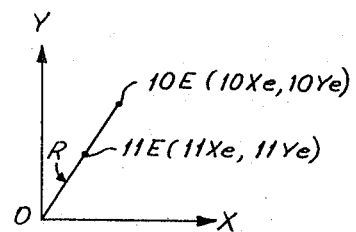
FIG. 14 is a graphical presentation of a cutting pattern which is controlled by the LB signal of the L code utilized with the digital control system of the present invention.

If the pattern to be cut is a straight line, as shown in FIG. 14, the offset calculation and the pulse distribution based on such calculation are undertaken in accordance with the LB signal. Thus, if the end point 10E coordinates 10Xe, 10Ye of a line O, 10E and the radius R of the cutter are provided, and the LB signal is applied, pulse distribution for the line O, 10E is provided for the line O, 11E, which extends from the origin for a length equal to the magnitude R of the cutter offset, so that pulse distribution for cutter offset may be provided. The pulses distributed for the line O, 11E may thus be utilized to return the offset axis of the cutter to the end point 10E of the line O, 10E to be cut by replacing coordinates so that the +X and +Y coordinates may be provided in the —X and —Y directions, respectively.

Figure 15:
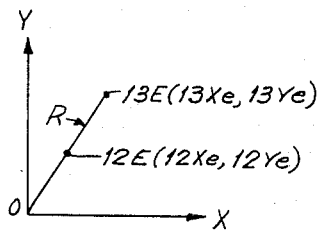
FIG. 15 is a graphical presentation of a cutting pattern which is controlled by the LC signal of the L code utilized with the digital control system of the present invention.

The LC signal is utilized when the cutter is moved from its rest position to the workpiece. Actually, this is a relative movement, because the cutter is fixed in position and the workpiece is moved relative to the cutter. As shown in FIG. 15, pulses corresponding to the cutter offset magnitude R are distributed in either the positive or negative direction on the straight line O, 12E from the end point 12E to the offset point 13E in accordance with the provided coordinates of the point 13E. The X coordinate RX and the Y coordinate RY of the cutter offset magnitude R (shown in FIG. 9) are calculated. Then, the coordinates 13Xe, 13Ye of the point 13E are determined by adding or subtracting the coordinates RX and RY to or from the coordinates 12Xe, 12Ye, of the end point 12E. Pulse distribution for the line O, 13E is then provided. The LC signal is utilized when the cutter is to be moved from its rest position simultaneously with the cutter offset operation.

Figure 16:
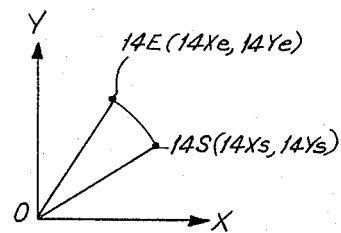
FIG. 16 is a graphical presentation of a cutting pattern which is controlled by the LD signal of the L code utilized with the digital control system of the present invention.
Figure 17:
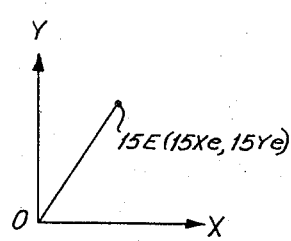
FIG. 17 is a graphical presentation of another cutting pattern which is controlled by the LD signal of the L code utilized with the digital control system of the present invention.

The LD signal is utilized when there is no cutter offset operation. As shown in FIGS. 16 and 17, the LD signal provides for the distribution of pulses for an arc 14S, 14E (FIG. 16) or for a straight line O, 15E (FIG. 17) which are provided as numerical data.

The M code is utilized to indicate that all the necessary control operations are completed.

Figure 18:
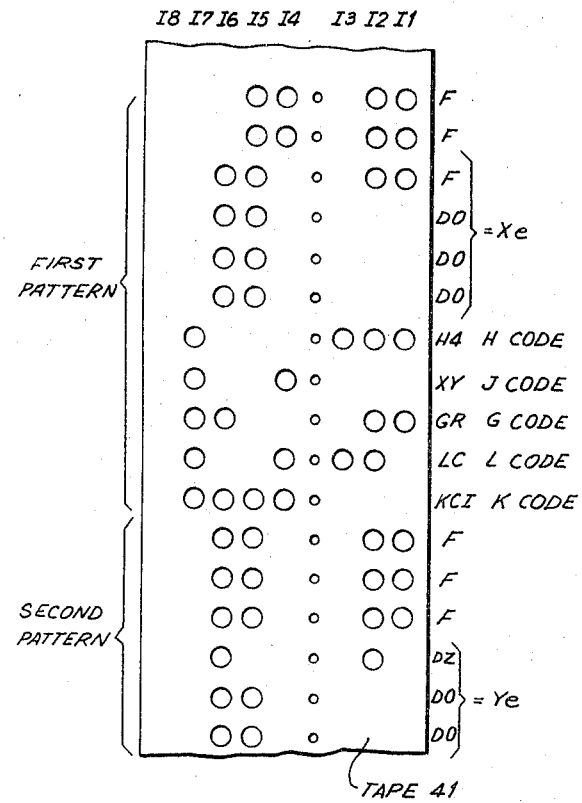
FIG. 18 is a diagram of an embodiment of a perforated tape which may be utilized to record digital data in the digital control system of the present invention.
Figure 19:
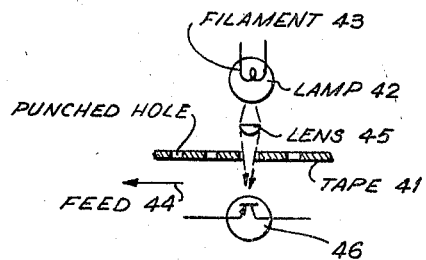
FIG. 19 is a view, partly in section, of an embodiment of a readout head which may be utilized in the tape readout device 34 of FIG. 12.
Figure 20:
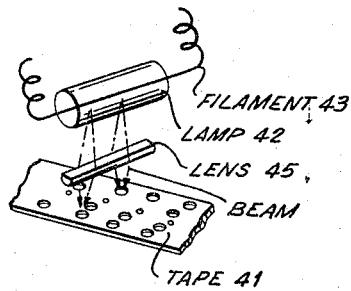
FIG. 20 is a perspective view of part of the readout head of FIG. 19.

The data transmitted to the pulse distributor via the first input data arrangement is recorded on a suitable storage device such as, for example, a perforated tape 41, as shown in FIG. 18. The tape 41, perforated with digital data, is passed through and read out by the tape readout device 34 (FIG. 12). FIGS. 19 and 20 illustrate a readout head for the tape 41. The readout head of FIGS. 19 and 20 is utilized in the tape readout device 34 of FIG. 12 and comprises an elongated lamp 42 positioned in operative proximity with the tape 41. The lamp 42 has an elongated substantially coaxially positioned filament 43. The lamp 42 is positioned transverse to the direction 44 in which the tape 41 is fed.

A semicylindrical section lens 45 is then positioned between the lamp 42 and the tape 41 and extends transverse to the direction 44 across the entire width of the tape and parallel with said lamp. The lens 45 functions to focus the light from the lamp 42 in a straight line across the tape 41, widthwise, so that one horizontal row of perforations of said tape is illuminated at a time. The tape 41 is perforated in the usual manner, with sprocket or feed perforations extending in the direction in which it is fed, and indicated by small circles, and with rows of data perforations transverse to the direction in which the tape is fed. Each width-extending row of perforations is indicated by larger circles and may comprise seven perforations. The perforations of each row are varied in number and position in order to indicate a determined code character or data.

A plurality of photoresponsive devices 46 such as, for example, photodiodes, are positioned on the other side of the tape 41 opposite the lamp 42. The photoresponsive devices 46 are nine in number, although only one is shown in FIG. 19, and are part of the tape readout device 34 of FIG. 12. The photoresponsive devices 46 correspond in number to the maximum number of perforations which may appear in each transverse row of perforations in the tape 41; each of the photoresponsive devices 46 being positioned in alignment with a corresponding one of the perforations in a transverse row of perforations in said tape and one of said devices being positioned in alignment with the feed perforations. Thus, when a perforation at a determined position in the tape 41 is fed past the lamp 42 and the lens 45, the photoresponsive device 46 corresponding to such perforations then responds to the light impinging thereon through the perforation and produces a suitable indication.

Figure 21:
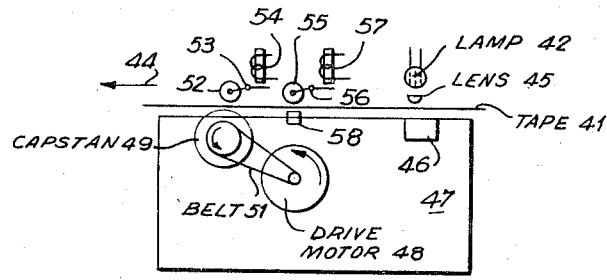
FIG. 21 is a side view of an embodiment of the tape readout device 34 of FIG. 12.

FIG. 21 shows a tape readout device which may be utilized as the tape readout device 34 of FIG. 12. A frame or plate 47 rotatably supports a drive motor 48 and rotatably supports a capstan or drive roller 49. The drive motor 48 is mechanically coupled to the capstan 49 by any suitable means such as, for example, a coupling belt 51 and drives said capstan, so that said capstan rotates about its axis. The perforated tape 41 may be fed from a supply spool (not shown) to a take-up spool (not shown) and is positioned in close proximity with the capstan 49 and the photoresponsive devices 46, said tape being positioned between said photoresponsive devices and the lens 45. The lens 45 and the lamp 42 are positioned by any suitable mounting means over the tape 41 opposite the photoresponsive devices 46.

A first pinch roller 52 is pivotally mounted about a pivot 53 and is movable into and out of contact with the tape 41 by a feed electromagnet 54. The first pinch roller 52 functions as a feed roller and abuts the tape 41 and moves said tape into driving contact with the capstan 49 when the feed electromagnet 54 is energized. A second pinch roller 55 is pivotally mounted about a pivot 56 and is movable into and out of contact with the tape 41 by a brake electromagnet 57. The second pinch roller 55 functions as a brake roller and abuts the tape 41 and moves said tape into braking contact with a brake shoe 58 when the brake electromagnet 57 is energized. The brake shoe 58 is positioned opposite the second pinch roller 55 on the other side of the tape 41 from said second pinch roller.

When the feed electromagnet 54 is energized and the brake electromagnet 57 is deenergized, the tape 41 is held in driving engagement between the capstan 49 and the first pinch roller 52 and is moved or fed by said capstan in the direction 44. When the brake electromagnet 57 is energized and the feed electromagnet 54 is deenergized, the tape 41 is held in braking engagement between the brake shoe 58 and the second pinch roller 55 and is stopped. A suitable energizing circuit (not shown in FIG. 21) is connected to the feed and brake electromagnets 54 and 57 to permit energization of only one of these electromagnets at a time. The capstan 49 is continuously rotated by the drive motor 48. When the tape 41 is moved in the direction 44 by the cooperative action of the capstan 49 and the first pinch roller 52, the data perforated in it is read out by the photoresponsive devices 46.

Figure 22:
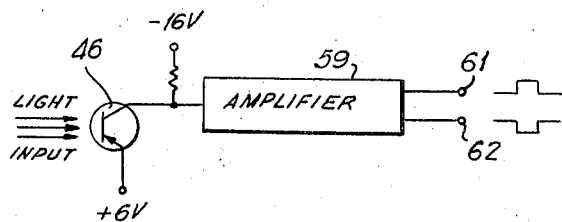
FIG. 22 is a block diagram of part of the tape readout device 34 of FIG. 12.

The output of each of the photoresponsive devices 46 is connected to a corresponding one of a plurality of amplifiers 59, as shown in FIG. 22. When light impinges upon any of the photoresponsive devices 46, each of which is suitably biased by +6 volts and —16 volts, it produces a discernible change in the output voltage of such device. The output voltage of the photoresponsive device 46 is amplified by the corresponding amplifier 59 which may comprise any suitable amplifier. Signals of opposite polarity are provided at the outputs 61 and 62 of each of the amplifiers 59, one of said signals such as, for example, the positive signal, indicating a tape perforation and the other signal indicating a non-perforation.

Figure 23:
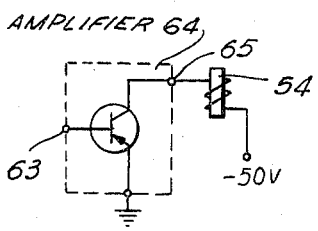
FIG. 23 is a circuit diagram of part of the tape readout device 34 of FIG. 12.

The feed electromagnet 54 and the brake electromagnet 57 of the tape readout device (FIG. 21) are controlled by signals provided by a control unit which is included with the pulse distributor in the pulse distributor and control unit 35 of FIG. 12. The control signals from the control unit are applied to the electromagnets after suitable amplification such as, for example, shown in FIG. 23, wherein a control signal to the feed electromagnet 54 is fed to the input terminal 63 of an amplifier 64 having an output terminal 65 connected to the winding of said electromagnet.

Figure 24A:
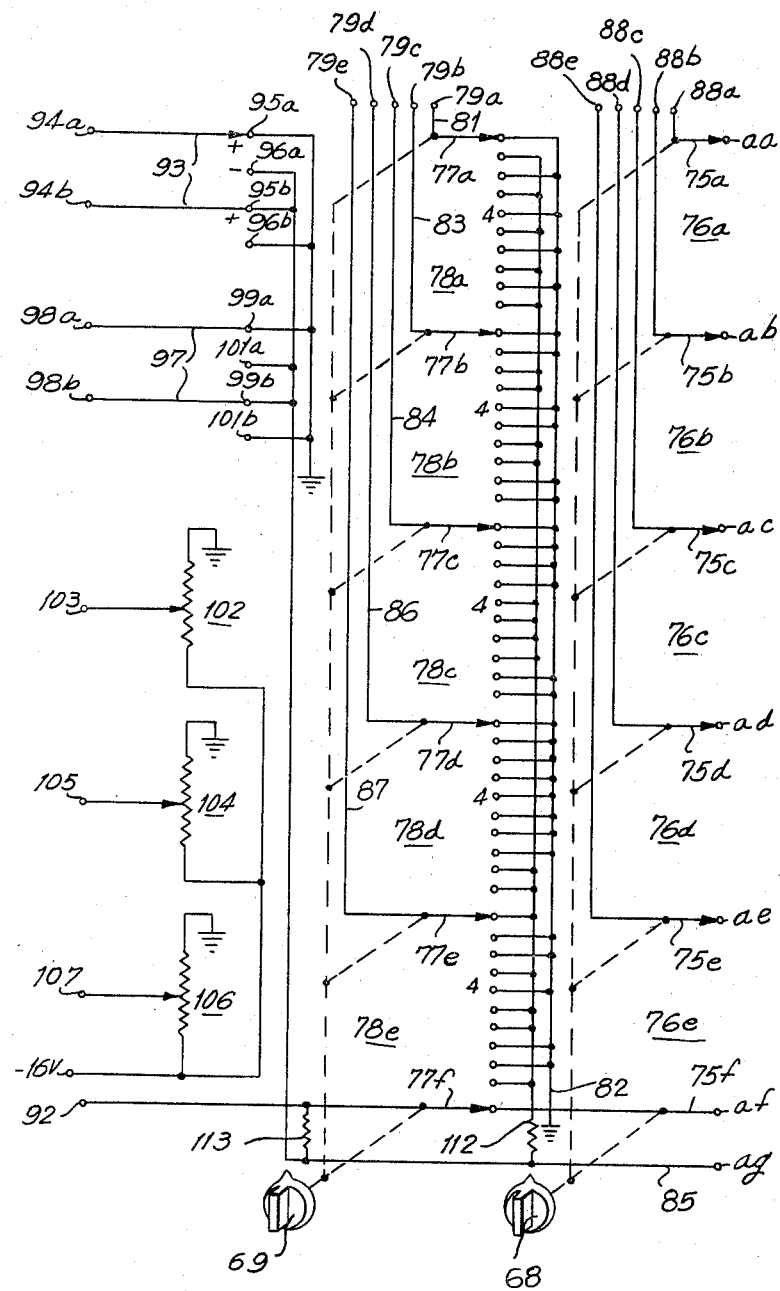
FIGS. 24a and 24b are a circuit diagram of an embodiment of the dial switchboard 33 of FIG. 12.
Figure 24B:
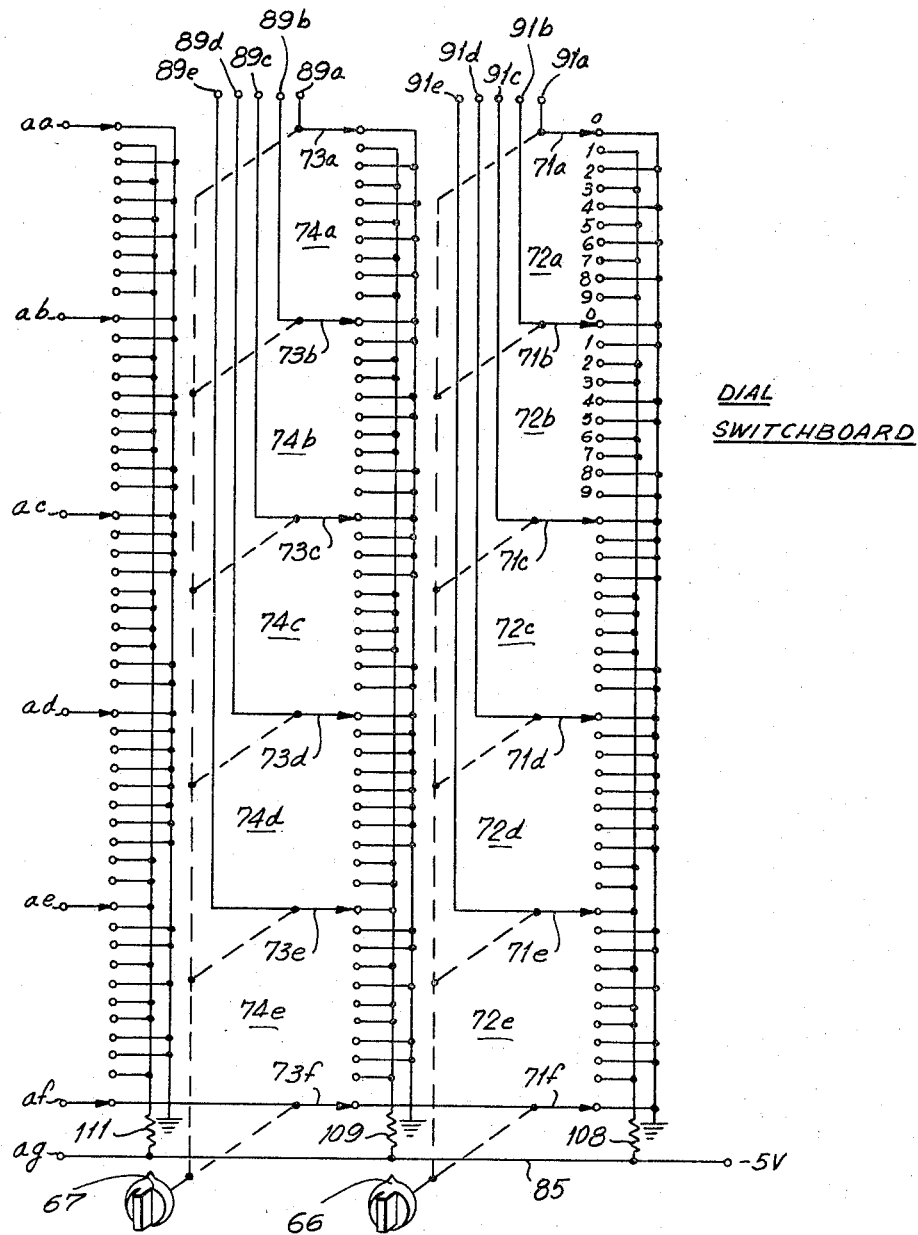

FIGS. 24a and 24b show the dial switchboard 33 of FIG. 12 which comprises the second input data arrangement for the transfer of data to the pulse distributor. The dial switchboard 33 comprises four rotary switches 66, 67, 68 and 69. Each of the rotary switches 66, 67, 68 and 69 comprises a bank of contacts and six wipers, each of the wipers co-operating with a corresponding one of six groups of said contacts. The rotary switch 66 thus controls six wipers 71a, 71b, 71c, 71d, 71e and 71f. The wiper 71a cooperates with a group 72a of ten contacts, the wiper 71b cooperates with a group 72b of ten contacts, the wiper 71c cooperates with a group 72c of ten contacts, the wiper 71d cooperates with a group 72d of ten contacts, the wiper 71e cooperates with a group 72e of ten contacts and the wiper 71f cooperates with a single contact. Similarly, the rotary switch 67 controls six wipers 73a, 73b, 73c, 73d, 73e and 73f, each except the wiper 73f cooperating with a corresponding one of five groups 74a, 74b, 74c, 74d and 74e of ten contacts; the rotary switch 68 controls six wipers 75a, 75b, 75c, 75d, 75e and 75f, each except the wiper 75f cooperating with a corresponding one of five groups 76a, 76b, 76c, 76d and 76e of ten contacts; and the rotary switch 69 controls six wipers 77a, 77b, 77c, 77d, 77e and 77f, each except the wiper 77f cooperating with a corresponding one of five groups 78a 78b, 78c, 78d and 78e of ten contacts.

Each of the four rotary switches 66, 67, 68 and 69 is normally adjusted to one of four digits indicating the cutter radius. Thus, if the highest order digit of the cutter radius magnitude is, for example, 4, the rotary switch 69 is adjusted to 4 and each of its controlled wipers 77a, 77b, 77c, 77d and 77e is moved thereby into electrical contact with the fourth contact of its corresponding contacts. At such time, output terminal 79a is connected to a point at ground potential via a lead 81, the wiper 77a, the number 4 contact of the group of contacts 78a and a ground lead 82. An output terminal 79b is then connected to a point at ground potential via a lead 83, the wiper 77b, the number 4 contact of the group of contacts 78b and the ground lead 82. An output terminal 79c is then connected to a —5 volt source via a lead 84, the wiper 77c, the number 4 contact of the group of contacts 78c and a —5 volt lead 85. An output terminal 79d is then connected to a point at ground potential via a lead 86, the wiper 77d, the number 4 contact of the group of contacts 78d and the ground lead 82. An output terminal 79e is then connected to a point at ground potential via a lead 87, the wiper 77e, the number 4 contact of the group of contacts 78e and the ground lead 82. The signals at the output terminals 79a, 79b, 79c, 79d and 79e are thus ground, ground, —5 volts, ground and ground, which is, in the aforedescribed D code, the number 4 or D4 signal (FIG. 13), the bit positions I1, I2, I3, I4 and I6 corresponding to the output terminals 79a, 79b, 79c, 79d and 79e, respectively.

The remaining rotary switches 66, 67 and 68 operate in the same manner as the rotary switch 69 to provide at their output terminals signals corresponding to the D code position for each digit to which the corresponding rotary switch is adjusted. Thus, the negative voltage output signal corresponds to the perforation of the D code bit, so that for "0," the "e" output terminal of the switch arrangement provides a —5 volt signal and the "a," "b," "c" and "d" output terminals are at ground potential. This corresponds to the D0 signal of the D code wherein there is only an I6 indication (FIG. 13). For "1," the "a" output terminal of the switch arrangement provides a —5 volt signal and the "b," "c," "d" and "e" output terminals are at ground potential. This corresponds to the D1 signal of the D code wherein there is only an I1 indication (FIG. 13). For "2," the "b" output terminal of the switch arrangement provides a —5 volt signal and the "a," "c," "d" and "e" output terminals are at ground potential. This corresponds to the D2 signal of the D code wherein there is only an I2 indication (FIG. 13). For "3," the "a," "b" and "e" output terminals of the switch arrangement provide a —5 volt signal and the "c" and "d" output terminals are at ground potential. This corresponds to the D3 signal of the D code wherein there are I1, I2 and I6 indications (FIG. 13).

The next highest order digit of the cutter radius number is similarly provided by the rotary switch 68 at output terminals 88a, 88b, 88c, 88d and 88e. The next lowest order digit of the cutter radius number is similarly provided by the rotary switch 67 at output terminals 89a, 89b, 89c, 89d and 89e. The lowest order digit of the cutter radius number is similarly provided by the rotary switch 66 at output terminals 91a, 91b, 91c, 91d and 91e. The signals provided in the "e" output terminals are parity bits. When the cutter radius is 00.00 a signal is provided at output terminal 92.

The rotary switch 69 indicates the tens digit, the rotary switch 68 indicates the units digit, the rotary switch 67 indicates the tenths digit and the rotary switch 66 indicates the hundredths digit. A reversing switch 93 provides an indication of the direction of the cutter offset by connecting output terminals 94a and 94b to either the positive terminals 95a and 95b or the negative terminals 96a and 96b. A reversing switch 97 provides an indication of the position of the cutter relative to the workpieces with reference to the start point by connecting output terminals 98a and 98b to either the positive terminals 99a and 99b to indicate that the cutter is on the left or the negative terminals 101a and 101b to indicate that the cutter is on the right.

A first potentiometer 102 produces a first control signal at output terminal 103. A second potentiometer 104 produces a second control signal at output terminal 105. A third potentiometer 106 produces a third control signal at output terminal 107. The first, second and third control signals are supplied to three feed pulse oscillators of the pulse distributor and control unit 35 (FIG. 12) which function to generate feed pulses. The negative potential contacts of the groups of contacts 72, 74, 76 and 78 are connected to the —5 volt lead 85 via resistors 108, 109, 111 and 112, respectively. A resistor 113 is connected between the —5 volt lead 85 and the output terminal 92.

Each of the electrohydraulic pulse motors 24, 19 and 16 functions as a servo or positioning motor, as described (FIGS. 4 and 5). Each electrohydraulic pulse motor comprises an electric stepping motor and an hydraulic drive motor. An electric stepping motor is shown in FIG. 25. The stepping motor of FIG. 25 is a twelve pole motor in which twelve steps constitute one revolution of the motor. A considerably greater number of poles, such as, for example, 120, may be utilized in a motor utilized in the digital control system of the present invention in order to improve the response characteristics of said motor.

The stator 114 comprises poles 115A, 115B, 115C, 116A, 116B and 116C for three phases A, B and C. Excitation in phase A produces the magnetic flux shown by broken lines in FIG. 25 and stops the rotor 117 in a position in which the poles 118A and 118B of the rotor are in alignment with the poles 115A and 116A of the stator 114, as shown in FIG. 25. Excitation in phase B rotates the rotor 117 one step in the counterclockwise direction and stops the rotor in a position in which the poles 119A and 119B of said rotor are in alignment with the poles 115B and 116B of the stator 114. Excitation in phase C rotates the rotor 117 one step further in the counterclockwise direction and stops the rotor in a position in which the poles 118A and 118B of said rotor are in alignment with the poles 115C and 116C of the stator 114.

The stepping motor of FIG. 25 thus rotates step by step in the counterclockwise direction when it is excited in the sequence A, B, C, A, B, C, and so on. When the stepping motor is excited in the sequence A, C, B, A, C, B, and so one, it rotates step by step in the clockwise direction.

The individual stepping motors of the corresponding electrohydraulic pulse motors 24, 19 and 16 (FIG. 12) are controlled by the pulse motor driving unit 36 (FIG. 12). The pulse motor driving unit 36 of FIG. 12 may comprise the circuit of FIG. 26, wherein the pulses ±X produced by the pulse distributor and control unit 35 are supplied via input terminals 121A and 121B to a ternary ring counter 122. The pulses ±Y produced by the unit 35 are supplied via input terminals 123A and 123B to a ternary ring counter 124. The pulses ±Z produced by the unit 35 are supplied via input terminals 125A and 125B to a ternary ring counter 126. The output pulses of the ternary ring counter 122 are supplied to the stepping motor of the pulse motor 24 via an amplifier 127. The output pulses of the ternary ring counter 124 are supplied to the stepping motor of the pulse motor 19 via an amplifier 128. The output pulses of the ternary counter 126 are supplied to the stepping motor of the pulse motor 16 via an amplifier 129.

The ternary ring counters 122, 124 and 126 supply the input pulses to the three terminals of each of the pulse motors 24, 19 and 16. The ternary ring counter 122 supplies the +X pulses at its input terminals 121A and 121B to the pulse motor 24 in the sequence A, B, C, A, B, C, and so on, and supplies the −X pulses to said pulse motor in the sequence A, C, B, A, C, B, and so on. The ternary ring counter 124 supplies the +Y pulses at its input terminals 123A and 123B to the pulse motor 19 in the sequence A, B, C, A, B, C, and so on, and supplies the −Y pulses to said pulse motor in the sequence A, C, B, A, C, B, and so on. The ternary ring counter 126 supplies the +Z pulses at its input terminals 125A and 125B to the pulse motor 16 in the sequence A, B, C, A, B, C, and so on, and supplies the −Z pulses to said pulse motor in the sequence A, C, B, A, C, B, and so on.

The hydraulic drive motor of each electrohydraulic pulse motor moves the work platform 23 (FIGS. 4 and 5) and the stepping motor of each electrohydraulic pulse motor controls the pilot valve of its corresponding hydraulic drive motor. FIG. 27 shows an electrohydraulic pulse motor which may be utilized as each of the pulse motors 24, 19 and 16. FIG. 28 is a perspective view of the motor of FIG. 27 shown in its casing. In FIG. 27, a stepping motor 131 of the type shown in FIG. 25, for example, controls the pilot valve of a hydraulic motor having an axial plunger type hydraulic drive and fixed displacement swash plates.

Hydraulic fluid under pressure is supplied to a fixedly mounted housing 132 from a source of hydraulic fluid 133 via an inlet conduit 134 and an outlet conduit 135. A coaxially rotatable cylinder or piston housing 136 is rotatably mounted on the fixedly mounted housing 132 for rotation about its axis by means of a bearing 137 and is keyed to an output shaft 138. The output shaft 138 is mounted for rotation about its axis in the housing 132 by means of a bearing 139. A pilot valve 141 is coaxially mounted for rotation about its axis in the housing 132 and extends into a sleeve 142 which is coaxially positioned with and keyed to the output shaft 138.

The pilot valve 141 has a plurality of flutes 143 extending in directions parallel to the axis so that when said pilot valve is rotated it opens either the inlet conduit 134 or the output conduit 135. A swash plate 144 is positioned around and transverse to the output shaft 138 and is mounted on side output shaft at an angle to the axis of said output shaft. A bearing 145 is coaxially mounted around the swash plate 144. A plurality of pistons 146, 147, and others not shown in FIG. 27, are equiangularly spaced from each other around the peripheral area of the cylinder 136 and extend in directions parallel to the axis of said cylinder. Each of the pistons 146, 147, and so on, is coaxially slidably positioned in a corresponding one of a plurality of piston cylinders 148, 149, and so on, for movement in a direction parallel to the axis of the cylinder 136.

Each of the piston cylinders 148, 149, and so on, is long enough to provide an hydraulic fluid space behind each of the pistons 146, 147, and so on, in said piston cylinders. The hydraulic fluid space in the piston cylinder 148 is connected by a radial duct 151 and radial ducts around the pilot valve 141 with the flutes 143 of said pilot valve, and the hydraulic fluid space in the piston cylinder 149 is connected by a radial duct 152 and radial ducts around said pilot valve with the flute 143 of said pilot valve corresponding thereto.

The stepping motor 131 is keyed to the pilot valve 141 via a coaxial shaft 153. The stepping motor 131 thus controls the rotation of the pilot valve 141 to control the supply of hydraulic fluid to various selected ducts of the hydraulic motor. When the hydraulic fluid pressure in the hydraulic fluid space of a piston cylinder is sufficiently great, the piston in such cylinder is urged against the swash plate 144. The force of the various pistons against the swash plate 144 rotates the cylinder 136 and the output shaft 138 about the common axis relative to the fixedly mounted housing 132.

The pistons 146, 147, and so on, are mounted in the rotatable cylinder 136 for driving the output shaft 138 and the pilot valve 141 is mounted in the fixedly mounted housing 132 for controlling the flow of hydraulic fluid in the hydraulic motor. The hydraulic motor is essentially a closed loop analog unit which is rotated as a result of rotation of the pilot valve 141. The pilot valve 141 is then rotated by a mechanical coupling to the angle to which the hydraulic motor is rotated. When the stepping motor 131 is a 120 pole motor and drives the pilot valve 141, however, the output shaft 138 rotates 3 degrees per pulse for each step of said stepping motor, due to the improved response characteristics of said stepping motor.

FIG. 29 shows the pulse distributor and control unit 35 of FIG. 12 and the tape readout device 34 and dial switchboard 33 which are connected to the inputs of said pulse distributor and control unit. The pulse distributor and control unit 35 comprises an input register 161 having inputs connected to the output of the tape readout device 34 via a lead 162 and to the dial switchboard 33 via a lead 163. The dial switchboard 33 is connected to the input of a feed pulse generator 164 via a lead 165. An output of the input register 161 is connected to the input of a decoder 166 via a lead 167 and an output of said input register is connected to an input of an H code register 168 via leads 169 and 171, to an input of a G code register 172 via the lead 169 and leads 173 and 174, to an input of an L code register 175 via the leads 169 and 173 and a lead 176, to an input of a J code register 177 via the leads 169 and 173 and a lead 178 and to an input of an arithmetic or computer circuit 179 via the leads 169 and 173.

The output of the decoder 166 is connected to an input of the H code register 168 via leads 181 and 182, to an input of the G code register 172 via the lead 181 and leads 183 and 184, to an input of the L code register 175 via the leads 181 and 183 and a lead 185, to an input of the J code register 177 via the leads 181 and 183 and a lead 186, to an input of a control unit 187 via the leads 181 and 183 and a lead 188 and to an input of a numerical data register 189 via the leads 181 and 183 and a lead 191. The output of the decoder 166 is also connected to an input of a first gate circuit 192 via the leads 181 and 183 and a lead 193. An output of the feed pulse generator 164 is connected to an input of the H code register 168 via a lead 194.

An output of the arithmetic or computer circuit 179 is connected to an input of the numerical data register 189 via a lead 195. The output of the register 189 is connected to an input of the arithmetic circuit 179 via a lead 196 and the lead 173 and to inputs of the registers 177, 175, 172 and 168 via the lead 173 and the leads 178, 176, 174 and 171, respectively. An output of the arithmetic circuit 179 is connected to an input of an operation control circuit 197 via a lead 198. An output of the operation control circuit 197 is connected to an input of the arithmetic circuit 179 via a lead 199 and an output of said operation control circuit is connected to an input of the control unit 187 via a lead 201. The output of the control unit 187 is connected to the tape readout device 34 via a lead 202.

The output of the decoder 166 is connected to an input of the operation control circuit 197 via the leads 181, 183 and 193 and a lead 203. The output of the feed pulse generator 164 is connected to an input of the operation control circuit 197 via a lead 204. The output of the register 172 is connected to an input of the operation control circuit 197 via a lead 205. The output of the register 175 is connected to an input of the operation control circuit 197 via a lead 206. The output or the register 177 is connected to an input of a second gate circuit 207 via a lead 208.

A time pulse generator 209 supplies a time pulse to the operation control circuit 197 via a lead 211. Outputs of the operation control circuit 197 are connected to inputs of the first gate circuit 192 via leads 212 and 213. Outputs of the first gate circuit 192 are connected to inputs of the second gate circuit 207 via leads 214, 215, 216 and 217. The distributed pulses of the pulse distributor and control unit 35 are provided at the output terminals of the second gate circuit 207. The +X distributed pulses are provided at output terminal 218A and the —X distributed pulses are provided at output terminal 218B. The +Y distributed pulses are provided at output terminal 219A and the —Y distributed pulses are provided at output terminal 219B. The +Z distributed pulses are provided at output terminal 221A and the —Z distributed pulses are provided at output terminal 221B.

FIG. 30 shows a time pulse generator which may be utilized as the time pulse generator 209 of the pulse distributor and control unit 35 of FIG. 29. The time pulses produced by the time pulse generator control the various operations involved in the pulse distribution function of the pulse distributor and control unit. The time pulse generator of FIG. 30 comprises a clock or time pulse source, a frequency divider and a plurality of gates. In FIG. 30, a crystal oscillator 222 and a blocking oscillator 223 connected in the output of said crystal oscillator function as the clock or time pulse source and produce clock or time pulses at, for example, 200 kilocycles per second. The clock pulses are provided in a lead 224 and at an output terminal 225 via a lead 226.

The frequency divider of FIG. 30 comprises a five stage binary counter comprising flip flops 227, 228, 229, 231 and 232 and functions to divide the frequency or repetition rate of the clock pulses from 200 kilocycles per second to five series of square wave pulses having frequencies of 100 kilocycles per second, 50 kilocycles per second, 25 kilocycles per second, 12.5 kilocycles per second and 6.25 kilocycles per second, respectively. The five series of square wave pulses are suitably gated by various combinations of gates 233, 234, 235, 236, 237, 238 and 239 to provide the square wave pulses in synchronism at output terminals 241, 242, 243, 244, 245 and 246.

FIG. 31 illustrates the various clock or time pulses provided by the time pulse generator 209 of FIGS. 29 and 30. Curve A of FIG. 31 shows the clock pulses provided at the output terminal 225 of the time pulse generator of FIG. 30. Curve B of FIG. 31 shows the clock pulses provided at the output terminal 246 of the time pulse generator of FIG. 30. Curve C of FIG. 31 shows the clock pulses provided at the output terminal 245 of the time pulse generator of FIG. 30. Curve D of FIG. 31 shows the clock pulses provided at the output terminal 244 of the time pulse generator of FIG. 30. Curve E of FIG. 31 shows the clock pulses provided at the output terminal 243 of the time pulse generator of FIG. 30. Curve F of FIG. 31 shows the clock pulses provided at the output terminal 242 of the time pulse generator of FIG. 30. Curve G of FIG. 31 shows the clock pulses provided at the output terminal 241 of the time pulse generator of FIG. 30.

The clock pulses provided at the output terminal 246 of FIG. 30 are utilized to control the sequence cycles of a selection counter 247 and a first selection control counter 248, as hereinafter described. These clock pulses provide with the clock pulses at the output terminal 225 the standard synchronous control for the pulse distributor and control unit 35. The clock pulses at the output terminal 246 have a repetition rate or frequency of 6.25 kilocycles per second. Each of the clock pulses provided at the output terminal 245 of FIG. 30 represents a numerical value of +1. Each of the clock pulses provided at the output terminal 244 of FIG. 30 represents a numerical value of —1. These clock pulses may also be utilized to eliminate overflow in the full adder, as hereinafter described.

The clock pulses provided at the output terminal 243 of FIG. 30 are utilized as parity or check bits for parity checking to check out data or information errors in the tape readout device 34, the arithmetic circuit 179 and other components of the pulse distributor and control unit 35 of FIG. 29. The clock pulses provided at the output terminal 242 of FIG. 30 are sign bits indicating polarity and are utilized to determine whether a numerical value is positive or negative. The clock pulses provided at the output terminal 241 of FIG. 30 are utilized to control the output of numerical data from the input register 161 (FIG. 29) in the form of series pulses, as hereinafter described. The AND gate 237 is connected to the output terminal 244 via a NOT circuit 249.

FIG. 32 shows a control unit which may be utilized as the control unit 187 of FIG. 29. The control unit of FIG. 32 controls the starting and stopping of the entire pulse distributor and control unit and the starting and stopping of the tape readout device 34. Those components of the control unit 187 which control the milling machine, lathe and other machinery and which test the machinery are not shown in FIG. 32. A signal or "1" is indicated by ground potential and a no signal or "0" is indicated by a potential of —5 volts.

In FIG. 32, when a push-button start switch 251 is closed by being manually depressed, a relay 252 is energized via the lower arm of said switch and closes its armature 252A to close a self holdin gcircuit to ground through said armature. When the start switch 251 is released, a relay 253 is energized via the armature 252B of the relay 252, which is closed due to the energization of the relay 252, and the upper arm of said switch. Since the relay 252 remains energized through its self holding circuit, its armature 252C is closed, so that when the relay 253 is energized and closes its armature 253A, a terminal 254 is connected to a point at ground potential via said armatures 252C and 253A so that "1" signal is provided at said terminal. This provides a readout of the magnitude of the radius or diameter of the cutting tool or cutter in a manner hereinafter described.

After the cutter offset magnitude R is read out from the dial switchboard 33, an AA signal is supplied to a terminal 255 and sets a flip flop 256 via a lead 257, an AND gate 258, a lead 259, an OR gate 261 and a lead 262. The AA signal is utilized to indicate that the cutter offset magnitude R has been read out from the dial switchboard 33. The flip flop 256 provides a "1" signal at a terminal 263 and said signal initiates the readout of information or data from the tape by the tape readout device 34 via the electromagent 54 of FIG. 21. If a K code signal (FIG. 13) is read out from the tape by the tape readout device 34, said K code signal is supplied to a terminal 264 and resets the flip flop 256 via a lead 265, an OR gate 266, a lead 267, an AND gate 268, an OR gate 269 and a lead 271. The flip flop 256 then provides a "0" signal at a terminal 272 and said signal terminals the readout of information or data from the tap by the tape readout device 34 via the brake electromagnet 57 of FIG. 21, to which said terminal 272 is connected.

When a K code signal (FIG. 13) is read out, the arithmetic circuit 179 (FIG. 29) makes the necessary calculation, as herinafter described, and pulses are distributed in accordance with the results of such calculation. The work platform 23 (FIGS. 4 and 5) is then moved in accordance with the distributed pulses. Upon completion of the necessary controls, the AA signal is again supplied to the terminal 255 and the operation is repeated. When all the necessary controls have been completed, an M code signal (FIG. 13) is supplied to a terminal 273, or a push-button stop switch 274 is closed by being manually depressed. When the stop switch 274 is closed, it energizes a relay 275. When the relay 275 is energized, the armature 275A of said relay opens and thereby de-energizes the relays 252 and 253 by opening the self holding circuit of the relay 252 and the energizing circuit of the relay 254. The operation of the tape readout device 34 is then stopped.

The tape readout device 34 is also stopped in operation when a C code signal (FIG. 13) is supplied to a terminal 276, or a tape stop switch 277 is moved in a clockwise or downward direction. The C code signal is utilized for supplemental controls of the milling machine such as, for example, control of the cutter oil feed system, axial rotation of the cutter, and others, as hereinbefore mentioned. When such supplemental controls are accomplished by data or information recorded in the tape, the readout of data from the tape is terminated by the C code signal upon completion of such readout.

Upon completion of the necessary controls, and after the tape readout device 34 has been stopped in operation by the M code signal, an AB signal is supplied to a terminal 278, or is provided by a switch 279 and functions to initiate operation of the tape readout device. The AB signal is utilized to indicate that all the necessary control operations are completed and that operation is to be reinstituted. The AB signal triggers a monostable multivibrator 281 via a flip flop 282 and said monostable multivibrator 283 sets the flip flop 256 via a lead 283, the OR gate 261 and the lead 262 to initiate operation of the tape readout device 34 by providing a "1" signal at the terminal 263 which is connected to and energizes the feed electromagnet 54 (FIG. 21).

FIGS. 33a and 33b show an input register which may be utilized as the input register 161 of FIG. 29. The input register of FIGS. 33a and 33b comprises seven flip flop register stages 284, 285, 286, 287, 288, 289 and 291 and is able to register or store 7 bit or 7 unit information or data. Input pulses are supplies to the inputs of the flip flops 284, 285, 286, 287, 288, 289 and 291 via a plurality of gates 292, 293, 294, 295, 296, 297, 298, 299, 301, 302, 303, 304, 305, 306, 307, 308, 309, 311, 312, 313, 314, 315, 316, 317, 318, 319 and 321 and a plurality of OR gates 322, 323, 324, 325 and 326. The outputs of the flip flop register stages are provided at output terminals 327A, 328A, 329A, 331A, 332A, 333A and 334A and at output terminals 327B, 328B, 329B, 331B, 332B, 333B and 334B.

The flip flop registers 284, 285, 286, 287, 288 and 289 are connected in series. Thus, when a first blocking oscillator 335 is operated, the flip flops 284, 285, 286, 287, 288 and 289 function as a shift register to produce an output from the lowest stage flip flop 284 in the form of series pulses. The first blocking oscillator 335 is connected to each of the flip flops via a lead 336. The input register may be utilized as a shift register only when numerical data is read out from the tape. Numerical data is indicated in a 5 bit or 5 unit code including a check bit and is read out from the tape 41 (FIG. 18) and supplied to the input register by the tape readout device 34 or the dial switchboard 33 (FIG. 29) in parallel form.

Since series data is required for the calculations in the pulse distributor and control unit, the parallel data must be converted to series data in the output of the input register 161. The 5 unit code is thus read into the first to fifth flip flops 284, 285, 286, 287 and 288 and the check bit is read into the sixth flip flop 289.

A second blocking oscillator 337 is connected to each of the flip flops via lead 338 and is controlled by signals from the selection counter 247 and the first selection control counter 248, as hereinafter described, or by an AC signal which represents a sprocket hole and is supplied to said oscillator via an input terminal 339, a lead 341, an AND gate 342 and an OR gate 343. The AC signal is provided in accordance with the feeding of the tape 41 (FIG. 18) as a tape feeding signal by the tape readout device 34 (FIG. 29). The first blocking oscillator 335 is operated when an AD signal is supplied to said oscillator via an input terminal 344 and a lead 345. The AD signal is utilized to indicate that the flip flops are to be shifted in condition. The first blocking oscillator 335 thus causes the flip flops to provide output numerical data in series.

The selection counter 247 determines whether the data read out from the tape by the tape readout device 34 or the data from the dial switchboard 33 is read into the registers. The selection counter 247 operates in six cycles to produce first, second, third, fourth, fifth and sixth signals 247A, 247B, 247C, 247D, 247E and 247F, in the corresponding cycles, which are controlled by the clock pulses produced by the time pulse generator 209 (FIG. 29) at the output terminal 246 (FIG. 30), by a third signal from the first selection control counter 248, and by a signal from a register of the operation control circuit 197, as hereinafter described. The pulses from the time pulse generator are supplied to an input terminal 346, the signal from the first selection control counter 248 is supplied to an input terminal 347 and the signal from the operation control circuit 197 is supplied to an input terminal 348. The input terminals 346, 347 and 348 are connected to the selection counter 247 via leads 349, 351, 352 and 353, AND gates 354 and 355, an OR gate 356 and a lead 357.

The highest magnitude of the cutter radius or diameter, as indicated by the D code and stored in the dial switchboard 33, is read into the input register of FIGS. 33a and 33b during the first cycle of operation of the selection counter 247, and the second, third and fourth highest magnitudes of the cutter radius or diameter, as indicated by said D code and stored in said dial switchboard, are read into the input register in the second, third and fourth cycles of operation, respectively. The data or information read out from the tape 41 (FIG. 18) by the tape readout device 34 are read into the input register in the fifth cycle of operation of the selection counter 247. The input terminals 419A to E, 426A to E, 433A to E, 439A to E, 411A to E, 417, 446 and 448 of FIGS. 33a and 33b are connected to the output terminals 79a to e, 88a to e and 91a to e of FIGS. 24a and 24b.

FIG. 34 shows a selection counter which may be utilized as the selection counter 247 of FIGS. 33a and 33b. The selection counter of FIG. 34 comprises three flip flops 358, 359 and 361. If the clock pulses from the time pulse generator 209 (FIG. 29) are supplied to the input terminal 346 at the same time that a "1" signal is supplied to either the input terminal 347 from the selection control counter 248 or the input terminal 348 from the operation control circuit 197, a "1" signal is transferred successively during the first to sixth cycles of operation of the selection counter 247. The selection counter 247 is initially set for operation to provide the first signal 247A during the first cycle of operation, as shown in FIG. 34. In the first, second, third and fourth cycles of operation, an AE signal is produced by the flip flop 361 of the selection counter and is provided at an output terminal 362 via a lead 363. In the fifth cycle of operation, an AF signal is produced by the flip flops 358 and 361 of the selection counter and is provided at an output terminal 364 via leads 365, 366 and 367, an AND gate 368 and a lead 369. In the sixth cycle of operation, an AG signal is produced by the flip flops 358 and 361 and is provided at an output terminal 371 via the leads 365, 366 and 367, the AND gate 368 and leads 372 and 373. The AG signal is fed to AND gates 374 and 375 via a lead 376 and thereby switches said AND gates to their conductive conductive condition.

The sixth signal of the selection counter is not indicated in FIGS. 33a, 33b or 34. An 8th bit or 8th unit of the data is not stored in the input register 161 (FIG. 29), but is transferred directly to the decoder 166 (FIG. 29) via a lead 377, an AND gate 378, leads 379, 381 and 382 and output terminals 383A and 383B (FIG. 33a). In FIGS. 33a and 33b, in the first cycle of operation, the selection counter 247 supplies the first signal to the AND gate 297 via leads 384A and 385, to the AND gate 304 via leads 384A and 386, to the AND gate 309 via leads 384A and 387, to the AND gate 315 via leads 384A and 388 and to the AND gate 321 via the lead 384A. In the second cycle of operation, the selection counter 247 supplies the second signal to the AND gate 296 via leads 384B and 389, to the AND gate 303 via leads 384B and 391, to the AND gate 308 via leads 384B and 392, to the AND gate 314 via leads 384B and 393 and to the AND gate 319 via the lead 384B.

In the third cycle of operation, the selection counter 247 supplies the third signal to the AND gate 295 via leads 384C and 394, to the AND gate 302 via leads 384C and 395, to the AND gate 307 via leads 384C and 396, to the AND gate 313 via leads 384C and 397 and to the AND gate 318 via the lead 384C. In the fourth cycle of operation, the selection counter 247 supplies the fourth signal to the AND gate 294 via leads 384D and 398, to the AND gate 301 via leads 384D and 399, to the AND gate 306 via leads 384D and 401, to the AND gate 312 via leads 384D and 402 and to the AND gate 317 via the lead 384D. In the fifth cycle of operation, the selection counter 247 supplies the fifth signal to the AND gate 293 via leads 384E and 403, to the AND gate 298 via leads 384E and 404, to the AND gate 299 via leads 384E and 405, to the AND gate 305 via leads 384E and 406, to the AND gate 311 via leads 384E and 407 and to the AND gate 316 via the lead 384E.

In FIGS. 33a and 33b, the signal from the first selection control counter 248 supplied to the second blocking oscillator 337 is supplied via an input terminal 408, an AND gate 409 and the OR gate 343 to said second blocking oscillator. The AND gates 293, 294, 295, 296 and 297 are connected to input terminals 411A, 411B, 411C, 411D and 411E, respectively, which transmit signals to said AND gates via leads 412, 413, 414, 415 and 416, respectively. The AND gate 298 is connected to an input terminal 417 which transmits signals to said AND gate via a lead 418. The AND gates 299, 301, 302, 303 and 304 are connected to input terminals 419A, 419B, 419C, 419D and 419E, respectively, which transmit signals to said AND gates via leads 421, 422, 423, 424 and 425, respectively. The AND gates 305, 306, 307, 308 and 309 are connected to input terminals 426A, 426B, 426C, 426D and 426E, respectively, which transmit signals to said AND gates via leads 427, 428, 429, 431 and 432, respectively. The AND gates 311, 312, 313, 314 and 315 are connected to input terminals 433A, 433B, 433C, 433D and 433E, respectively, which transmit signals to said AND gates via leads 434, 435, 436, 437 and 438, respectively. The AND gates 316, 317, 318, 319 and 321 are connected to input terminals 439A, 439B, 439C, 439D and 439E, respectively, which transmit signals to said AND gates via leads 441, 442, 443, 444 and 445, respectively.

The AND gate 292 is connected to an input terminal 446 which transmits signals to said AND gate via a lead 447 and the AND gate 378 is connected to an input terminal 448 which transmits signals to the AND gate 378 via the lead 377. In the fifth cycle of operation, the selection counter 247 supplies the fifth signal to each of the AND gates 292 and 378 via the lead 384E, a lead 449 and leads 451 and 452.

In FIG. 34, a control pulse such as, for example, a clock pulse from the time pulse generator of FIG. 30, is supplied to the flip flop 358 via a terminal 453 and to the flip flop 361 via a terminal 454. The first, second, third, fourth and fifth signals supplied by the selection counter 247 (FIG. 33a) to the leads 384A, 384B, 384C, 384D and 384E, respectively, are supplied via AND gates 455, 456, 457 and 458 and via the lead 366.

FIGS. 35a and 35b show a decoder which may be utilized as the decoder 166 of the pulse distributor and control unit of FIG. 29. The decoder of FIGS. 35a and 35b comprises a plurality of gates 461 to 469, 471 to 479 481 to 489, 491 to 499, 501 to 509, 512 and 513, a plurality of OR gates 514 to 519 and 521, and a plurality of NOT circuits 522 to 529, 531 to 539 and 541.

Each NOT circuit in FIGS. 35a and 35b and in the preceding and succeeding figures is indicated by a block with a diagonal line running from one corner to the diagonally opposite corner and produces at its output a signal which has a phase or polarity opposite to that of the signal supplied to its input. The decoder of FIGS. 35a and 35b functions to identify the type of data or information stored in the registers from the signals produced by the input register 161 (FIG. 29) at its output terminals 227A, 228A, 229A, 231A, 232A, 233A and 234A and 227B, 228B, 229B, 231B, 232B, 233B and 234B (FIGS. 33a and 33b).

If, for example, data or information stored in one of the registers is in the K code, such K code data is indicated by signals in the output terminals 331B, 332A and 334A plus 329A, 332A and 334A of FIGS. 33a and 33b, and the corresponding input terminals of FIG. 35a. The K code signals are provided via the AND gates 488 and 489, the OR gate 522, a lead 542 and an output terminal 543 (FIG. 35b). D code data is indicated by signals in the output terminals 328B, 329B, 332A and 334A plus 331B, 332A and 334A of FIGS. 33a and 33b and corresponding input terminals of FIG. 35a. The D code signals are provided via the AND gates 485, 486 and 487, the OR gate 524 and a lead 544. The other codes are provided in a similar manner as the D code.

When a D code signal is provided and the first selection control counter 248 is in its second cycle, as hereinafter described, a second signal from said counter is supplied to the AND gate 513 via an input terminal 545 and said AND gate is switched to its conductive condition. The output signal from the AND gate 513 is supplied to a flip flop 546 via a lead 547 and sets said flip flop. The flip flop 546 then provides an AH signal at an output terminal 548 via a lead 549. The flip flop 546 is reset by a fourth signal 248C from the first selection control counter 248 when said counter is in its fourth cycle of operation. Thus, the AH signal is provided only when a D code signal is stored in the input register 161 (FIG. 29) and the first selection control counter 248 is in its second cycle of operation. The second signal from the first selection control counter 248 is also supplied to the AND gate 512 via an input terminal 552 and to the AND gate 499 via an input terminal 553.

AI and AJ signals are provided at output terminals 554 and 555 (FIG. 35b) and are utilized to change coordinates, as hereinafter described. J code signals are provided at output terminals 556 and 557. M code signals are provided at an output terminal 558. K code signals are provided at output terminals 559, 561, 562, 563, 564, 565, 566, 567, 568, 569, 571 and 572, as well as the output terminal 543. C code signals are provided at output terminals 573 and 574. F code signals are provided at an output terminal 575. L code signals are provided at an output terminal 576. G code signals are provided at an output terminal 577. H code signals are provided at an output terminal 568. The C code signals are also provided at an output terminal 579 and the K code signals are also provided at an output terminal 581.

FIG. 36 shows a numerical data register which may be utilized as a register unit of the register 189 of the pulse distributor and control unit 35 of FIG. 29. The register 189 of FIG. 29 is a numerical data register comprising nine register units of the type of FIG. 36. The numerical data register unit of FIG. 36 comprises a delay line 582 such as, for example, a delay line comprising nickel and other material. When an input pulse is supplied to the delay line 582 via input terminals 583 and 584, leads 585 and 586, an AND gate 587, an OR gate 588, a monostable multivibrator 589 and an amplifier 591, such pulse is read out by an amplifier 592 through said delay line after a determined period of time.

If an AND gate 593 is then in its conductive condition due to signals being supplied thereto via leads 594 and 595 from input terminals 596 and 597 and via a lead 598, the input pulse is continually circulated through the circuit until said AND gate is switched to its non-conductive condition. The input pulse thus circulates through the AND gate 593, the OR gate 588, the monostable multivibrator 589, the amplifier 591, the delay line 582, the amplifier 592, a flip flop 599, a flip flop 601 and the lead 598 until said AND gate is switched to its non-conductive condition. The stored pulse signal may be read out from the delay line 582 at any time and provided in an output lead 602 via the flip flop 599, leads 603 and 604 and an AND gate 605 when said AND gate is in its conductive condition, or the signal may be read out and provided in an output lead 606 via the flip flop 599, the lead 603 and an AND gate 607 when the AND gate 607 is in its conductive condition. Clock pulses from the time pulse generator 209 (FIG. 29) are supplied to input terminals 608, 609 and 611 of FIG. 36 to control the operation of the monostable multivibrator 589 and the flip flops 599 and 601.

FIG. 37 shows a G code register which may be utilized as the register 172 of the pulse distributor and control unit 35 of FIG. 29. The register 172 of FIG. 29 is a G code register. The G code register of FIG. 37 stores G code signals read into the input register 161. The G code register of FIG. 37 comprises a flip flop 612, two AND gates 613 and 614 and an OR gate 615.

When the decoder 166 reads out a G code signal, it supplies a GL signal or a GR signal (FIG. 13) to the flip flop 612 via input terminals 616A or 616B and 617A or 617B. The G code signal is either positive or negative dependent upon whether it is indicative of the fact that the workpiece 26 is positioned to the left of the cutter 27 (FIGS. 4 and 5) facing toward the direction of movement of said cutter, in which case it is a GL signal, or the workpiece is positioned to the right of the cutter facing toward the direction of movement of the cutter, in which case it is a GR signal. This determines the offset direction of the cutter.

If the cutter offset magnitude R is indicated as positive in the dial switchboard 33 (FIG. 29), and supplied to input terminal 618, the signal provided at output terminal 619 is positive. If the cutter offset distance R is indicated as negative in the dial switchboard 33 (FIG. 29), and supplied to input terminal 619, the signal provided at the output terminal 621 is negative. The cutter offset direction signals stored in the dial switchboard 33 (FIG. 29) are thus related to the G code signals GR and GL as follows.

| G code signal | Cutter offset direction signal | |
| --- | --- | --- |
| | Positive | Negative |
| GL | + | − |
| GR | − | + |

The G code signal is supplied to an input terminal 622 from the output terminal 577 of the decoder of FIGS. 35a and 35b. The G code signal supplied to the input terminal 622 is supplied to a Schmitt trigger 623 and controls the operation of the flip flop 612 via a lead 624 and leads 625 and 626.

FIG. 38 shows an H code register which may be utilized as the register 168 of the pulse distributor and control unit 35 of FIG. 29. The register 168 of FIG. 29 is an H code register. The H code register of FIG. 38 controls the speed of pulse distribution thereby controlling the speed of movement of the work platform 23 (FIGS. 4 and 5). The H code register of FIG. 38 comprises flip flops 627 and 628, gates 629, 631, 632, 633, 634, 635, 636 and 637 and an OR gate 638. The H code signals (FIG. 13) are supplied to input terminals 639, 641, 642 and 643. The H code signals supplied to the input terminals 639 and 641 are fed to the flip flop 627 and set said flip flop and the H code signals supplied to the input terminals 642 and 643 are fed to the flip flop 628 and set said flip flop. The H code signals are preceded by a signal which indicates that H code signals are stored in the input register 161 (FIG. 29).

The AND gates 634 to 637 controlled by the flip flops 627 and 628, select frequencies from the first, second, third and fourth frequencies supplied at input terminals 644A, 644B, 644C and 644D from the feed pulse generator 164 (FIG. 29). The selected frequencies are provided as a feed pulse AK at an output terminal 645. An input terminal 646 is provided. The AND gates 634 to 647 are in their conductive condition only when an AL signal is supplied to an input terminal 647. The AL signal is utilized to indicate that the pulse distribution is not completed, and is fed to each of the gates 634, 635, 636 and 637 via a lead 648. When the AL signal is zero, the completion of the pulse distribution is indicated and the gates are switched to their non-conductive condition. A feed pulse AK is then no longer provided at the output terminal 645.

An AM signal supplied to the input terminal 646 is fed to the lead 648 via a lead 649 and an AND gate 651, and the AL signal supplied to the input terminal 647 is fed to the lead 648 via a lead 652 and said AND gate. The signal preceding the H code signals which indicates that the H code signals are stored in the input register 161 (FIG. 29) is supplied to an input terminal 653 and is fed to the flip flops 627 and 628 via a monostable multivibrator 654 and a lead 655.

FIG. 39 shows a feed pulse generator which may be utilized as the feed pulse generator 164 of FIG. 29. The feed pulse generator of FIG. 39 comprises four blocking oscillators which produce four different frequencies. A first oscillator 656 produces a first frequency, a second oscillator 657 produces a second frequency, a third oscillator 658 produces a third frequency and a fourth oscillator 659 produces a fourth frequency. The frequencies produced by the first, second and third oscillators 656, 657 and 658, are varied by variation of the output voltages of the potentiometers 102, 104 and 106 of the dial switchboard (FIG. 24a), which voltages are supplied to input terminals 103, 105 and 107, respectively, of FIG. 39. The voltage applied to the input terminal 103 is applied to the first oscillator 656 via a lead 661, the voltage applied to the input terminal 105 is applied to the second oscillator 657 via a lead 662, and the voltage applied to the third oscillator 658 via a lead 663.

The first, second and third frequencies, provided at the output terminals 644A, 644B and 644C, respectively, are utilized when the cutter is performing actual strokes and are 10 to 500 pulses per second. The fourth frequency, provided at the output terminal 644D, is utilized for very rapid movement. The control voltage for the fourth oscillator 659 is provided by the third signal of a second selection control counter, hereinafter described, which is supplied to an input terminal 664, the first signal of the first selection control counter 248, hereinafter described, which is supplied to an input terminal 665 and the AM signal, which is supplied to an input terminal 666. These signals are supplied to the fourth oscillator 659 via leads 667, 668 and 669, an AND gate 671 and a lead 672. When the control voltage in the lead 672 is —5 volt, the fourth oscillator 659 commences oscillation at 150 pulses per second. As the control voltage in the lead 672 is varied to zero volt, the frequency produced by the fourth oscillator 659 increases until it stabilizes at 1,000 pulses per second.

FIG. 40 shows a J code register which may be utilized as the register 177 of the pulse distributor and control unit 35 of FIG. 29. The register 177 of FIG. 29 is a J code register. The J code register of FIG. 40 indicates in which of the planes XY, YZ and XZ the pulses are to be distributed (FIG. 13). The J code register of FIG. 40 comprises flip flops 673 and 674 and AND gates 675, 676 and 677. The J code signals are supplied to input terminals 678, 679, 681 and 682. The J code signals supplied to the input terminals 678 and 679 are fed to the flip flop 673 and set said flip flop and the J code signals supplied to the input terminals 681 and 682 are fed to the flip flop 674 and set said flip flop.

The J code signals are preceded by a signal which indicates that J code signals are stored in the input register 161 (FIG. 29) and which is supplied to an input terminal 683 and is fed to the flip flops 673 and 674 via a Schmitt trigger 684 and a lead 685. The J code signal indicating that the pulses are to be distributed in the XY plane is provided at an output terminal 686. The J code signal indicating that the pulses are to be distributed in the XZ plane is provided at an output terminal 687. The J code signal indicating that the pulses are to be distributed in the YZ plane is provided at an output terminal 68͡

FIG. 41 shows an L code register which may be utilized as the register 175 of the pulse distributor and control unit 35 of FIG. 29. The register 175 of FIG. 29 is an L code register. The L code register of FIG. 41 indicates by an L code signal LA (FIG. 13) that the cutter offset has been previously provided and by an L code signal LB (FIG. 13) that the offset calculation and the pulse distribution have been completed for a connecting or bridging arc which flows into and joins a pair of disconnected arcs or lines. The L code signal LB controls the cutter offset operation and the cutter axis returns to the initial pattern to be cut. The L code register of FIG. 41 indicates by an L code signal LC (FIG. 13) that the cutter is to be moved from its rest position relative to the workpiece simultaneously with the cutter offset operation and by an L code signal LD (FIG. 13) that there is no cutter offset operation.

The L code register of FIG. 41 comprises flip-flops 689 and 691 and AND gates 692, 693, 694 and 695. The L code LA signal is provided at an output terminal 696, the LB signal is provided at an output terminal 697, the LC signal is provided at an output terminal 698 and the LD signal is provided at an output terminal 699. A signal is provided at an output terminal 701 when either the LA or the LB signal is provided at the corresponding output terminals.

The L code signals are supplied to input terminals 702, 703, 704 and 705. The L code signals supplied to the input terminals 702 and 703 are fed to the flip-flop 689 and set said flip flop and the L code signals supplied to the input terminals 704 and 705 are fed to the flip flop 619 and set said flip flop. The L code signals are preceded by an L code signal which indicates that L code signals are stored in the input register 161 (FIG. 29) and which is supplied to an input terminal 706 and is fed to the flip flops 689 and 691 via a Schmitt trigger 707 and a lead 708.

When there is no cutter offset or the cutter offset is zero, an AN signal is supplied to the flip flops 689 and 691 which indicates that the cutter offset is zero. The zero offset signal is supplied to the flip flops 689 and 691 from the output terminal 92 of FIG. 24a via an input terminal 709, a lead 711, and AND gate 712 and a lead 713. An input signal is also supplied to the gate 712 via an input terminal 714. An AO signal, which indicates that the pulse distribution is completed, is fed to each of the flip flops 689 and 691 to reset said flip flops. The AO signal is fed to the flip flops 689 and 691 via an input terminal 715, a lead 716, an AND gate 717 and a lead 718. The zero offset signal supplied to the input terminal 709 is fed to the AND gate 717 via a NOT circuit 719 and a lead 721.

The L code signal LA is provided when the flip flops 689 and 691 are in their reset condition. When no L code signal is provided, the flip flops 689 and 691 are also in their reset condition.

FIGS. 42a, 42b and 42c show an arithmetic or computer circuit which may be utilized as the arithmetic circuit 179 of FIG. 29. The arithmetic circuit of FIGS. 42a, 42b and 42c comprises a full adder 722, a complementary circuit 723, a two bit delay line 724, two one bit delay lines 725 and 726, a plurality of AND gates 727, 728, 729, 731, 732, 733 and 734, and a plurality of OR gates 735, 736, 737 and 738. The gates 727, 728, 729, 731, 732, 733 and 734 are controlled by signals supplied to input terminals 739, 741, 742, 743, 744, 745 and 746, respectively, from gate control circuits, as hereinafter described.

FIG. 43 shows a one bit delay circuit which may be utilized as each of the one bit delay lines 725 and 726 of FIG. 42c. The one bit delay circuit of FIG. 43 comprises a flip flop 747 and a NOT circuit 748. A clock pulse from the time pulse generator 209 (FIGS. 29 and 30) is supplied to the flip flop 747 via an input terminal 749. The output signal provided at an output terminal 751 is the input signal supplied to an input terminal 752 delayed by one bit, which is equal to the duration of one clock pulse. The one bit delay provided by the one bit delay circuit of FIG. 43 is the equivalent of a double calculation in a binary computation.

FIG. 44 shows a two bit delay circuit which may be utilized as the two bit delay line 724 of FIG. 42c. The two bit delay circuit of FIG. 44 comprises two flip flops 753 and 754 and a NOT circuit 755. A clock pulse from the time pulse generator 209 (FIGS. 29 and 30) is supplied to the flip flops 753 and 754 via an input terminal 756. The output signal provided at an output terminal 757 is the input signal supplied to an input terminal 758 delayed by two bits, which is equal to the duration of two clock pulses. The two bit delay provided by the two bit delay circuit of FIG. 44 is the equivalent of a quadruple calculation in a binary computation.

FIG. 45 shows a complementary circuit which may be utilized as the complementary circuit 723 of FIG. 42c. The complementary circuit of FIG. 45 functions to reverse the sign or polarity of a binary signal supplied to an input terminal 759 so that the signal provided at an output terminal 761 has a polarity which is opposite to that of the signal supplied to said input terminal. The input signal supplied to the input terminal 759 is fed via a lead 762 to a NOT circuit 763 and is fed from said NOT circuit to an AND gate 764 via a NOT circuit 765 and directly to AND gates 766 and 767 via leads 768 and 769.

The gates 764 and 766 are connected to the output terminal 761 via an OR gate 771 and a lead 772. A "1" signal is supplied to an input terminal 773 and is fed to each of the AND gates 764 and 767 via a lead 774, and OR gate 775 and leads 776 and 777. The "1" signal is fed to the AND gate 766 via a NOT circuit 778. The signal provided by the AND gate 767 is fed back to the OR gate 775 via a lead 779 and a one bit delay line 781.

FIG. 46 is a full adder which may be utilized as the full adder 722 of FIG. 42c. The full adder of FIG. 46 functions to add two binary input signals supplied to input terminals 782 and 783 to produce a sum which is provided as a sum signal at an output terminal 784. The input signal supplied to the input terminal 782 is fed to an AND gate 785 via a lead 786, a NOT circuit 787 and a lead 788, is fed to an AND gate 789 via the lead 786 and a lead 791, is fed to an AND gate 792 via the lead 786, the NOT circuit 787, the lead 788 and the lead 793, and is fed to each of AND gates 794, 795 and 796 via the leads 786 and 791, and leads 797 and 798, 799 and 801, respectively.

The input signal supplied to the input terminal 783 is fed to the AND gate 785 via leads 802 and 803, is fed to the AND gate 789 via the lead 802, a NOT circuit 804 and a lead 805, is fed to the AND gate 792 via the lead 802, the NOT circuit 804, the lead 805 and a lead 806, and is fed to each of the AND gates 794 and 795 and AND gate 807 via the leads 802 and 803, and leads 808 and 809, 811, and 812, respectively. The AND gates 785, 789, 792 and 794 are connected to the output terminal 784 via an OR gate 813 and a lead 814. The AND gates 795, 807 and 796 are connected to the AND gates 785, 789, 792, 794, 807 and 796, for transferring a carry, via an OR gate 815, a lead 816, a one bit delay line 817 and a NOT circuit 818 and leads 819 and 821, the NOT circuit 818, the lead 819 and a lead 822, a lead 823, leads 823 and 824, leads 825 and 826, and leads 825 and 827, respectively.

The arithmetic circuit of FIGS. 42a, 42b and 42c includes a parity bit circuit 831 connected to the full adder 722. FIG. 47 shows a parity bit circuit which may be utilized as the parity bit circuit 831 of FIG. 42c. The parity bit circuit of FIG. 47 comprises three AND gates 832, 833 and 834, two OR gates 835 and 836 and a flip flop 837. The signal indicating the sum provided at the output terminal 784 of the full adder (FIG. 46) is supplied to an input terminal 838 and the number of pulses in said signal are counted by the flip flop 837. Clock pulses from the time pulse generator 209 (FIG. 29) are supplied to the flip flop 837 via an input terminal 839.

The parity or check bits are supplied to the AND gate 834 via an input terminal 841 and a lead 842. The parity bits are provided by the time pulse generator (FIGS. 29 and 30) at the output terminal 243. The clock pulses provided by the time pulse generator (FIGS. 29 and 30) at the output terminal 246 at 6.25 kilocycles per second are supplied to an input terminal 843 and are fed from the input terminal 843 to the flip flop 837 via a lead 844, the OR gate 835 and a lead 845. If there is an odd number of pulses in the sum indicating signal supplied to the input terminal 838, the AND gate 834 is switched to its conductive condition by the flip flop 837 via a lead 846 and adds one of the parity bits to such odd number of pulses. Thus, an even number of pulses is provided at the output terminal 847 in an error detection signal AP. The signal AP is utilized to detect errors in an even number parity checking circuit, as hereinafter described, when errors occur in calculations. The signal AP is supplied as an input pulse to the input terminal 584 of the numerical data register of FIG. 36.

The arithmetic circuit of FIGS. 42a, 42b and 42c includes a pair of parity checking circuits 848A and 848B. FIG. 48 shows a parity checking circuit which may be utilized as each of the parity checking circuits 848A and 848B of FIGS. 42a, 42b and 42c. The parity checking circuit of FIG. 48 comprises three AND gates 849, 851 and 852 and two flip flops 853 and 854. Parity bits are supplied to an input terminal 855. Clock pulses from the time pulse generator 209 (FIG. 29) are supplied to the flip flop 853 via an input terminal 856 and to the flip flop 854 via an input terminal 857.

The flip flop 853 functions as a binary counter and counts the number of pulses in an input signal supplied to said flip flop via an input terminal 858, leads 859 and 861, the AND gates 849 and 851 and leads 862 and 863. When there is an odd number of pulses in the input signal supplied to the input terminal 858, the gate 852 is switched to its conductive condition and transfers a parity bit from the input terminal 855 to the flip flop 854. The parity bit sets the flip flop 854 and thereby provides a warning signal at an output terminal 864. The warning signal AQ at the output terminal 864 indicates and confirms the occurrence of an error in the input signal supplied to the input terminal 858. The warning signal provided at the output terminal 864 may also be utilized to suspend further tape readout operations. The error warning signals AQ provided by the parity checking circuit 848A of FIG. 42c are supplied to the OR gate 266 of the control unit of FIG. 32 via an input terminal 864a, a lead 864b, an OR gate 864c and a lead 864d. The error warning signals AQ provided by the parity checking circuit 848B of FIG. 42c are supplied to the OR gate 266 of the control unit of FIG. 32 via an input terminal 864e, a lead 864f, the OR gate 864c and the lead 864d.

The arithmetic circuit 179 (FIG. 29) is connected to the numerical data register 189 (FIG. 29). The numerical data register 189 comprises nine register units, each comprising the numerical data register of FIG. 36, for example. The nine register units 865A, 865B, 865C, 865D, 865E, 865F, 865G, 865H and 865J are included in FIGS. 42a, 42b and 42c, as is the input register 161 (FIG. 29). The inputs to the register units 865A, 865B, 865C, 865D, 865E, 865F, 865G, 865H and 865J comprise input AND gates 866 and 867, 868 and 869, 871 and 872, 873 and 874, 875 and 876, 877 and 878, 879 and 881, 882 and 883, and 884 and 885, respectively, and OR gates 886, 887, 888, 889, 891, 892, 893, 894 and 895, respectively.

The error detection signal AP provided by the parity bit circuit 831 is provided at an output terminal 896 and in a lead 897 via an OR gate 898 and is stored in the register units. The input gates, which control the transfer of the error detection signal AP to the register units, are controlled by signals from gate control circuits, as hereinafter described, and supplied to input terminals 899, 901, 902, 903, 904, 905, 906, 907, 908, 909, 911, 912, 913, 914, 915, 916, 917 and 918.

Numerical data stored in each register unit 865A, 865B, 865C, 865D, 865E, 865F, 865G, 865H and 865J is transferred via the output leads 602 and 606 to the arithmetic circuit. The data stored by the register unit 865A may comprise the X coordinate of the start point of a cutting pattern. The data stored by the register unit 865B may comprise the Y coordinate of the start point of the cutting pattern. The data stored by the register unit 865C may comprise the X coordinate of the end point of the cutting pattern. The data stored by the register unit 865D may comprise the Y coordinate of the end point of the cutting pattern. The data stored by the register unit 865E may comprise the coordinates of the pulse distribution point. The data stored by the register unit 865F may comprise the differences between the X coordinates of the end point and the pulse distribution point of the cutting pattern and the differences between the Y coordinates of the pulse distribution point and the end point of the cutting pattern. The data stored by the register units 865G, 865H and 865J relates to the cutter offset distance R.

The outputs of the register units 865A, 865B, 865C, 865D, 865E, 865F, 865G, 865H and 865J are fed to the output lead 602 via output AND gates 919, 921, 922, 923, 924, 925, 926, 927 and 928, respectively, and to the output lead 606 via output AND gates 929, 931, 932, 933, 934, 935, 936, 937 and 938, respectively. The output gates are controlled by signals from gate control circuit, as hereinafter described, and supplied to input terminals 939, 941, 942, 943, 944, 945, 946, 947, 948, 949, 951, 952, 953, 954, 955, 956, 957 and 958. The output of the register unit 865A is fed back to the AND gate 867 via a one bit delay line 959, the output of the register unit 865B is fed back to the AND gate 869 via a one bit delay line 961, the output of the register unit 865C is fed back to the AND gate 872 via a one bit delay line 962, the output of the register unit 865D is fed back to the AND gate 874 via a one bit delay line 963, the output of the register unit 865E is fed back to the AND gate 876 via a one bit delay line 964, the output of the register unit 865F is fed back to the AND gate 878 via a one bit delay line 965, the output of the register unit 865G is fed back to the AND gate 881 via a one bit delay line 966, the output of the register unit 865H is fed back to the AND gate 883 via a one bit delay line 967, and the output of the register unit 865J is fed back to the AND gate 885 via a one bit delay line 968.

The AL signal indicating that the pulse distribution is not completed is supplied via an input terminal 969 and a lead 971 to an AND gate 972 and controls said AND gate to enable a signal to be supplied via an input terminal 973, a lead 974, said AND gate, a lead 975, a lead 976 and leads 977, 978, 979, 981, 982 and 983 to the input gates 867, 869, 872, 874, 876 and 878. A signal is supplied to the input gates 881 and 883 via an input terminal 984 and leads 985 and 986 and the signal is supplied to the input gate 885 via an input terminal 987 and a lead 988. The signals indicating the sum are provided by the full adder 722 at output terminals 989 and 991 via leads 992 and 993 and are supplied to the parity bit circuit 831 via a one bit delay line 994 and a lead 995. The signals indicating the sum are also supplied by the full adder 722 to the OR gate 898 via the delay line 994, a lead 996 and an AND gate 997. A negative "1" signal is supplied to the AND gate 997 via an input terminal 998. The carry of the full adder 722 is transferred via a lead 999 from its output to its input.

In most cases, the pulses are increasingly damped as they pass through the arithmetic circuit and the register units (FIGS. 42a, 42b and 42c). The output sum indicating pulses from the arithmetic circuit are thus compensated for damping in the one bit delay line 994 and restored in the register units 865A, 865B, 865C, 865D, 865E, 865F, 865G, 865H and 865J via the lead 897. The delay lines 959 and 961 to 968 of the individual register units also function to compensate for damping. The negative "1" signal or "−1" signal supplied to the AND gate 997 controls said gate to transfer the signal indicating the sum from the full adder 722 and thereby controls the output from the arithmetic circuit.

FIGS. 49a, 49b and 49c show an operation control circuit which may be utilized as the operation control circuit 197 of FIG. 29. The operation control circuit of FIGS. 49a, 49b and 49c comprises the first selection control counter 248, a second selection control counter 1001, a third selection control counter 1002 and a fourth selection control counter 1003. Each of the first, second, third and fourth selection control counters 248, 1001, 1002 and 1003 operates in first, second, third and fourth cycles of operation to provide first, second, third and fourth signals in the corresponding cycles of operation. The first selection control counter 248 provides first, second, third and fourth signals 248A, 248B, 248C and 248D at its output terminals 1004A, 1004B, 1004C and 1004D, respectively. The second selection control counter 1001 provides first, second, third and fourth signals 101A, 101B, 101C and 1001D at its output terminals 1005A, 1005B, 1005C and 1005D, respectively. The third selection control counter 1002 provides first, second, third and fourth signals 1002A, 1002B, 1002C and 1002D at its output terminals 1006A, 1006B, 1006C and 1006D, respectively. The fourth selection control counter 1003 provides first, second, third and fourth signals 1003A, 1003B, 1003C and 1003D at its output terminals 1007A, 1007B, 1007C and 1007D, respectively.

The operation control circuit comprises five flip flop registers 1008, 1009, 1011, 1012 and 1013. Input terminals 1014 and 1015 are connected to a flip flop 1016 and said flip flop is connected to a flip flop 1017 and to an AND gate 1018. The flip flop 1017 is connected to the AND gate 1018 and said AND gate is connected to a lead 1019 via a lead 1021. An input terminal 1022 is connected to the lead 1019. The AC signal, which is the sprocket hole or tape feeding signal, is supplied to the input terminal 1022. The lead 1019 is connected to AND gates 1023 and 1024 via leads 1025 and 1026. An input terminal 1027 is connected to an AND gate 1028 via a lead 1029 and an input terminal 1031 is connected to said AND gate via a lead 1032. The AE signal is supplied to the input terminal 1031. An input terminal 1033 is connected to the AND gate 1024 via a lead 1034 and the first signal from the second selection control counter 1001 is supplied to said AND gate via an input terminal 1035 and a lead 1036. The square $R^2$ of the cutter offset magnitude is supplied to the input terminal 1035.

The second signal from the second selection control counter 1001 is supplied to an AND gate 1037 via an input terminal 1038 and a lead 1039. The first signal from the third selection control counter 1002 is supplied to the AND gate 1037 via an input terminal 1041 and a lead 1042. The AND gates 1028, 1023, 1024 and 1037 are connected to a flip flop 1043 via an OR gate 1044 and a lead 1045. An input terminal 1046 is connected to an AND gate 1047 via a NOT circuit 1048 and a lead 1049. The AND gate 1047 is connected to the flip flop 1043 via a lead 1051. The input terminal 1046 is also connected to an AND gate 1052 via the NOT circuit 1048 and a lead 1053.

An input terminal 1054 is connected to an AND gate 1055 via a lead 1056. The square $R^2$ of the cutter offset magnitude is supplied to the input terminal 1054. The AND gate 1052 is connected to the AND gate 1055 via leads 1057 and 1058 and to an AND gate 1059 via the lead 1057 and a lead 1061. The first signal from the first selection control counter 248 is supplied to the AND gate 1052 via an input terminal 1062 and a lead 1063 and to an AND gate 1064 via an input terminal 1065 and a lead 1066. The second signal from the second selection control counter 1001 is supplied to the AND gate 1059 via an input terminal 1067 and a lead 1068. The third signal from the second selection control counter 1001 is supplied to the AND gate 1064 via an input terminal 1069 and a lead 1071. An input terminal 1072 is connected to the AND gate 1064 via a lead 1073. The feed pulse AK is supplied to the input terminal 1072. The AND gates 1055, 1059 and 1064 are connected to a flip flop 1074 via an OR gate 1075 and a lead 1076.

The third signal from the second selection control counter 1001 is supplied to an OR gate 1077 via an input terminal 1078 and a lead 1079. The OR gate 1077 is connected to the flip flop 1074 via a lead 1081. The second signal from the second selection control counter 1001 is supplied to an AND gate 1082 via an input terminal 1083 and a lead 1084. The AND gate 1082 is connected to an AND gate 1085 via leads 1086 and 1087. The fourth signal from the third selection control counter 1002 is supplied to the AND gate 1085 via an input terminal 1088 and a lead 1089. The AND gate 1082 is also connected to an input of the third selection control counter 1002 via a lead 1091, a NOT circuit 1092 and a lead 1093. An input terminal 1094 is connected to an input of the first selection control counter 248 via leads 1095 and 1096 and to an input of the third selection control counter 1002 via the lead 1095 and a lead 1097. The 6.25 kilocycles per second signal from the time pulse generator of FIG. 30 is supplied to the input terminal 1094, which terminal is connected to the AND gate 1085 via the lead 1095.

The flip flop 1043 is connected to an input of the first selection control counter 248 via a lead 1098 and an output of said counter is connected to said flip flop via a lead 1099. The flip flop 1074 is connected to an input of the third selection control counter 1002 via a lead 1101 and an output of said counter is connected to said flip flop via a lead 1102. The AND gate 1085 is connected to an input of the third selection control counter 1002 via a lead 1103. An output of the first selection control counter 248 is connected to an input of the second selection control counter 1001 via a lead 1104.

An input terminal 1105 is connected to an AND gate 1106 via a lead 1107. The third signal from the third selection control counter 1002 is supplied to the AND gate 1106 via an input terminal 1108 and a lead 1109, to an AND gate 1111 via an input terminal 112 and a lead 1113, to an AND gate 1114 via an input terminal 1115 and a lead 1116 and to an AND gate 1117 via an input terminal 1118 and a lead 1119. An input terminal 1121 is connected to the AND gate 1111 via a lead 1122. An input terminal 1123 is connected to an AND gate 1124 via a lead 1125. The fourth signal from the third selection control counter 1002 is supplied to the AND gate 1124 via an input terminal 1126 and a lead 1127, to a flip flop 1128 via an input terminal 1129 and a lead 1131, to an AND gate 1132 via an input terminal 1133 and a lead 1134 and to an AND gate 1135 via an input terminal 1136 and a lead 1137.

An input terminal 1138 is connected to the AND gate 1114 via a lead 1139. The square R² of the cutter offset magnitude is supplied to the input terminal 1138. An input terminal 1141 is connected to the input of the fourth selection control counter 1003 via a lead 1142. An F code signal is supplied to the input terminal 1141. An input terminal 1143 supplies the signal indicating the sum from the arithmetic circuit to an AND gate 1144 via a lead 1145. An input terminal 1146 supplies the signal indicating the sum from the arithmetic circuit to an AND gate 1147 via a lead 1148 and to an AND gate 1149 via the lead 1148 and a lead 1151. The sign bit or polarity bit is supplied to an input terminal 1152 which is connected to the AND gate 1147 via a lead 1153, to the AND gate 1144 via the lead 1153 and a lead 1154 and to the AND gate 1149 via the lead 1153 and a lead 1155. An input terminal 1156 is connected to the AND gate 1132 via a lead 1157. The 6.25 kilocycles per second signal from the time pulse generator of FIG. 30 is supplied to the input terminal 1156.

The second signal from the first selection control counter 248 is supplied to the flip flop register 1008 via an input terminal 1158 and a lead 1159, to the flip flop register 1011 via an input terminal 1161 and a lead 1162, to an AND gate 1163 via an input terminal 1164 and a lead 1165 and to an AND gate 1166 via an input terminal 1167 and a lead 1168. The AND gates 1114 and 1124 are connected to an output terminal 1169 via an OR gate 1171, a lead 1172, the flip flop register 1008 and a lead 1173. The outputs of the flip flop register 1008 are connected to the AND gate 1037 via the lead 1173 and leads 1174, 1175 and 1176, to the OR gate 1077 via the leads 1173, 1174, 1175 and a lead 1177, to an AND gate 1178 via the lead 1174 and a lead 1179, to the AND gates 1052 and 1082 via a lead 1181 and leads 1182 and 1183, respectively. The flip flop register 1008 provides an output signal AR at the output terminal 1169 via the lead 1173 and an output signal AS in the lead 1181. The output signal AR is supplied to the input terminal 348 of FIG. 33a.

The second signal from the third selection control counter 1002 is connected to the AND gate 1144 via an input terminal 1184 and a lead 1185 and to the AND gate 1149 via an input terminal 1186 and a lead 1187. The second signal from the second selection control counter 1001 is supplied to the AND gate 1132 via an input terminal 1188 and a lead 1189 and to an AND gate 1178 via an input terminal 1191 and a lead 1192. The first signal from the third selection control counter 1002 is connected to an OR gate 1193 via an input terminal 1194 and a lead 1195 and to AND gates 1196 and 1197 via an input terminal 1198, a lead 1199 and leads 1201 and 1202, respectively.

An input terminal 1203 is connected to an AND gate 1204 via a lead 1205 and an input terminal 1206 is connected to said AND gate via a lead 1207. An input terminal 1208 is connected to an AND gate 1209 via a lead 1211 and an input terminal 1212 is connected to said AND gate via a lead 1213. D code signals are supplied to the input terminal 1208 and the AN signal indicating that the cutter offset magnitude is zero is supplied to the input terminal 1212. An input terminal 1214 is connected to the AND gate 1163 via a lead 1215 and to an AND gate 1216 via the lead 1215 and a lead 1217. An input terminal 1218 is connected to the AND gate 1166 via a lead 1219. K code signals are supplied to the input terminals 1214 and 1218. The fourth signal from the first selection control counter 248 is supplied to the flip flop 1128 via an input terminal 1221 and a lead 1222 and to the flip flop register 1012 via an input terminal 1223 and a lead 1224. The third signal from the second selection control counter 1001 is supplied to the AND gate 1135 via an input terminal 1225 and a lead 1226 and the first signal from said counter is supplied to the AND gate 1216 via an input terminal 1227 and a lead 1228. The first signal from the first selection control counter 248 is supplied to the AND gate 1196 via an input terminal 1229 and a lead 1231.

An AT signal is transferred by the AND gate 1216 and is supplied to the AND gate 1047 via a lead 1232, a lead 1233 and a NOT circuit 1234 and to an input of the second selection control counter 1001 via the lead 1232 and a lead 1235. The AND gates 1111 and 1106 are connected to an AND gate 1236 via an OR gate 1237 and a lead 1238 and to an AND gate 1239 via the OR gate 1237, the lead 1238 and a lead 1241. The AND gate 1147 is connected to the AND gate 1239 via a lead 1242, to the AND gate 1236 via the lead 1242 and leads 1243 and 1244, to the AND gate 1124 via the leads 1242 and 1243 and a lead 1245 and to the AND gate 1114 via the leads 1242 and 1243 and a lead 1246. The output of the flip flop 1128 is connected to the AND gate 1117 via a lead 1247.

The AND gate 1236 is connected to the flip flop register 1009 via a lead 1248 and the AND gates 1239 and 1117 are connected to the flip flop register 1011 via leads 1249 and 1251. The AND gates 1144 and 1149 are connected to the flip flop register 1012 via leads 1252 and 1253. The AND gate 1135 is connected to AND gates 1254 and 1255 via a lead 1256 and leads 1257 and 1258, respectively. The outputs of the flip flop register 1009 are supplied to an AND gate 1259 via a lead 1261, to the AND gate 1254 via leads 1262 and 1263, to an AND gate 1264 via the lead 1262 and leads 1265 and 1266 and to the AND gate 1197 via the leads 1262 and 1265 and a lead 1267.

The outputs of the flip flop register 1011 are supplied to an AND gate 1268 via a lead 1269, to the AND gate 1255 via leads 1271 and 1272, to an AND gate 1273 via the leads 1271 and 1272 and a lead 1274 and to the AND gate 1197 via the leads 1271 and 1272. The outputs of the flip flop register 1012 are supplied to the AND gate 1273 via a lead 1275, to the AND gate 1117 via leads 1276 and 1277, and to the AND gate 1264 via the lead 1276 and a lead 1278. The OR gate 1193 is connected to the AND gates 1259, 1273, 1268 and 1264 via a lead 1279 and leads 1281, 1282, 1283 and 1284, respectively.

The AND gates 1254 and 1255 connected to output terminals 1285 and 1286 via leads 1287 and 1288, respectively. The AND gates 1259 and 1273 are connected to the flip flop register 1013 via an OR gate 1289 and a lead 1291 and the AND gates 1268 and 1264 are connected to said flip flop register via an OR gate 1292 and a lead 1293. The outputs of the flip flop register 1013 are supplied to an output terminal 1294 via a lead 1295, to the AND gate 1255 via the lead 1295 and a lead 1296, to the AND gate 1239 via the lead 1295 and a lead 1297, to an output terminal 1298 via a lead 1299, to the AND gate 1254 via the lead 1299 and a lead 1301 and to the AND gate 1236 via the lead 1299 and a lead 1302.

The AND gates 1204, 1196 and 1197 are connected to an output terminal 1303 via an OR gate 1304 and a lead 1305 and to a flip flop 1306 via the lead 1305 and a lead 1307. The AA signal, which indicates that the cutter offset magnitude R has been read out from the switchboard 33 (FIG. 29) is provided at the output terminal 1303. The AND gate 1178 is connected to the AND gate 1196 via a lead 1308. The AND gate 1209 is connected to the OR gate 1304 via a lead 1309 and to a flip flop 1311 via the lead 1309 and a lead 1312. The AND gate 1163 is connected to the flip flop 1311 via a lead 1313. The outputs of the flip flop 1306 are supplied to an output terminal 1314 via a lead 1315, to the AND gate 1023 via the lead 1315 and a lead 1316, to the flip flop register 1009 via the leads 1315 and 1316 and a lead 1317, to the flip flop register 1011 via the leads 1315, 1316 and 1317, and a lead 1318, to an output terminal 1319 via a lead 1321 and to the AND gate 1216 via the lead 1321 and a lead 1322. The AO signal, indicating that the pulse distribution is completed, is provided at the output terminal 1314. The AL signal, indicating that the pulse distribution has not been completed, is provided at the output terminal 1319.

The second selection control counter 1001 is a ternary counter and each of the first, third and fourth selection control counters 248, 1002 and 1003 is a quadrinary counter each comprising two flip flops. FIG. 50 shows a selection control counter which may be utilized as the second selection control counter 1001 of FIGS. 49a, 49b and 49c. The second selection control counter of FIG. 50 comprises flip flops 1323 and 1324 and AND gates 1325, 1326, 1327 and 1328. The AT signal provided by the flip flop 1306 of the operation control circuit via the AND gate 1216 is supplied to the AND gate 1325 via an input terminal 1329 and a lead 1331. The first signal 1001A provided by the second selection control counter is fed back to the AND gate 1325 via a lead 1332.

The first and second control signals provided by the first selection control counter 248, as hereinafter described, are supplied to the second selection control counter of FIG. 50. The first control signal from the first selection control counter 248 is supplied to the flip flop 1324 via an input terminal 1333, a lead 1334, the AND gate 1327 and a lead 1335 and to the flip flop 1323 via the input terminal 1333, the lead 1334, a lead 1336, the AND gate 1326 and a lead 1337. The second control signal from the first selection control counter 248 is supplied to the flip flop 1323 via an input terminal 1338 and leads 1339 and 1341 and to the flip flop 1324 via a lead 1342.

When operation is initiated, each flip flop 1323 and 1324 is in its set condition and the first signal 1001A is provided at an output terminal 1343 via leads 1344 and 1345. When the signal from the flip flop 1306 (FIGS. 49a 49b and 49c) supplied to the input terminal 1329 is "1," the flip flop 1323 is set, due to the second control signal supplied to the input terminal 1338, and the second signal 1001B is provided at an output terminal 1346 via a lead 1347. The second signal 1001B is also supplied to the AND gate 1326 via the lead 1347 and a lead 1348. The third signal 1001C is provided at an output terminal 1349 via leads 1351 and 1352, when the first and second control signals from the first selection control counter 248 are supplied to the input terminals 1333 and 1338 and the flip flop 1323 is reset. The third signal 1001C is also supplied to the AND gate 1327 via the lead 1351 and a lead 1353. The flip flop 1324 is then set by the output from the flip flop 1323. The fourth signal 1001D is provided at an output terminal 1354 via leads 1355 and 1356 when the flip flop 1323 is set.

During the first cycle of operation of the second selection control counter 1001, the cutter offset magnitude R is read into the corresponding registers, the square of the cutter offset magnitude, $R^2$, is calculated and the data read out from the tape is stored in the corresponding registers. During the second cycle of opeartion of the second control counter 1001, the cutter offset magnitude R is calculated. During the third cycle of operation, the pulse distribution is completed.

FIG. 51 shows a selection control counter which may be utilized as the first selection control counter 248 of FIGS. 49a, 49b and 49c. The first selection control counter of FIG. 51 comprises flip flops 1357 and 1358 and AND gates 1359, 1361, 1362, 1363, 1364 and 1365. The first control signal is provided by the flip flop 1358 via an output terminal 1366 and a lead 1367. The second control signal is provided by the flip flop 1357 via an output terminal 1368 and a lead 1369. Input terminals 1371 and 1372 are connected to a flip flop 1373 via leads 1374 and 1375, respectively. An input terminal 1376 is connected to the AND gate 1359 via a lead 1377. A clock pulse from the output terminal 225 of the time pulse generator 209 (FIGS. 29 and 30) is supplied to the flip flop 1357 via an input terminal 1378 and a lead 1379, to control said flip flop in opeartion. A clock pulse from the output terminal 246 of the time pulse generator 209 of FIG. 30 is supplied to the input terminals 1371 and 1372.

When an input signal is supplied to the input terminal 1376 and clock pulses are supplied to the input terminals 1371 and 1372, the flip flop 1373 is set and the first signal 248A is provided at an output terminal 1381 via a lead 1382. The second signal 248B is provided at an output terminal 1383 via a lead 1384. The third signal 248C is provided at an output terminal 1385 via a lead 1386. The fourth signal 248D is provided at an output terminal 1387 via a lead 1388. The first selection control counter of FIG. 51 operates in four cycles of operation to control the sequence of read-in of data or information into the corresponding registers and to institute the required calculations or computations.

During the course of the present disclosure, when a flip flop is indicated to be set, it is intended to indicate that a "1" signal is provided at its upper output terminal or lead and when a flip flop is indicated to be reset, it is intended to indicate that a "1" signal is provided at its lower output terminal or lead. Furthermore, in the figures, the symbol of a block having a triangle therein with its altitude coincident with a line through the block and parallel to and equidistant between a pair of opposite sides of the block and with its base coincident with and of equal length as a third side of the block perpendicular to the pair of opposite blocks indicates a suitable buffer, amplifier or buffer amplifier.

FIG. 52 shows a selection control counter which may be utilized as the third selection control counter 1002 of FIGS. 49a, 49b and 49c. The third selection control counter 1002 comprises flip flops 1389, 1391 and 1392, AND gates 1393, 1394, 1395, 1396, 1397, 1398, 1399, 1401 and 1402, a NOT circuit 1403 and an OR gate 1404. A clock pulse from the output terminal 225 of the time pulse generator 209 (FIGS. 29 and 30) is supplied to the flip flop 1391 via an input terminal 1405 and a lead 1406. A 6.25 kilocycles per second clock pulse from the output terminal 246 of the time pulse generator 209 of FIG. 30 is supplied to an input terminal 1407 and from said input terminal to the AND gate 1395 via a lead 1408, to the AND gate 1394 via the lead 1408 and a lead 1409, to the AND gate 1397 via the leads 1408 and 1409 and a lead 1411 and to the AND gate 1396 via the leads 1408 and 1409 and a lead 1412.

The third signal 1001C from the second selection control counter 1001 is supplied to the flip flop 1389 via an input terminal 1413 and a lead 1414 and the feed pulse AK is supplied to said flip flop via an input terminal 1415 and a lead 1416. The second signal 1001B from the second selection control counter 1001 is supplied to the AND gate 1393 via an input terminal 1417 and a lead 1418. The output signal AS of the flip flop register 1008 of FIGS. 49a, 49b and 49c is supplied to the AND gate 1393 via an input terminal 1419 and a lead 1421. The fourth signal 1002D of the third selection control counter 1002 is supplied to the AND gate 1394 via an input terminal 1422 and a lead 1423. The AND gate 1393 is connected to the AND gate 1394 via a lead 1424 and to the AND gate 1396 via the lead 1424 and a lead 1425 and the NOT circuit 1403. The AND gates 1396 and 1397 are connected to the flip flop 1391 via the OR gate 1404 and a lead 1426. The first signal 1002A is provided at an output terminal 1427 via a lead 1428. The second signal 1002B is provided at an output terminal 1429 via a lead 1431. The third signal 1002C is provided at an output terminal 1432 via a lead 1433. The fourth signal 1002D is provided at an output terminal 1434 via a lead 1435.

The third selection control counter of FIG. 52 operates in each of its four cycles of operation to provide the four signals when the 6.25 kilocycles per second clock pulses form the time pulse generator 209 (FIG. 29) are supplied to the input terminal 1407. The flip flop 1389 is then set. When the third signal from the second selection control counter 1001 is supplied to the flip flop 1389, said flip flop is reset and operation terminates in the first cycle of operation. When the fourth signal from the third selection control counter 1002 is supplied to the flip flop 1392 and signals are applied to said flip flop via the input terminals 1417 and 1419, if said flip flop is in its set condition, it is reset. The fourth signal from the third selection control counter 1002 is thus very short in duration, so that, in effect, the third selection control counter functions as a ternary counter.

During the second cycle of operation of the second selection control counter 1001, when said counter provides the second signal, calculations or computations are undertaken. Thus, the shorter the duration of the first cycle of the third selection control counter, the shorter the time in which the calculations are completed. When calculations or computations are to be made on data, information or signals determined by the first and second selection control counters 248 and 1001, the third selection control counter 1002 determines the order of such calculations.

FIG. 53 shows a selection control counter which may be utilized as the fourth selection control counter 1003 of FIGS. 49a, 49b and 49c. The fourth selection control counter of FIG. 53 comprises flip flops 1436 and 1437, a Schmitt trigger circuit 1438 and AND gates 1439, 1441, 1442 and 1443. An F code signal is supplied to the flip flop 1436 via an input terminal 1444, the Schmitt trigger 1438 and leads 1445 and 1446. The AO signal, which indicates the completion of pulse distribution, is supplied to the flip flops 1436 and 1437 via an input terminal 1447 and leads 1448, 1449 and 1451. The first signal 1003A is provided at an output terminal 1452 via a lead 1453. The second signal 1003B is provided at an output terminal 1454 via a lead 1455. The third signal 1003C is provided at an output terminal 1456 via a lead 1457. The fourth signal 1003D is provided at an output terminal 1458 via a lead 1459.

When F code signals are indicated by the decoder 166 (FIG. 29) and are supplied to the input terminal 1444, the fourth selection control counter of FIG. 53 counts such signals and operates in its four cycles. When the AO signal, indicating the completion of pulse distribution, is supplied to the input terminal 1447, the flip flop 1436 is set and the flip flop 1437 is reset and the fourth selection control counter 1003 operates in its first cycle of operation. The fourth selection control counter 1003 determines the sequence of data storage and indicates which of the register units 865A, 865B, 865C and 865D (FIGS. 42a, 42b and 42c) the tape data relating to the coordinates of the start and end points of the cutting patterns and the dial switchboard data relating to the cutter offset distance R are to be read into.

Each of the flip flop registers 1008, 1009, 1011, 1012 and 1013 (FIGS. 49a, 49b and 49c) comprises a flip flop which stores signals for a determined time and continuously provides output signals in accordance with the stored signals. The flip flop register 1008 (FIGS. 49a, 49b and 49c) functions to determine whether or not the calculations for the cutter offset distance R and for the square, $R^2$, of the cutter offset distance are completed and stores the results of such calculations. The signal AR indicates that the cutter offset calculations are completed and the signal AS indicates that the cutter offset calculations are not completed. The flip flop registers 1009 and 1011 function to determine whether or not provided signals or distributed pulses have reached their destinations and store the results of such determination. The flip flop registers 1012 and 1013 function to determine whether the result of the pulse distribution calculations is positive or negative and store the results of such determination and then provide signals indicating whether the next pulse to be distributed is an X pulse or a Y pulse.

Each of the flip flop registers 1008, 1009, 1011, 1012 and 1013 determines whether or not the sign or polarity bit is included with the signal indicating the sum which is provided by the arithmetic circuit 179 (FIGS. 29 and 42c). If the sign or polarity bit is included with the signal indicating the sum, it is determined whether such sum is less than zero, if such sum is of one polarity, and whether such sum is equal to or greater than zero, if such sum is of the opposite polarity.

The operation control circuit 197 further comprises a gate control signal generator and gate control circuits, not shown in FIGS. 49a, 49b and 49c. FIGS. 54a, 54b and 54c show a gate control signal generator which may be utilized as the gate control signal generator of the operation control circuit of FIGS. 49a, 49b and 49c. FIGS. 55a, 55b and 55c show a first gate control circuit which may be utilized as a first gate control circuit of the operation control circuit of FIGS. 49a, 49b and 49c and FIG. 56 shows a second gate control circuit which may be utilized as a second gate control of said operation control circuit. The flow of data or information and calculations or computations is accomplished by effective control of the switching condition of the various gates in the circuits. The operation of the gates is controlled by predetermined operational patterns which are programmed. Thus, when a specific operational pattern is read out, and thereby instituted, the gate control circuits (FIGS. 55a, 55b and 55c and 56) undertake the control of the switching condition of the gates in accordance with the selected operation pattern.

The operational patterns are read out by gating the signals provided by the first, second, third and fourth selection control counters 248, 1001, 1002 and 1003 (FIGS. 49a, 49b and 49c), the G code signals stored in the G code register 172 (FIG. 29), the output signals provided by the flip flop register 1013 (FIGS. 49a, 49b and 49c), signals provided by the decoder 166 (FIG. 29), and the various input registers. This may be accomplished by the gate control signal generator of FIGS. 54a, 54b and 54c in cooperation with the first and second gate control circuits of FIGS. 55a, 55b and 55c and 56.

The gate control signal generator of FIGS. 54a, 54b and 54c comprises a plurality of AND gates 1461 to 1469, 1471 to 1479, 1481 to 1489, 1491 to 1499, 1501 to 1509, 1511 to 1519 and 1521 to 1525, a plurality of OR gates 1526, 1527, 1528, 1529, 1531, 1532, 1533, 1534, 1535, 1536 and 1537 and NOT circuits 1538, 1539, 1541, 1542, 1543 and 1544. An input terminal 1545 is connected to the AND gate 1461 via a lead 1546. A K code signal is supplied to the input terminal 1545. An input terminal 1547 is connected to the AND gate 1461 via a lead 1548, to the AND gate 1462 via the lead 1548, a lead 1549 and the inverter 1538, and to the AND gate 1469 via the leads 1548 and 1549 and a lead 1551. A positive signal is supplied to the input terminal 1547. An input terminal 1552 is connected to the AND gate 1462 via a lead 1553. Each of input terminals 1554, 1555, 1556, 1557, 1558, 1559, 1561, 1562, 1563, 1564, 1565, 1566, 1567, 1568, 1569, 1571 and 1572 is connected to a plurality of AND gates. An input terminal 1573 is connected to the OR gate 1532. The LA signal of the L code is supplied to the input terminal 1556. The LB signal of the L code is supplied to the input terminal 1557. The LC signal of the L code is supplied to the input terminal 1558. The LD signal of the L code is supplied to the input terminal 1559. Either the LA signal or the LB signal of the L code is supplied to the input terminal 1561. The second and third signals of the second selection control counter 1001 (FIG. 49b) are supplied to the input terminals 1562 and 1563, respectively. The second, third and fourth signals of the first selection control counter 248 (FIG. 49a) are supplied to the input terminals 1564, 1565 and 1566, respectively. The first, second, third and fourth signals of the fourth selection control counter 1003 (FIG. 49b) are supplied to the input terminals 1567, 1568, 1569 and 1571, respectively. The AH signal is supplied to the input terminal 1572. The AE signal is supplied to the input terminal 1573. An input terminal 1574 is connected to the AND gate 1466 via a lead 1575. An input terminal 1576 is connected to the AND gate 1494 via a lead 1577. Each of input terminals 1578, 1579, 1581, 1582, 1583 and 1584 is connected to a plurality of AND gates. The third signal of the fourth selection control counter 1003 (FIG. 49b) is supplied to the input terminal 1578. The fourth, third and second signals of the third selection control counter 1002 (FIG. 49a) are supplied to the input terminals 1579, 1581 and 1582, respectively. The output terminal 1294 of FIG. 49c, and thus the signal therein, is connected to the input terminal 1583. The output terminal 1298 of FIG. 49c, and thus the signal therein, is connected to the input terminal 1584. The output gate control signals are provided at output terminals 1585A to 1585Q, an output terminal 1586, an output terminal 1587, output terminals 1588A, 1588B and 1588C and output terminals 1589A to 1589O.

Operational patterns provided at the output terminals 1585J, 1585K, 1589A and 1589B, for example, are represented by logic equations, as follows.

1585J=(1563)(1565)(1555)(1557)
1585K=(1572)(1567)
1589A=[(1584)(1582)][(1563)(1554)(1557)+ (1562)(1554)(1558)+(1562)(1555)(1561)+ (1554)(1557)]
1589B=[(1584)(1581)][(1562)(1554)(1558)+ (1562)(1555)(1561)+(1554)(1557)]

In FIGS. 54a, 54b and 54c, the signal provided at the output terminal 1586 is supplied from leads 1591 and 1592 via a lead 1593, the AND gate 1466, a lead 1594, the NOT circuit 1544, a lead 1595, the AND gate 1465 and leads 1596 and 1597, and maintains the data stored in the register unit 865E (FIG. 42b). An AU signal provided at the output terminal 1587 is utilized to cause the counters (FIGS. 42a, 42b and 42c) to skip a cycle of operation when no calculation is required. The AU signal is supplied to the input terminal 1046 of FIG. 49a. The signal provided at the output terminal 1585H of the gate control signal generator of FIG. 54a is applied to the input terminal 1203 of the operation control circuit of FIG. 49c. M code and F code signals are supplied to the input terminal 1206 of FIG. 49c.

FIGS. 55a, 55b and 55c show a first gate control circuit which may be utilized as the first gate control circuit of the operation control circuit 197 of FIG. 29. In FIGS. 55a, 55b and 55c, the input terminals 1585A to 1585N and 1585Q are connected to and correspond to the output terminals 1585A to 1585N and 1585Q of the gate control signal generator of FIGS. 54a, 54b and 54c. The input terminals 1589A to 1589O are connected to and correspond to the output terminals 1589A to 1589O of the gate control signal generator of FIGS. 54a, 54b and 54c. Input terminals 1601 and 1602 are also provided. AI and AJ signals from the output terminals 554 and 555 of the decoder of FIGS. 35a and 35b are supplied to the input terminals 1601 and 1602, respectviely. The output terminals 939, 942, 944, 946, 953, 955, 957, 941, 943, 945, 947, 952, 901, 899, 903, 902, 905, 904, 907, 906, 912, 911, 914, 913, 916, 915 and 984 are connected to and correspond to the input terminals 939, 942, 946, 953, 955, 957, 941, 943, 945, 947, 952, 901, 899, 903, 902, 905, 904, 907, 906, 912, 911, 914, 913, 916, 915 and 984 of the arithmetic circuit of FIGS. 42a, 42b and 42c and the signals transmitted via such output and input terminals control the input and output gates of the register units of said arithmetic circuit. Output terminals 1603, 1604, 1605 and 1606 are also provided.

FIG. 56 shows a second gate control circuit which may be utilized as the second gate control circuit of the operation control circuit 197 of FIG. 29. In FIG. 56, the input terminals 1585A to 1585J and 1585O to 1585Q are connected to and correspond to the output terminals 1585A to 1585J and 1585O to 1585Q of the gate signal generator of FIGS. 54a, 54b and 54c. The input terminals 1589A to 1589O are connected to and correspond to the output terminals 1589A to 1589O of the gate control signal generator of FIGS. 54a, 54b and 54c. Output terminals 1607, 1608, 1609, 1611, 1612, 1613, 1614 and 1615 are provided and the terminals 1607 to 1609 and 1611 to 1614 are connected to and correspond to the input terminals 739, 741, 742, 743, 744, 745 and 747 of the arithmetic circuit FIGS. 42a, 42b and 42c. The AD signal, which shifts the flip flops in condition, is provided at the output terminal 1615 and is supplied to the input terminal 344 of FIG. 33a and to the input terminal 344 of FIG. 42a.

The first gate control circuit of FIGS. 55a, 55b and 55c comprises a plurality of OR gates 1616, 1617, 1618, 1619, 1621, 1622, 1623, 1624, 1625, 1626, 1627, 1628, 1629, 1631, 1632, 1633 and 1634, a plurality of AND gates 1635, 1636, 1637, 1638, 1639, 1641, 1642, 1643, 1644, 1645, 1646, 1647, 1648, 1649, 1651, 1652, 1653, 1654, 1655, 1656, 1657, 1658, 1659, 1661, 1662, 1663, 1664, 1665, 1667, 1668 and 1669, a plurality of OR gates 1671, 1672, 1673, 1674, 1675, 1676, 1677, 1678, 1679, 1681, 1682, 1683, 1684, 1685, 1686 and 1687, and a plurality of NOT circuits 1688, 1689, 1691, 1692, 1693, 1694, 1695, 1696, 1697 and 1698.

The second gate control circuit of FIG. 56 comprises a plurality of OR gates 1699, 1701, 1702, 1703, 1704, 1705 and 1706, an AND gate 1707, and a plurality of OR gates 1708, 1709, 1711 and 1712. The second gate control circuit includes an additional input terminal 1713. As hereinbefore mentioned, the AD signal shift instruction for the input register of FIGS. 33a and 33b and for the arithmetic circuit of FIGS. 42a, 42b and 42c is provided at the output terminal 1615 of FIG. 56.

If the AJ signal from the decoder 166 (FIG. 29) is "1," and the operational pattern for the input terminal 1586J is provided at the input terminal 1585J of the first gate control circuit of FIGS. 55a, 55b and 55c, the output terminals 953, 904 and 906 of FIGS. 55a, 55b and 55c and the output terminals 1607 and 1611 of FIG. 56 provide output signals. The data stored in the register unit 865G of FIGS. 42a, 42b and 42c is then transferred to the register unit 865C of said figures via the AND gate 926, the lead 602, the AND gate 727, the OR gate 735, the AND gate 731, the OR gate 736, the full adder 722, the delay line 944, the leads 995 and 996, the AND gate 997, the OR gate 898, the lead 897, the AND gate 871 and the OR gate 888.

If the AI signal from the decoder 166 (FIG. 29) is "1," and the operational pattern for the input terminal 1589A is provided at the input terminal 1589A of the first gate control circuit of FIGS. 55a, 55b and 55c, the output terminals 946 and 1603 of FIGS. 55a, 55b and 55c and the output terminals 1607 and 1609 of FIG. 56 provide output signals. The balance between the data stored in the register units 865E and 865D of FIGS. 42a, 42b and 42c is then calculated and such balance is stored in the register unit 865E. All the data transfer and calculation operations are accomplished by selection of the various operational patterns, in the manner hereinbefore described with reference to the input terminal 1585J and the input terminal 1589A.

FIG. 57 shows a first gate circuit which may be utilized as the first gate circuit 192 of FIG. 29. The first gate circuit of FIG. 57 comprises a plurality of AND gates 1714 to 1719, 1721 to 1729, 1731 to 1739 and 1741, a plurality of OR gates 1742 to 1749, a plurality of AND gates 1751 to 1759 and 1761 to 1767, a plurality of OR gates 1768, 1769, 1771 and 1772 and NOT circuits 1773, 1774 and 1775. An input terminal 1776 is connected to selected ones of the first-mentioned plurality of AND gates via a lead 1777, an input terminal 1778 is connected to selected ones of the first-mentioned plurality of AND gates via a lead 1779, an input terminal 1781 is connected to selected ones of the first-mentioned plurality of AND gates via a lead 1782, an input terminal 1783 is connected to selected ones of the first-mentioned plurality of AND gates via a lead 1784, an input terminal 1785 is connected to selected ones of the first-mentioned plurality of AND gates via a lead 1786, an input terminal 1787 is connected to selected ones of the first-mentioned plurality of AND gates via a lead 1788, and an input terminal 1789 is connected to selected ones of the first-mentioned plurality of AND gates via a lead 1791. A K code signal is supplied to the input terminal 1789. The input terminals 1783, 1781, 1778 and 1776, respectively, of FIG. 57 are connected to the output terminals 568, 569, 571 and 572, respectively, of FIG. 35a, so that the signals provided at the output terminals 568, 569, 571 and 572 of the decoder are supplied to the first gate circuit. Input terminals 1792 and 1793 are connected to an AND gate 1714 via leads 1794 and 1795. The LB signal of the L code is supplied to the input terminal 1792. A cutter offset direction signal is supplied to the input terminal 1793. An input terminal 1796 is connected to selected ones of the last-mentioned plurality of AND gates via a lead 1797 and an input terminal 1798 is connected to selected ones of the last-mentioned plurality of AND gates via a lead 1799. Distributed Y pulses are supplied to the input terminal 1796 and distributed X pulses are supplied to the input terminal 1798. Output terminals 1801, 1802, 1803 and 1804 are connected to the OR gates 1768, 1769, 1771 and 1772, respectively. Pulses of the +A, −A, +B and −B axis directions of the A, B coordinate system are provided at the output terminals 1801, 1802, 1803 and 1804, respectively. The signals supplied to the input terminals 1785 and 1787 of FIG. 75 are the same signals as are supplied to the input terminals 1554 and 1552 of FIG. 54a.

The first gate circuit of FIG. 57 functions to convert the coordinates of the X and Y pulses which are distributed for the cutting pattern in the first quadrant (FIGS. 1 and 2) for the X and Y axis coordinates into coordinates for the same cutting pattern in each of the other quadrants in the A and B axis coordinates (FIGS. 3, 6 and 7). The first gate circuit provides output pulses in K code (FIG. 13) to provide the aforedescribed information conveyed by K code signals, after the conversion of the X and Y coordinate pulses into +A, −A, +B and −B coordinate pulses. As hereinbefore described, the X and Y coordinate pulses are fed to the first gate circuit via the input terminals 1796 and 1798 and the +A coordinate pulses are provided at the output terminal 1801, the −A coordinate pulses are provided at the output terminal 1802, the +B coordinate pulses are provided at the output terminal 1803 and the −B coordinate pulses are provided at the output terminal 1804.

FIG. 58 shows a second gate circuit which may be utilized as the second gate circuit 207 of FIG. 29. The second gate circuit 207 of FIG. 58 comprises a plurality of AND gates 1805, 1806, 1807, 1808, 1809, 1811, 1812, 1813, 1814, 1815, 1816 and 1817 and a plurality of OR gates 1818, 1819, 1821, 1822, 1823 and 1824. The input terminals 1801, 1802, 1803 and 1804 are connected to and correspond to the output terminals 1801, 1802, 1803 and 1804 of the first gate circuit of FIG. 57 and the +A, −A, +B and −B (FIGS. 3, 6 and 7) coordinate pulses are transferred via said terminals, respectively. An input terminal 1825 is connected to selected ones of the AND gates via a lead 1826, an input terminal 1827 is connected to selected ones of the AND gates via a lead 1828, and an input terminal 1829 is connected to selected ones of the AND gates via a lead 1831. An output terminal 1832 is connected to the OR gate 1818 via a lead 1833, an output terminal 1834 is connected to the OR gate 1819 via a lead 1835, an output terminal 1836 is connected to the OR gate 1821 via a lead 1837, an output terminal 1838 is connected to the OR gate 1822 via a lead 1839, an output terminal 1841 is connected to the OR gate 1823 via a lead 1842, and an output terminal 1843 is connected to the OR gate 1824 via a lead 1844.

The second gate circuit of FIG. 58 functions to convert the A and B coordinate pulses (FIGS. 3, 6 and 7), supplied to the input terminals 1801, 1802, 1803 and 1804 from the first gate circuit of FIG. 57, into three-dimensional X, Y and Z coordinates in accordance with the J code (FIG. 13). The +X pulses are provided at the output terminal 1832, the −X pulses are provided at the output terminal 1834, the +Y pulses are provided at the output terminal 1846, the −Y pulses are provided at the output terminal 1838, the +Z pulses are provided at the output terminal 1841, and the −Z pulses are provided at the output terminal 1843.

In order to enhance the description of the digital control system of the present invention, an example of the operation of said system for cutting a workpiece in a determined pattern is now presented with reference to FIG. 59. The pattern of FIG. 59 is cut by the cutting tool or milling cutter 27 (FIGS. 4 and 5) from the workpiece 26 (FIGS. 4 and 5) under the control of the digital control system of the present invention.

The necessary information or data regarding the pattern of FIG. 59 is stored in the tape 41 (FIGS. 18, 19, 20 and 21). The information is as indicated in Table V. The LA signal of the L code is not required and is therefore excluded. The information is provided for parts or points relating to the pattern of FIG. 59.

TABLE V

| Number | Coordinates | | | | Code | | | | |
|---|---|---|---|---|---|---|---|---|---|
| | Xs | Ys | Xe | Ye | H | J | G | L | J |
| 1 | | | 3,000 | | H4 | XY | GR | LC | KCI |
| 2 | | | | 2,000 | H1 | | | | KCII |
| 3 | | | 1,000 | 2,000 | | | | LB | KBI |
| 4 | | | 2,000 | 1,000 | | | | | KCI |
| 5 | | | | 1 | | | | LB | KBII |
| 6 | | | | 2,000 | | | | | KBI |
| 7 | | | | 1,000 | | | | | KBIV |
| 8 | | | 3,000 | | | | | | KCIII |
| 9 | | | 3,000 | | | | | | KCIII |
| 10 | | | | 1 | H4 | | | LB | KCII |
| 11 | | | | | | | | | M |

The cutter offset magnitude R is stored in the dial switchboard 33 (FIG. 12) and is read out and stored in the numerical data register 189 (FIG. 29), as hereinbefore described. The square of the cutter offset magnitude $R^2$, utilized in the calculation, is calculated continuously. The cutter offset magnitude R is stored and the square value $R^2$ is calculated when the second selection control counter 1001 (FIGS. 49a, 49b, 49c and 50) is in its second sequence of operation. Furthermore, the desired operational pattern is selected and read out from the predetermined operational patterns, as hereinafter described. In accordance with the selected operational pattern determined by the gate control signal generator of FIGS. 54a, 54b and 54c, the appropriate gates of the arithmetic circuit (FIGS. 42a, 42b and 42c) and the input and output gates of the register units connected thereto are switched to their conductive condition. The operational pattern read out is determined by the signals provided by the first selection control counter 248 (FIG. 51) and the selection counter 247 (FIGS. 33a, 33b and 34). The various operational patterns determined by the selection control counter 247 and by the first selection control counter 248 are presented in Table VI. In Table VI, $R^2$, which is the square of the cutter offset magnitude, indicates the calculation of said square of the cutter offset magnitude.

TABLE VI

| Selection counter 247 signal | First selection control counter 248 signal | Operational pattern determined | | Calculation |
|---|---|---|---|---|
| First | First | | | |
| | Second | 1585N | 15850 | |
| | Third | 1585P | | |
| | Fourth | | | |
| Second | First | | | |
| | Second | 1585N | 15850 | |
| | Third | 1585P | | |
| | Fourth | | | |
| Third | First | | | |
| | Second | 1585N | 15850 | |
| | Third | 1585P | | |
| | Fourth | | | |
| Fourth | First | | | |
| | Second | 1585N | 15850 | |
| | Third | 1585P | | |
| | Fourth | | | |
| Fifth | First | | | $R^2$ |

The cutter offset magnitude R and its direction are stored in the dial switchboard 33 (FIG. 12). Thus, if the cutter offset magnitude R is 5.94 mm., for example, and its direction is positive, for example, a numerical value 5.94 and the appropriate offset direction are stored in the dial switchboard 33 (FIG. 12). Then, when the start switch 251 of the control unit 187 (FIG. 32) of the pulse distributor and control unit 35 (FIGS. 12 and 29) is operated, the relays 252 and 253 are energized and provide "1" signals as output terminals 254 and 1845 (FIG. 32). The signal provided at the output terminal 254 of FIG. 32 is an AV signal and is supplied to the input terminal 987 of FIG. 42b and to the input terminal 1027 of FIG. 49a. The selection counter 247 (FIGS. 33a and 33b) provides an AG signal at the output terminal 371 of FIG. 33a and the output terminal 371 of FIG. 34 at such time, and the "1" signal is applied from the output terminal 254 of FIG. 32 to the input terminal 1027 of FIG. 49a and the AG signal is supplied from the output terminal 371 of FIG. 34 to the input terminal 1033 of FIG. 49a. The AL signal, indicating that pulse distribution has not been completed, is supplied to an input terminal 1845a of FIG. 32. The second signal of the first selection control counter 248 (FIG. 49a) is supplied to an input terminal 1845b of FIG. 32.

The signals supplied to the input terminals 1027 and 1031 set the flip flop 1043 of FIG. 49a, via the AND gate 1028, the OR gate 1044 and the lead 1035, and thereby start operation of the first selection control counter 248 via the lead 1098 (FIG. 49a). The clock pulses provided at the output terminal 246 of the time pulse generator of FIG. 30 are supplied to the input terminal 346 of the input register of FIGS. 33a and 33b, to the input terminal 1094 of the operation control circuit of FIGS. 49a, 49b and 49c, to input terminal 1156 of said operation control circuit and to the input terminal 1407 of the third selection control counter of FIG. 52. When the clock pulse from the output terminal 246 of the time pulse generator of FIG. 30 is supplied to the input terminal 1094 of FIG. 49a, the first selection control counter 248 is set to its second cycle of operation and provides its second signal at its output terminal 1004B.

The second signal provided by the first selection control counter 248 initiates operation of the second blocking oscillator 337 of the input register of FIG. 33a via the input terminal 408, the AND gate 409 and the OR gate 343. The selection counter 247 then provides its first signal and the signals representing the highest order of the numerical value are transferred to the inputs of the flip flops 284, 285, 286, 287 and 289 of the input register (FIGS. 33a and 33b) and are stored in said flip flops by the output signals from the second blocking oscillator 337 provided in the lead 338 (FIGS. 33a and 33b). If the numerical value is not zero, it is identified by a D code signal (FIG. 13) in the decoder 166 (FIGS. 29, 35a and 35b), sets the flip flop 546 (FIGS. 35a and 35b), via the lead 544, the AND gate 513 and the lead 547, and provides an AH signal at the output terminal 548 (FIG. 35b).

The flip flop 546 of the decoder of FIGS. 35a and 35b is reset when the first selection control counter 248 (FIGS. 49a, 49b and 49c) provides its fourth signal at its output terminal 1004D. The $R^2$ signal is then transferred from the selection counter 247 (FIGS. 33a and 33b) and is provided at the output terminals 364 and 371. When an AH signal is provided at the output terminal 548 of the decoder (FIG. 35b) it is supplied to the input terminal 1572 of the gate control signal generator of FIGS. 54a, 54b and 54c. Since the first selection control counter 248 is then in its second cycle of operation and the fourth selection control counter 1003 is in its fourth cycle of operation (FIG. 49b), the operational pattern 1585N and the operational pattern 1585O are selected via the output terminals 1585N and 1585O of the gate control signal generator of FIG. 54b.

When the operational pattern 1585N is selected, the first gate control circuit of FIGS. 55a, 55b and 55c provides signals at the output terminals 946 and 906 and the input and output gates of the register unit 865D of FIG. 42a are switched to their conductive condition, since the AI signal provided at the output terminal 554 of the decoder of FIGS. 35a and 35b is then "1" and is supplied to the input terminal 1601 of said first gate control circuit. In the meantime, the operational pattern 1585O provides signals at the output terminals 1608 and 1612 of the second gate control circuit of FIG. 56, and the data stored in the register unit 865D of FIG. 42a, is multiplied by 10 and stored in said register unit.

When the next, or second, clock pulse from the output terminal 246 of the time pulse generator of FIG. 30 is supplied to the input terminal 1094 of FIG. 49a, the first selection control counter 248 provides its third signal at its output terminal 1004C and the operational patterns 1585N and 1585P are selected via the output terminals 1585N and 1585P of the gate control signal generator of FIG. 54b. Signals are then provided at the output terminals 946 and 906 of the first gate control circuit of FIGS. 55a, 55b and 55c and at the output terminals 1607, 1611 and 1615 of the second gate control circuit of FIG. 56 and these signals switch the corresponding gates of the arithmetic circuit of FIGS. 42a, 42b and 42c to their conductive condition. The data stored in the input register 161 of FIG. 42 is then transferred to the register unit 865D and the necessary calculation for storage in said register unit is made.

When the next, or third, clock pulse from the output terminal 246 of the time pulse generator of FIG. 30 is supplied to the input terminal 1094 of FIG. 49a, the first selection control counter 248 provides its fourth signal at its output terminal 1004D. The supply of the third clock pulse to the input terminal 346 of the input register (FIG. 33a) operates the selection counter 247 to provide its second signal. When the next, or fourth, clock pulse from the output terminal 246 of the time pulse generator of FIG. 30 is supplied to the input terminal 1094 of FIG. 49a, the first selection control counter 248 provides its first signal at its output terminal 1004A. The flip flop 1043 (FIG. 49a) will not be reset, however, because the signal provided at the output terminal 1587 of the gate control signal generator of FIGS. 54a, 54b and 54c and supplied to the input terminal 1046 of the operation control circuit of FIGS. 49a, 49b and 49c is the "0" signal. When the next clock pulse from the output terminal 246 of FIG. 30 is supplied, the first selection control counter 248 starts a repetition of the aforedescribed cycle of operation.

The cutter offset magnitude R is thus stored in the register unit 865D as the first selection control counter 248 goes through its four cycles of operation. When the selection counter 247 (FIG. 33a) provides its fifth signal, the AE signal provided at the output terminal 362 is "0," so that if the first selection control counter 248 (FIG. 49a) is in its first cycle of operation, the flip flop 1043 is reset and said first selection control counter ceases its operation. The flip flop 1074 (FIG. 49a) is set, by the first signal provided by the first selection control counter 248 via the input terminal 1062, the lead 1063, the AND gate 1052, the leads 1057 and 1058, the AND gate 1055, the OR gate 1075 and the lead 1076, and initiates operation of the third selection control counter 1002 (FIG. 49a) via the lead 1101. The third selection control counter 1002 then changes its cycle of operation in accordance with the clock pulses from the output terminal 246 of the time pulse generator of FIG. 30, supplied to the input terminal 1094 of FIG. 49a.

When the third selection control counter 1002 is in its second cycle of operation and provides its second signal at its output terminal 1006B, the R² signal of the square of the cutter offset magnitude is provided at the same time by the selection counter 247 (FIG. 33a) at the output terminal 364 and is supplied to the input terminal 1578 of the gate control signal generator so that the operational pattern 1589O is selected by the gate control signal generator (FIGS. 54a, 54b and 54c) and signals are provided at the output terminals 942 and 1605 of the first gate control circuit of FIGS. 55a, 55b and 55c and at the output terminals 1608, 1611 and 1614 of the second gate control circuit. These signals switch the gates 921, 938, 884, 728, 731 and 734 of the arithmetic circuit of FIGS. 42a, 42b and 42c to their conductive condition, so that said gates provide a calculation of the data in the register unit 865J plus twice the data in the register unit 865B plus 1 and store the result in the register unit 865J. When the third selection control counter 1002 is in its third cycle of operation and provides its third signal at its output terminal 1006C, the operational pattern 1589I is selected by the gate control signal generator (FIGS. 52a, 54b and 54c) and the appropriate gates of the arithmetic circuit of FIGS. 42a, 42b and 42c are switched to their conductive condition to provide a calculation of the data in the register unit 865B plus 1.

When the third selection control counter 1002 is in its fourth cycle of operation and provides its fourth signal at its output terminal 1006D, the operational pattern 1589J is selected by the gate control signal generator (FIGS. 54a, 54b and 54c) and the appropriate gates of the arithmetic circuit of FIGS. 42a, 42b and 42c are switched to their conductive condition to provide a calculation of the data in the register unit 865B minus the data in the register unit 865D and to indicate the sign or polarity of the sum; that is, whether or not the data in the register unit 865B minus the data in the register unit 865D is greater than, equal to, or less than, zero. If the polarity or sign of the sum is not indicated, such sum is positive, so that the data in the register unit 865B minus the data in the register unit 865D is less than zero. In this case, the flip flop register 1008 of FIG. 49b will not be set, and the flip flop 1074 (FIG. 49a) will not be set and the third selection control counter 1002 repeats its cycles of operation.

The third selection control counter 1002 repeats its cycles of operation when the data in the register unit 865B minus the data in the register unit 865D in its third cycle of operation is less than or equal to zero. The numerical value corresponding to the cutter offset magnitude R and stored in the register unit 865D (FIG 42a) will then be stored in the register unit 865B (FIG 42a). At the same time, the square R² of the cutter offset magnitude R will be stored in the register unit 865J (FIG. 42b), where it is represented by the equation $$(N-1)^2+2(N-1)+1$$

where N is the numerical value of a point on the cutting pattern and the equation is identified as an N function. The sign bits provided at the output terminal 242 of the time pulse generator of FIG. 30 are supplied to the input terminal 1152 of the operation control circuit of FIGS. 49a, 49b and 49c and control the operation of the gate 1147.

In the case where R² is represented by the equation $$(N-1)^2+2(N-1)+1$$

and is stored in the register unit 865J (FIG. 42b), the sign bits, included in the signal representing the sum which is provided at the output terminal 989 of FIG. 42c and is supplied to the input terminal 1146 of the operation control circuit of FIG. 49b, switch the AND gate 1147 (FIG. 49b) to its conductive condition. The sum signal is transferred via the AND gate 1147, the leads 1242, 1243 and 1245, the AND gate 1124, the OR gate 1171 and the lead 1172 to the flip flop register 1008 and sets said flip flop register. When the flip flop register 1008 (FIG. 49b) is set, it provides an AR signal which is supplied to and resets the flip flop 1074 via the leads 1173, 1174, 1175 and 1177, the OR gate 1077 and the lead 1081 by the signal from the third selection control counter 1002 supplied via the lead 1102, to terminate the cycle.

At the same time that the foregoing occurs, the AR signal provided by the flip flop register 1008 is provided at the output terminal 1169 of the operation control circuit of FIGS. 49a, 49b and 49c and is supplied to the input terminal 348 of the input register of FIGS. 33a and 33b and to the input terminal 1419 of the third selection control counter of FIG. 52. The signal provided by the flip flop register 1008 of FIG. 49b is fed to the AND gate 355 via the lead 353 from the input terminal 348 and switches said AND gate to its conductive condition. The AND gate 355 then transfers the clock signals from the output terminal 246 of the time pulse generator of FIG. 30 to the flip flop 358 of the selection counter of FIG. 34 via the input terminal 346, the leads 349 and 351, the AND gate 355, the OR gate 356 and the lead 357 of FIGS. 33a and 34, and the AND gate 374 of FIG. 34, which is the selection counter 247 (FIG. 33a), and which selection counter is thereby switched to its sixth cycle of operation. The selection counter 247 (FIG. 33a) then provides the R² signal and the gate 374 of the selection counter of FIG. 34 is switched to its non-conductive condition.

The R² signal provided by the selection counter 247 (FIGS. 33a and 33b) is supplied to the AND gate 1024 of FIG. 49a via the input terminal 1033 and the lead 1034. Since the second selection control counter 1001 is then in its first cycle of operation, the AND gate 1024 is switched to its conductive condition. At the same time, the AR signal provided by the flip flop register 1008 is supplied to the AND gate 1178 (FIG. 49c) via the leads 1173, 1174 and 1179. Since each of the first, second and third selection control counters 248, 1001 and 1002 then provides a "1" signal, said first and third selection control counters being in their first cycle of operation and said second selection control counter being in its second cycle of operation, an AA signal is provided at the output terminal 1303. The AA signal indicates that R has been read out from the switchboard 33 (FIG. 29) and initiates readout of the tape via the tape readout device 34 (FIG. 12). The AA signal is provided from the AND gate 1178 via the lead 1308, the AND gate 1196, the OR gate 1304 and the lead 1305 (FIG. 49c).

At the same time that the AA signal is provided at the output terminal 1303 (FIG. 49c), said AA signal sets the flip flop 1306 via the leads 1305 and 1307 and said flip flop provides an AO signal, indicating that the pulse distribution is completed, at the output terminal 1314 via the lead 1315. The AA signal is transferred to the input terminal 255 of the control unit of FIG. 32 and then to the AND gate 258 via the lead 257. As long as the stop switch 274 of FIG. 32 is open, as shown in FIG. 32, the AA signal is transferred to the flip flop 256 via the lead 257, the AND gate 258, the lead 259, the OR gate 261 and the lead 262 and sets said flip flop to provide a "1" signal at the output terminal 263, which initiates operation of the tape readout device 34 (FIG. 29). The AO signal also clears the register units 865A to 865F (FIGS. 42a, 42b and 42c) and is transferred to the AND gate 1023, via the leads 1315 and 1316, and switches said AND gate to its conductive condition.

The AO signal is simultaneously transferred from the output terminal 1314 of FIG. 49c to the input terminal 1447 of the fourth selection control counter of FIG. 53. The AO signal supplied to the input terminal 1447 of FIG. 53 is fed to and sets the flip flop 1436 via the leads 1448 and 1449, so that the fourth selection control counter 1003 (FIG. 49b) is switched to its first cycle of operation. This initiates the readout of the next successive data or information in the tape. The flip flop 1311 of FIG. 49c is maintained in its reset condition as long as a zero offset signal AN, as supplied to the input terminal 709 of the L code register of FIG. 41, is supplied to the input terminal 1212 of the operation control circuit of FIGS. 49a, 49b and 49c. The zero offset signal AN indicates that the cutter offset magnitude is zero. Thus, there is no L code signal LB provided (FIG. 41). The flip flop 1306 (FIG. 49c) is then reset by the second signal of the first selection control counter 248 via the input terminal 1167, the lead 1168 and the AND gate 1166. The provision of the second signal by the first selection control counter 248 thus terminates the provision of the AO signal at the output terminal 1314.

Data or information is stored in the tape 41 (FIG. 18) in any suitable arrangement such as, for example, that shown in FIG. 18. The data may be read out by the tape readout device 34 (FIG. 29) in the sequence of D code, H code, J code, G code, L code and K code and read into the input register 161 (FIG. 29) in such sequence. Except for the K code, the readout data is stored in the input register 161 and then transferred to different registers.

Numerical data for one cutting operation has four maximum values which are mutually divided by the F code and are always stored in selected register units 865A, 865B, 865C or 865D (FIGS. 42a, 42b and 42c). The register units are selected by the operational patterns determined by the cycles of operation of the first selection control counter 248 (FIGS. 49a, 49b and 49c) and the fourth selection control counter 1003 (FIGS. 49a, 49b and 49c). Thus, for example, the coordinate value Xs is read into the input register 161 (FIGS. 42a, 42b and 42c) in the first cycle of operation of the fourth selection control counter 1003 and is stored in the register unit 865A of FIG. 42a. As hereinbefore described, the cycles of operation of the fourth selection control counter 1003 are varied by the F code. The various operational patterns determined by the first selection control counter 248 and the fourth selection control counter 1003 are presented in Table VII.

TABLE VII

| First selection control counter 248 signal | Fourth selection control counter 1003 signal | Operational pattern determined |
|---|---|---|
| First | First | |
| Second | | 1585K  1585O |
| Third | | 1585P |
| Fourth | | |
| First | Second | |
| Second | | 1585L  1585O |
| Third | | 1585P |
| Fourth | | |
| First | Third | |
| Second | | 1585M  1585O |
| Third | | 1585P |
| Fourth | | |
| First | Fourth | |
| Second | | 1585N  1585O |
| Third | | 1585P |
| Fourth | | |

It is assumed that the value of each of the coordinate data Xs, Ys, Xe and Ye is greater than one. When such data is read out from the tape 41 (FIG. 18) by the tape readout device 34 (FIG. 29), the Xs data is first supplied to the inputs of the flip flops 284, 285, 286, 287, 288, 289 and 291 of the input register of FIGS. 33a and 33b. In the input register (FIGS. 33a and 33b), an input terminal 1848 is connected to a monostable multivibrator 1849 via a lead 1851 and a NOT circuit 1852. The monostable multivibrator 1849 provides, at an output terminal 1853 via a lead 1854 and at an output terminal 1855 via a lead 1856, tape feed signals AW and AX, respectively. The tape feed signals AW and AX provided at the output terminals 1853 and 1855 of FIGS. 33a and 33b are supplied to the input terminals 1014 and 1015 of the operation control circuit of FIGS. 49a, 49b and 49c. The tape feed signals supplied to the input terminal 1014 are supplied to and set the flip flop 1016.

The sprocket hole signals AC, which represent the sprocket holes in the tape, are supplied to the input terminal 339 of the input register of FIGS. 33a and 33b and to the input terminal 1022 of the operation control circuit of FIGS. 49a, 49b and 49c. The sprocket hole signals AC are supplied to the flip flop 1043 via the leads 1019 and 1025 and the AND gate 1023 or the leads 1019 and 1026 and the AND gate 1024, the OR gate 1044 and the lead 1045, and set said flip flop and reinitiate operation of the first selection control counter 248 (FIG. 49a). At the same time, the sprocket hole signals AC are supplied to the second blocking oscillator 337 (FIG. 33a) via the lead 341, the AND gate 342 and the OR gate 343, and operate said second blocking oscillator and store the highest order digit of the numerical value of Xs in the input register 161 (FIG. 42a).

When the first selection control counter 248 (FIG. 49a) provides its second signal at its output terminal 1004B, the flip-flop 546 of the decoder of FIGS. 35a and 35b is set by the D code (FIG. 13) which has been identified by said decoder and by said second signal and the AH signal is provided at the output terminal 548 (FIG. 35b). The AH signal is provided at the terminal 548 continuously until the first selection control counter 248 provides its fourth signal (FIG. 49a). Thus, the operational patterns 1585K and 1585O (FIGS. 54a, 54b and 54c) are selected and provide signals at the output terminals 939 and 899 of the first gate control circuit (FIGS. 55a, 55b and 55c) and thereby switch the gates 866 and 919 of the register unit 865A of the arithmetic circuit of FIGS. 42a, 42b and 42c to their conductive condition. The operational pattern 1585O (FIGS. 54a, 54b and 54c) provides signals at the output terminals 1608, 1611 and 1612 of the second gate control circuit (FIG. 56) and thereby switches the gates 728, 731 and 732 of the arithmetic circuit of FIG. 42 to their conductive condition to complete the calculation of ten times the value of data stored in the register unit 865A.

When the first selection control counter 248 (FIG. 49a) provides its third signal at its output terminal 1004C, the operational pattern 1585P is selected by the gate control signal generator of FIGS. 54a, 54b and 54c instead of the operational pattern 1585O, so that a signal is provided at the output terminal 1615 of the second gate control circuit (FIG. 56), as well as at the output terminals 1607 and 1611 of FIG. 56, and the highest order digit of the numerical value of Xs is transferred from the input register 161 (FIG. 42a), the data stored in the register unit 865A is added to the data stored in the input register 161 and the resultant sum is stored in the register unit 865A.

When the first selection control counter 248 (FIG. 49a) provides its first signal, the flip-flop 1043 is reset and the cycle of operation of said first selection control counter is terminated. In the meantime, the next highest order digit of the numerical value of Xs is read out by the tape readout device 34 (FIG. 29) and is stored in the input register 161 (FIG. 42a) in the aforedescribed manner, and the operation of the first selection control counter 248 (FIG. 49a) is reinitiated to repeat the calculations. The different order digits of the numerical value of Xs are stored in the register unit 865A (FIG. 42a) in decreasing order in the four cycles of operation of the first selection control counter 248 (FIG. 49a).

After the numerical value of Xs has been read out by the tape readout device 34 (FIG. 29), the F code is read out by said tape readout device and is stored in the input register 161 of FIG. 42a, is then identified by the decoder 166 (FIG. 29) and is transferred to the fourth selection control counter 1003 (FIG. 49b) to switch said fourth selection control counter to its second cycle of operation to prepare for the readout of the Ys data. The numerical value of Ys is stored in the register unit 865B (FIG. 42a) in the same manner that the numerical value of Xs is stored in the register unit 865A. The fourth selection control counter 1003 is advanced one cycle each time the F code is read out from the tape 41 (FIG. 18).

In the illustration of FIG. 18, the numerical values of the Xs and Ys data are shown as zero, since such values are omitted and only the F code is punched in the tape 41. In such case, only the fourth selection control counter 1003 (FIG. 49b) is operated and stores the Xe data in the register unit 865C (FIG. 42a) when such data is read out from the tape 41 (FIG. 18) by the tape readout device 34 (FIG. 29). The fourth selection control counter 1003 is cleared when a clear signal is supplied thereto via the input terminal 1141 and the lead 1142, via which the F code signal is fed to said counter (FIG. 49b). Thus, if the numerical value of Ye is zero, the F code signal which follows Ye may be omitted.

Data other than numerical data such as, for example, the signals of the H code, J code, G code, L code, K code, and so on, are read into the input register 161 (FIG. 42a) in the same manner as the numerical data. After the H code, J code, G code and L code data is stored in the input register 161, each code is detected by the decoder 166 (FIG. 29) and is stored in the corresponding H code register 168 (FIG. 29), J code register 177 (FIG. 29), G code register 172 (FIG. 29) and L code register 175 (FIG. 29). When the K code data is read into the input register 161 (FIG. 29) it indicates that all other necessary data has been read into the corresponding registers. This resets the flip-flop 256 of the control unit of FIG. 32 to terminate the readout of data from the tape by the tape readout device 34 (FIG. 29) and to initiate the calculations required for pulse distribution.

As hereinbefore mentioned, the pulse distribution for arcs or straight lines in the second, third or fourth quadrant is replaced by the pulse distribution for arcs or straight lines in the first quadrant. This is not accomplished merely by changing the X, Y coordinate system to the A, B coordinate system (FIGS. 3, 6 and 7). Thus, for example, when pulse distribution is to be determined for a straight line OE2 (FIG. 3) in the second quadrant, the numerical values of the coordinates of the end point E2 are Ae2, Be2 as stored in the tape, and the numerical values of the coordinates of the end point E1 of the straight line OE1 in the first quadrant (FIG. 3) are Ae1, Be1, which equal Xe1 and Ye1, respectively. The exchange of coordinate values between the second and first quadrants is accomplished with facility by following the relationships:

$$|Ae2|=Be1=Ye1$$

and $$|Be2|=Ae1=Xe1$$

The exchange of coordinate values for an arc S2E2 between the second and first quadrants (FIG. 6) is achieved in the same manner as for a straight line. The coordinates of the arc in the first quadrant are S1E1. The start point S1 has coordinates As1, Bs1, which are equal to Xs1, Ys1. The end point E1 has coordinates Ae1, Be1, which are equal to Xe1, Ye1. The start point S2 has co-ordinates As2, Bs2 and the end point E2 has coordinates Ae2, Be2. The exchange of coordinate values between the second and first quadrants is accomplished with facility by following the relationships:

$$|As2|=Bs1=Ys1$$
$$|Bs2|=As1=Xs1$$
$$|Ae2|=Be1=Ye1$$
$$|Be2|=Ae1=Xe1$$

When a straight line or an arc extends counterclockwise in the second, third or fourth quadrant and the coordinates of the line or arc in the second, third or fourth quadrant are known, the coordinates of the counterclockwise extending arc in the first quadrant are determined by the foregoing relationships. When a straight line or arc extends counterclockwise in the third quadrant and clockwise in the second and fourth quadrants, the foregoing relationships indicate the straight line or counterclockwise extending arc in the first quadrant.

In accordance with the foregoing, when K code signals are stored in the input register 161 (FIG. 29), they are detected by the decoder 166 (FIG. 29) regardless of whether or not they indicate a straight line or counterclockwise extending arc in the second or fourth quadrant or a line or clockwise extending arc in the first or third quadrant. As the result of the detection of the K code signal, an AI signal is supplied from the output terminal 554 or an AJ signal is supplied from the output terminal 555 (FIG. 35b) to the input terminal 1601 or the input terminal 1602 of the first gate control circuit of FIGS. 55a, 55b and 55c.

In the decoder (FIGS. 35a and 35b) the AI or AJ signal is selected by the AND gates 492, 493, 499 and 502 the OR gates 523 and 525 and the NOT circuits 538, 539 and 541. When the AI signal or the AJ signal is supplied to the input terminal 1601 or the input terminal 1602 of the first gate control circuit of FIGS. 55a, 55b and 55c, a signal is provided at the output terminals 939 and 942 and 899 and 902. When the operational pattern 1585K is selected, for example, if the AJ signal is "1," Xs data is stored in the register unit 865B instead of the register unit 865A (FIGS. 42a, 42b and 42c).

When the operational pattern 1585L is selected, for example, if the AJ signal is "1," Ys data is stored in the register unit 865A instead of the register unit 865B (FIGS. 42a, 42b and 42c), so that the Xs and Ys data is exchanged.

When the square R² of the cutter offset magnitude R is stored in the register unit 865J (FIG. 42b) after readout from the dial switchboard 33 (FIG. 29), data is read out from the tape and stored in the corresponding register units and the K code is read into the input register 161 (FIG. 42a), the calculations required for the distribution of pulses are undertaken. The pulses are distributed in accordance with the results of such calculations. The calculations are also accomplished by the selection of operational patterns in accordance with the cycles of operational of the first selection control counter 248 and the second selection control counter 1001 (FIGS. 49a, 49b and 49c). The operational patterns are then selected in accordance with Table VIII, wherein α indicates a calculation to determine the cutter offset magnitude R, β indicates a calculation to determine the pulse distribution for a straight line and γ indicates a calculation to determine the pulse distribution for an arc. Hereinafter, α, which indicates a calculation to determine the cutter offset magnitude R, is also a signal, the α signal, which indicates that such calculation is to be made; β, which indicates a calculation to determine the pulse distribution for a straight line, is also a signal, the β signal, which indicates that such calculation is to be made; and γ, which indicates a calculation to determine the pulse distribution for an arc, is also a signal, the γ signal, which indicates that such calculation is to be made. The α signal is provided at the output terminal 1588A of FIG. 54b and is supplied to the input terminal 1123 of FIG. 49b. The β signal is provided at the output terminal 1588B of FIG. 54b and is supplied to the input terminal 1121 of FIG. 49b. The γ signal is provided at the output terminal 1588C of FIG. 54b and is supplied to the input terminal 1105 of FIG. 49b. There is no pulse distribution during the calculations made during the second cycle of operation of the second selection control counter 1002 (FIG. 49b). Pulse distribution occurs during the calculations made during the third cycle of operation of the second selection control counter 1002 (FIG. 49b).

When a K code signal is read out by the tape readout device 34 (FIG. 29), the flip flop 1043 (FIG. 49a) is set by a tape feed signal and operation of the first selection control counter 248 is initiated. In the meantime, if the K code is detected by the decoder 166 (FIG. 29), a K code signal is fed to the AND gate 1216 (FIG. 49c) via the input terminal 1214 and the leads 1215 and 1217. The AND gate 1216 (FIG. 49c) is switched to its conductive condition and transfers the AT signal to the second selection control counter 1001 via the leads 1232 and 1235 (FIGS. 49a, 49b and 49c) and to the flip flop 1043 via the leads 1232 and 1233, the NOT circuit 1234, the AND gate 1047 and the lead 1051 and prevents resetting of said flip flop.

When the first selection control counter 248 (FIG. 49a) is in its second cycle of operation, the second selection control counter 1001 is in its second cycle of operation so that the AND gate 1216 (FIG. 49c) is switched to its non-conductive condition and the AT signal is zero. When the first selection control counter 248 (FIG. 49a) is in its four cycle of operation, the cutter offset direction +R is stored in the dial switchboard 33 (FIG. 29) and the G code signal read out from the tape is GR, so that a negative output signal is provided by the G code register 172 (FIG. 29). In the meantime, since the K code signal is KCI and the L code signal is LC (FIG. 13) as read out from the tape, the 1585Q operational pattern (FIGS. 54a, 54b and 54c) is selected and provides signals at the output terminals 957 and 911 of FIGS. 55a, 55b and 55c and at the output terminals 1607 and 1609 of FIG. 56 to switch the AND gates 928, 877, 727 and 729 of FIGS. 42a, 42b and 42c to provide the necessary calculation and transfer data from the register unit 865J to the register unit 865F. At the same time, an AY signal of zero is supplied to the input terminal 984 of FIG. 42b and clears the register units 865G and 865H via the leads 985 and 986, the AND gates 881 and 883 and the OR gates 983 and 984. The AY signal is provided at the output terminal 984 of FIG. 55c.

When the first selection control counter 248 (FIG. 49a) is in its first cycle of operation, its operation is stopped in such cycle of operation. At such time, both the AU signal supplied to the input terminal 1046 and the AC signal supplied to the input terminal 1022 of the opera-

TABLE VIII

| First selection control counter 248 signal | Second | Third | Fourth | First | Second | Third | Fourth | First | Second | Third | Fourth | First |
|---|---|---|---|---|---|---|---|---|---|---|---|---|
| Second selection control counter 1001 signal | First | | | | Second | | | | Third | | | |
| K code signal | L code signal | Operational pattern determined | | | | | | Calculation | Operational pattern determined | | | Calculation |
| +KC | LA | | | | | | 1585Q | | | | | β |
|  | LB | | | | | | 1585Q | α | 1585C | 1585D | | α |
|  | LC | | | | | | 1585Q | α | 1585C | 1585D | | β |
|  | LD | | | | | | | | | | | β |
| −KC | LA | | | | | | | | | | | β |
|  | LB | | | | | | 1585Q | | | | | α |
|  | LC | | | | | | 1585Q | α | 1585G | 1585H | | β |
|  | LD | | | | | | | | | | | β |
| +KA | LA | | | | 1585A | 1585B | 1585Q | α | 1585C | 1585D | | γ |
| −KA | LB | | | | 1585A | 1585B | 1585Q | α | 1585I | 1585J | | γ |
|  | LC | | | | | | | | | | | |
|  | LD | | | | | | | | | | | γ |
| +KB | LA | | | | 1585E | 1585F | 1585Q | α | 1585G | 1585H | | γ |
| −KB | LB | | | | 1585A | 1585B | 1585Q | α | 1585I | 1585J | | γ |
|  | LC | | | | | | | | | | | |
|  | LD | | | | | | | | | | | γ |

The calculation α to determine the cutter offset magnitude R is undertaken during the second cycle of operation of the second selection control counter 1001 (FIG. 49b). Only the values of the coordinates of the point 2S of FIG. 8, for example, are calculated and no pulses are distributed. The point 2S is determined by subtracting the cutter offset magnitude R from the start point of the straight line in FIG. 8.

tion control circuit of FIGS. 49a, 49b and 49c are "1" and the first signal provided by the first selection control counter 248 (FIG. 49a) is supplied to the flip flop 1074 (FIG. 49a) via the input terminal 1062, the lead 1063, the AND gate 1052, the leads 1057 and 1061, the AND gate 1059, the OR gate 1075 and the lead 1076 and sets said flip flop, thereby initiating the operation of the third selection control counter 1002. The AU signal supplied to the input terminal 1046 of FIG. 49a causes the counters to skip a cycle of operation when no calculation is required and is supplied from the output terminal 1587 of FIG. 54b. The sprocket hole signals AC are supplied to the input terminal 1022 of FIG. 49a.

The α signal, indicating a calculation to determine the cutter offset magnitude R, is provided at the output terminal 1588A of FIG. 54b and is supplied to the input terminal 1123 of FIG. 49b. The β signal, indicating a calculation to determine the pulse distribution for a straight line, is provided at the output terminal 1588B of FIG. 54b and is supplied to the input terminal 1121 of FIG. 49b. The γ signal, indicating a calculation to determine the pulse distribution for an arc, is provided at the output terminal 1588C of FIG. 54b and is supplied to the input terminal 1105 of FIG. 49b. The signal provided by the flip flop register 1013 of FIG. 49c at the output terminal 1298 is supplied to the input terminal 1584 of FIG. 54c.

The signal provided by the flip flop register 1013 of FIG. 49c at the output terminal 1298 and the α signal are provided, when the operation of the third selection control counter 1002 is initiated (FIG. 49a); and the operational pattern 1589A is therefore selected. Thus, signals are provided at the output terminals 946 and 1603 of FIGS. 55a, 55b and 55c and at the output terminals 1607 and 1609 of FIG. 56, so that the gates 923, 934, 908, 727 and 729 of FIGS. 42a, 42b and 42c are switched to their conductive condition. The difference between the data stored in the register unit 865E and the data stored in the register unit 865D is thereby computed and the result is stored in the register unit 865E (FIGS. 42a, 42b and 42c) when the third selection control counter 1002 switches to its second cycle of operation.

The result of the calculation is provided as a signal representing the sum at the output terminals 989 and 991 of FIG. 42c and this sum signal and the sign or polarity bit are supplied to the AND gate 1144 via the input terminal 1143 and the lead 1145 of FIG. 49b, to the AND gate 1149 via the input terminal 1146 and the leads 1148 and 1151, and to the AND gate 1149 via the input terminal 1152 and the leads 1153 and 1155 (FIG. 49b). This determines whether the sum is less than, equal to or greater than zero. The results is then stored in the flip flop register 1012 of FIG. 49b. The indicated sum is zero, because the register unit 865D and the register unit 865E are cleared. Since the sign bit is included in the sum signal, the flip flop register 1012 (FIG. 49b) remains in its prior condition.

When the third selection control counter 1002 (FIG. 49a) is switched to its third cycle of operation, the operational pattern 1589B is selected and the data of the register unit 865F plus the data of the register unit 865G (FIG. 42b) plus 1 is calculated and transferred to the register unit 865F in the aforedescribed manner. The sum is also supplied to and stored in the flip flop register 1008 (FIG. 49b) via the input terminal 1146, the lead 1148, the AND gate 1147, the leads 1242, 1243 and 1246, the AND gate 1114, the OR gate 1171 and the lead 1172, to set said flip flop register, when the sign bit is supplied to the AND gate 1147 via the input terminal 1152 and the lead 1153 so that the sum is transferred through and AND gate 1147 from the input terminal 1146 and the lead 1148, and the sign bit is included in said sum. If there is no sign bit included in the sum, the flip flop register 1008 is not set. The negative of the square R² of the cutter offset magnitude R is stored in the register unit 865F (FIG. 42b), so that the sum is negative and the flip flop register 1008 (FIG. 49b) is not set.

When the third selection control counter 1002 (FIG. 49a) is switched to its fourth cycle of operation, the data of the register unit 865G (FIG. 42b) plus 1 is calculated and transferred to said register unit in the aforedescribed manner. Since the register unit 865G has already been cleared, the numerical value 1 is stored in said register unit in this calculation.

The third selection control counter 1002 (FIG. 49a) is switched in its cycles of operation until the resultant sum of the addition of the data of the register unit 865F (FIG. 42b) with two times the data of the register unit 865G plus 1, which is transferred to the register unit 865F, is equal to or greater than zero. When such resultant sum is equal to or greater than zero, the sign bit in the resultant sum is supplied to the AND gate 1147 (FIG. 49b), as described, and is transferred to the flip flop register 1008 (FIG. 49b) via said AND gate and the AND gate 1114, as described, to set said flip flop register and to provide the AR signal at the output terminal 1169. The AR signal provided at the output terminal 1169 is fed to the flip flop 1074 (FIG. 49a) via the leads 1173, 1174, 1175 and 1177, the OR gate 1077 and the lead 1081 and resets said flip flop. When the flip flop 1074 (FIG. 49a) is reset, the operation of the third selection control counter 1002 is stopped in its first cycle of operation.

The foregoing calculation provides the X axis component of the cutter offset magnitude R, and such component is stored in the register unit 865G of FIG. 42b. When the third selection control counter 1002 (FIG. 49a) is in its first cycle of operation, the flip flop 1043 is reset and the operation of the first selection control counter 248 is initiated. The second selection control counter 1001 (FIG. 49b) is in its second cycle of operation and the AR signal provided at the output terminal 1169 is "1." When the first selection control counter 248 is in its second cycle of operation, a signal is transferred from said first selection control counter to the second selection control counter 1001 (FIG. 49b) and switches said second selection control counter to its third cycle of operation and the said second selection control counter prvides its third signal at its output terminal 1005C. At that time, the operational pattern 1585G (FIGS. 54a, 54b and 54c) is selected and calculates the subtraction of the data of the register unit 865G (FIG. 42b) from the data of the register unit 865C (FIG. 42a). The resultant difference is transferred to the register unit 865C in the aforedescribed manner by the switching of the appropriate gates of the arithmetic circuit of FIGS. 42a, 42b and 42c by the first and second gate control circuits (FIGS. 55a, 55b, 55c and 56). Thus, the magnitude, in FIG. 9 for example, of the X component 6X is obtained by subtracting the X axis component Rx of the cutter offset magnitude from the X component 5Xe.

When the first selection control counter 248 (FIG. 49a) is switched to its third cycle of operation, the operational pattern 1585H (FIGS. 54a, 54b and 54c) is selected and the data of the register unit 865H (FIG. 42b) is subtracted from the data of the register unit 865D (FIG. 42a). The difference is transferred to the register unit 865D. Since the value of Ye stored in the register unit 865D is zero and since the register unit 865H has been cleared, there is zero data in the register unit 865D. As a result of the calculations made by the operational pattern 1585G and 1585H, the coordinates of the point Pl' of FIG. 59 are calculated. The coordinates of the point Pl' are provided by subtracting the cutter offset magnitude from the point Pl of FIG. 59. The X and Y coordinates of the point Pl are 3000 and 0, respectively.

When the first selection control counter 248 (FIG. 49a) is switched to its first cycle of operation, the flip flop 1043 is reset by the first signal provided by said first selection control counter at its output terminal 1004A and the operation of the said first selection control counter is stopped. In the meantime, the first signal of the first selection control counter 248 is transferred to the AND gate 1064 (FIG. 49a) via the input terminal 1065 and the lead 1066. Since the second selection control counter 1001 (FIG. 49b) is in its third cycle of operation and provides its third signal at its output terminal 1005C, said third signal is supplied to the AND gate 1064 via the input terminal 1069 and the lead 1071, and said AND gate is switched to its conductive condition. The β signal is provided at the output terminal 1588B of the gate control signal generator of FIGS. 54a, 54b and 54c, at such time, and institutes the β calculation to determine the pulse distribution for a straight line (Table VIII).

When the cutting pattern is an arc, the calculation of the cutter offset magnitude is achieved by a change in magnitude of the X and Y axes. Thus, if the K code signal indicating an arc is in the input register 161 (FIG. 42a), this signal is distinguished from the K code signal indicating a straight line by the non-perforation of the I4 position of the tape 41 of FIG. 18 (FIG. 13) so that there is a zero signal in such position. The zero I4 position signal of the decoder of FIGS. 35a and 35b provides an AJ signal at the output terminal 555 (FIG. 35b) via the AND gates 499 and 501 and the OR gate 525 when the second selection control counter 1001 (FIG. 49b) provides its second signal to the AND gate 499 via an input terminal 1857 and a lead 1858 and the first selection control counter 248 (FIG. 49a) provides its second signal to the AND gate 499 via an input terminal 553 and a lead 1861. The fourth signal of the second selection control counter 1001 is supplied to the AND gate 492 (FIG. 35b) via an input terminal 1862 and a lead 1863 and is supplied to the AND gate 491 via said input terminal, said lead and a lead 1864. The AJ signal is supplied to the first gate control circuit of FIGS. 55a, 55b and 55c.

When the cutting pattern is an arc, as shown in FIG. 9, if the end 5E of the arc 5S5E is on the Y axis in said FIG. 9, the end 6E of the modified arc 6S6E is also on the Y axis. As hereinbefore described, the cutter offset magnitude calculation is the same and the pulse distribution is the same as for a straight line. If N is zero (Equation 1) due to the determination of whether or not the point of pulse distribution at that time is in the positive area of the indicated cutting pattern, where N is greater than or equal to zero, or if said point of pulse distribution is in the negative area of the indicated cutting pattern, where N is less than zero, an X pulse is then provided.

Thus, in the cutter offset magnitude calculation, one X pulse is provided in the first cycle and then, as a result of the determination of N as being less than equal to, or greater than zero at the different points of pulse distribution, a Y pulse is provided. The Y pulses are provided until the result of the addition of the data of the register unit 865F (FIG. 42b) with two times the data of the register unit 865H and with 1 is greater than or equal to zero. The first distributed X pulse is effective throughout, and the coordinates of the point determined by the cutter offset magnitude calculation are (FIG. 9) $6Xe=1$, $6Ye=5Ye+R$. This creates an error of 1 from the previous arc point $6Xe=0$, $6Ye=5Ye+R$. If this error is not corrected, it is compounded in successive pulse distributions for a number of workpieces and/or cutters. The error is due to the X pulse distribution when $N=0$, so that if the Y pulse distribution is undertaken when $N=0$, the cutter offset calculation of the point on the X axis produces the error.

The change of axes is to prevent the aforementioned error. Thus, the point 4E of FIG. 8, for example, may have components $4Xe=1Ye$ and $4Ye=0$ by change of the component of the point 1E, which are $1Xe=0$, $1Ye$ The point 1E which is on the Y axis is thus changed to the point 4E which is on the X axis. The X pulses are distributed when $N=0$, so that the cutter offset magnitude calculation regarding the point on the X axis is achieved without error. If the end point of a cutting pattern in the first quadrant requires a calcultaion of the cutter offset magnitude and is on the Y axis, such cutting pattern is an arc. Thus, as hereinbefore mentioned, if the axes are changed in accordance with an arc configuration, when the cutter offset magnitude is calculated at the end point, such calculation is achieved without error. The change of axes for an arc is with regard only to the cutter offset magnitude calculation, so that it does not influence the other calculations.

Upon the completion of the cutter offset magnitude calculation and upon the values of the coordinates of the end points, already offset, being stored in the register unit 865C (FIG. 42a), the pulse distribution for a straight line is initiated. The pulse distribution and necessary calculations are accomplished in the third cycle of operation of the second selection control counter 1001 (FIG. 49b). When the second selection control counter 1001 (FIG. 49b) is switched to its third cycle of operation and the operation of the first selection control counter 248 (FIG. 49a) is stopped in its first cycle of operation, the AND gate 1064 is switched to its conductive condition (FIG. 49a). At the same time, operation of the fourth oscillator 659 of the feed pulse generator of FIG. 39 is initiated. The fourth oscillator 659 provides the fourth frequency pulses at frequencies increasing gradually from 150 pulses per second to 1000 pulses per second (FIG. 39). Since the H code signal H4 is stored in the H code register of FIG. 38, the fourth frequency pulses are transferred through the gate 637 after said gate is switched to its conductive condition by said H code signal and said fourth frequency pulses. The transfer of the fourth frequency signal through the AND gate 637 provides a feed pulse AK at the output terminal 645 (FIG. 38) and said feed pulse AK is transferred to the flip flop 1074 (FIG. 49a) via the input terminal 1072, the lead 1073, the AND gate 1064, the OR gate 1075 and the lead 1076 and sets said flip flop. When the flip flop 1074 is set, it initiates the operation of the third selection control counter 1002.

When the third selection control counter 1002 is in its second cycle of operation, the β signal is provided at the output terminal 1588B of the gate control signal generator of FIGS. 54a, 54b and 54c and a signal is provided at the output terminal 1298 of FIG. 49c when said β signal is supplied to the input terminal 1121 of FIG. 49b. The data of the register unit 865D (FIG. 42a) is then subtracted from the data of the register unit 865E and the difference result is transferred to the register unit 865E. The resultant sum signal is gated by the sign bit, which is determined by N being greater than, equal to, or less than zero, and is transferred to the flip flop register 1012 via the input terminals 1143, 1146 and 1152 of FIG. 49b. The resultant sum is determined to be greater than, equal to, or less than zero, or positive, zero or negative and the polarity or sign of said sum is stored in the flip flop register 1012 (FIG. 49b). Since the data of the register unit 865D is zero and the data of the register unit 865 is zero, as indicated by the cutter offset magnitude calculation, the resultant sum is zero. The sum is therefore transferred to the flip flop register 1012 to maintain it in reset condition.

When the third selection control counter 1002 (FIG. 49a) is in its third cycle of operation, the operational pattern 1589G is selected and the data of the register unit 865C (FIG. 42a) is subtracted from the data of the register unit 865A. The resultant sum is gated by the sign bit and is transferred to the flip flop register 1009 of FIG. 49b via the input terminals 1146, 1152 and 1156 of FIG. 49b. At such time the data of the register unit 865A is zero and the X component of the point 6S of FIG. 9, for example, is stored in the register unit 865C. Thus, the resultant sum is less than zero or negative and the flip flop register 1009 is maintained in its reset condition.

When the third selection control counter 1002 (FIG. 49a) is in its fourth cycle of operation, the operational pattern 1589H is selected and 1 is added to the data of the register unit 865A (FIG. 42a). The resultant positive sum is transferred to said register unit. At the same time that the flip flop register 1013 (FIG. 49c) provides a signal at the output terminal 1298 a single X pulse is provided at the output terminal 1285 via the AND gate 1254 and the lead 1287.

When the second selection control counter 1001 (FIG. 49b) is in its first cycle of operation, the flip flop 1074 (FIG. 49a) is reset. When the next or second signal or pulse is supplied to the input terminal 1072 (FIG. 49a), the flip flop 1074 is set and the same calculations are repeated. A second X pulse is then provided at the output terminal 1285 (FIG. 49c). After such repeated calculations are completed, if the resultant sum of the subtraction of the data of the register unit 865C (FIG. 42a) from the data of the register unit 865A is zero during the third cycle of operation of the third selection control counter 1002 (FIG. 49a), the sum is supplied to the input terminal 1146 (FIG. 49b) and then to the flip flop register 1009 which is thereby set and provides a signal in the lead 1261. Then, even if the third selection control counter 1002 (FIG. 49a) is switched to its fourth cycle of operation, an X pulse will not be provided because a zero signal is provided in the lead 1262 of the flip flop register 1009 (FIG. 49b). When the third selection control counter 1002 (FIG. 49a) is switched to its first cycle of operation, however, a signal is provided in the lead 1261 of the flip flop register 1009 (FIG. 49b) and is transferred via said lead to the AND gate 1259 (FIG. 49c). The first signal of the third selection control counter 1002 (FIG. 49a) is then transferred to the flip flop register 1013 (FIG. 49c) which provides a signal at the output terminal 1294. The first signal of the third selection control counter 1002 is provided at the output terminal 1006A (FIG. 49a) and is supplied to the input terminal 1194 (FIG. 49b) from which it is transferred to the flip flop register 1013 (FIG. 49c) via the lead 1195, the OR gate 1193, the leads 1279 and 1281, the AND gate 1259, the OR gate 1289 and the lead 1291.

When the third selection control counter 1002 (FIG. 49a) is in its second cycle of operation, the operational pattern 1589D and the data of the register unit 865E (FIG. 42b) and the polarity or sign of the resultant sum is determined. When the third selection control counter 1002 (FIG. 49a) is in its third cycle of operation, the operational pattern 1589I is selected and the data of the register unit 865D (FIG. 42a) is subtracted from the data of the register unit 865B. At such time, the data of each of the register units 865B and 865D is zero so that the resultant sum of the calculation of the difference of the data of the register unit 865D from the data of the register unit 865 is zero. The flip flop register 1011 (FIG. 49b) is therefore set and provides a signal in the lead 1269. There is thus no Y pulse provided at the output terminal 1286 (FIG. 49c), even when the third selection control counter 1002 (FIG. 49a) is switched to its fourth cycle of operation.

When the third selection control counter 1002 (FIG. 49a) is switched to its first cycle of operation, a signal is provided by the flip flop register 1009 (FIG. 49b) in the lead 1262 and a signal is provided by the flip flop register 1011 in the lead 1271. Thus, the first signal of the third selection control counter 1002 is supplied to the AND gate 1197 via the input terminal 1198 and the leads 1199 and 1202 (FIG. 49c), the signal in the lead 1262 is supplied to said AND gate via the leads 1262 and 1267 and the signal in the lead 1271 is supplied to said AND gate via the leads 1271 and 1272. The flip flop 1306 is thus set, via the AND gate 1197, the OR gate 1304 and the leads 1305 and 1307 (FIG. 49c), and provides a signal at the output terminal 1314 via the lead 1315 which indicates the completion of pulse distribution. The flip flop registers 1009 and 1011 (FIG. 49b) are then reset, the gate 1023 (FIG. 49a) is switched to its conductive condition, the fourth selection control counter 1003 is switched to its first cycle of operation and the gates 634, 635, 636 and 637 of the H code register of FIG. 38 are switched to their non-conductive condition so that no feed pulses AK are provided at the output terminal 645 of FIG. 38. At the same time, the signal for initiating the operation of the tape readout device 34 (FIG. 29) is transferred via the AND gate 1197 (FIG. 49c), the OR gate 1304 and the lead 1305 to the output terminal 1303 and initiates the read-in of tape information for the operational pattern.

The foregoing description relates to control by the LC signal of the L code provided in the tape. For control by the other signals of the L code in the tape such as, for example, the LB, LA or LD signals (FIG. 13), the cutter offset magnitude calculation, the pulse distribution calculation and the pulse distribution are achieved in the same manner as when the control is by the LC signal of the L code. When the L code is not indicated in the tape, the pulse distribution will be accomplished, as hereinbefore described, by the LA signal of the L code. The method of pulse distribution is by various combinations, as hereinbefore described.

The $\alpha$, $\beta$, $\gamma$ and $\delta$ operations may thus be summarized as follows, the $\delta$ operation being a calculation to determine the square $R^2$ of the cutter offset magnitude R and the $\alpha$, $\beta$ and $\gamma$ operations being those described with reference to Table VIII.

The $\alpha$ operation, for cutter offset magnitude R, in the second cycle of operation of the third selection control counter 1002 (FIG. 49a), when N is $YXe-XYe$ is greater than or equal to zero, when the selected operational pattern is 1589A (FIG. 54c) and the N function is $YXe-XYe$, is first to subtract the data of the register unit 865D (FIG. 42a) from the data of the register unit 865E (FIG. 42b) and to store the result in the register unit 865E, and then to determine if the N function is greater than, less than, or equal to, zero and store such determination in the flip flop register 1012 (FIG. 49b).

The $\alpha$ operation, for cutter offset magnitude R, in the third cycle of operation of the third selection control counter 1002 (FIG. 49a), when N is $YXe-XYe$ is greater than or equal to zero, when the selected operational pattern is 1589B (FIG. 49c) and the function is $X^2+Y^2-R^2$, is first to add the data of the register unit 865F (FIG. 42b) to two times the data of the register unit 865G and to 1 and to store the result in the register unit 865F, and then to determine if the function is greater than, less than, or equal to, zero and store such determination in the flip flop register 1008 (FIG. 49b).

The $\alpha$ operation, for cutter offset magnitude R, in the fourth cycle of operation of the third selection control counter 1002 (FIG. 49a), when N is $YXe-XYe$ is greater than or equal to zero, when the selected operational pattern is 1589C (FIG. 54c) and the function is $X+1$, is first to add 1 to the data of the register unit 865A (FIG. 42a) and to store the result in the register unit 865A, and then to provide a feed pulse X when a KC signal of the K code and the LB signal of the L code are indicated (FIG. 13).

The $\alpha$ operation, for cutter offset magnitude R, in the second cycle of operation of the third selection control counter 1002 (FIG. 49a), when N is less than zero, when the selected operational pattern is 1589D (FIG. 54c) and the N function is $YXe-XYe$, is first to add the data of the register unit 865C (FIG. 42b) to the data of the register unit 865E (FIG. 42c) and to store the result in the register unit 865E, and then to determine if the N function is greater than, less than, or equal to, zero and store such determination in the flip flop register 1012 (FIG. 49b).

The $\alpha$ operation, for cutter offset magnitude R, in the third cycle of operation of the third selection control counter 1002 (FIG. 49a), when N is less than zero, when the selected operational pattern is 1589E (FIG. 54c) and the function is $X^2+Y^2-R^2$, is first to add the data of the register unit 865F (FIG. 42b) to two times the data of the register unit 865H and to 1 and to store the result in the register unit 865F, and then to determine if the function is greater than, or equal to, zero and store such determination in the flip flop register 1008 (FIG. 49c).

The α operation, for cutter offset magnitude R, in the fourth cycle of operation of the third selection control counter 1002 (FIG. 49a), when N is less than zero, when the selected operational pattern is 1589F (FIG. 54c) and the function is $Y+1$, is first to add 1 to the data of the register unit 865B (FIG. 42a) and to store the result in the register unit 865B, and then to provide a feed pulse Y when a KC signal of the K code and the LB signal of the L code are indicated (FIG. 13).

The β operation, for pulse distribution for a straight line, in the second cycle of operation of the third selection control counter 1002 (FIG. 49a), when N is $YXe-XYe$ is greater than or equal to zero, when the selected operational pattern is 1589A (FIG. 54c) and the N function is $YXe-XYe$, is first to subtract the data of the register unit 865D (FIG. 42b) from the data of the register unit 865E (FIG. 42b) and to store the result in the register unit 865E, and then to determine if the N function is greater than, less than, or equal to, zero and store such determination in the flip flop register 1012 (FIG. 49b).

The β operation, for pulse distribution for a straight line, in the third cycle of operation of the third selection control counter 1002 (FIG. 49a), when N is $YXe-XYe$ is greater than or equal to zero, when the selected operational pattern is 1589G and the function is $X-Xe$, is first to subtract the data of the register unit 865C (FIG. 42a) from the data of the register unit 865A (FIG. 42a) and then to determine if the function is greater than, less than, or equal to, zero and store such determination in the flip flop register 1009 (FIG. 49b).

The β operation, for pulse distribution for a straight line, in the fourth cycle of operation of the third selection control counter 1002 (FIG. 49a), when N is $YXe-XYe$ is greater than or equal to zero, when the selected operational pattern is 1589H and the function is $X+1$, is first to add 1 to the data of the register unit 865A (FIG. 42a) and to store the result in the register unit 865A, and then to provide a feed pulse X when the signal provided by the flip flop register 1009 (FIG. 49b) is not equal to 1.

The β operation for pulse distribution for a straight line, in the second cycle of operation of the third selection control counter 1002 (FIG. 49a), when the selected operational pattern is 1589D (FIG. 54c) and the N function is $YXe-XYe$, is first to add the data of the register unit 865C (FIG. 42a) to the data of the register unit 865E (FIG. 42b) and to store the result in the register unit 865E, and then to determine if the N function is greater than, less than, or equal to, zero and store such determination in the flip flop register 1012 (FIG. 49b).

The β operation, for pulse distribution for a straight line, in the third cycle of operation of the third selection control counter 1002 (FIG. 49a), when the selected operational pattern is 1589I (FIG. 54c) and the function is $Y-Ye$, is first to subtract the data of the register unit 865D (FIG. 42a) from the data of the register unit 865B and then to determine if the function is greater than, less than, or equal to, zero and store such determination in the flip flop register 1011 (FIG. 49b).

The β operation, for pulse distribution for a straight line, in the fourth cycle of operation of the third selection control counter 1002 (FIG. 49a), when the selected operational pattern is 1589J (FIG. 54c) and the function is $Y+1$, is first to add 1 to the data of the register unit 865B (FIG. 42a) and to store the result in the register unit 865B, and then to provide a feed pulse Y when the signal provided by the flip flop register 1011 (FIG. 49b) is not equal to 1.

The γ operation, for pulse distribution for an arc, in the second cycle of operation of the third selection control counter 1002 (FIG. 49a), when N is $X^2+Y^2-Xs^2-Ys^2$ is greater than or equal to zero, when the selected operational pattern is 1589K (FIG. 54c) and the N function is $X^2+Y^2-Xs^2-Ys^2$ is first to subtract two times the data of the register unit 865A (FIG. 42a) from the data of the register unit 865E (FIG. 42b) and to add 1 and to store the result in the register unit 865E, and then to determine if the N function is greater than, less than, or equal to, zero and store such determination in the flip flop register 1012 (FIG. 49b).

The γ operation, for pulse distribution for an arc, in the third cycle of operation of the third selection control counter 1002 (FIG. 49a), when N is $X^2+Y^2-Xs^2-Ys^2$ is greater than or equal to zero, when the selected operational pattern is 1589L (FIG. 54c) and the function is $Xe-X$, is first to subtract the data of the register unit 865A (FIG. 42a) from the data of the register unit 865C (FIG. 42a), and then to determine if the function is greater than, less than, or equal to, zero and store such determination in the flip flop register 1009 (FIG. 49b).

The γ operation, for pulse distribution for an arc, in the fourth cycle of operation of the third selection control counter 1002 (FIG. 49a), when N is $X^2+Y^2-Xs^2-Ys^2$ is greater than or equal to zero, when the selected operational pattern is 1589M (FIG. 54c) and the function is $X-1$, is first to subtract 1 from the data of the register unit 865A (FIG. 42a) and to store the result in the register unit 865A, and then to provide a feed pulse X when the signal provided by the flip flop register 1009 (FIG. 49b) is not equal to 1.

The γ operation, for pulse distribution for an arc, in the second cycle of operation of the third selection control counter 1002 (FIG. 49a), when N is less than zero, when the selected operational pattern is 1589N (FIG. 54c) and the N function is $X^2+Y^2-Xs^2-Ys^2$, is first to add two times the data of the register unit 865B (FIG. 42a) to the data of the register unit 865E (FIG. 42b) and to add 1 and to store the result in the register unit 865, and then to determine if the N function is greater than, less than, or equal to, zero and store such determination in the flip flop register 1012 (FIG. 49b).

The γ operation, for pulse distribution for an arc, in the third cycle of operation of the third selection control counter 1002 (FIG. 49a), when N is less than zero, when the selected operational pattern is 1589I (FIG. 54c) and the function is $Y-Ye$, is first to subtract the data of the register unit 865D (FIG. 42a) from the data of the register unit 865B (FIG. 42a), and then to determine if the function is greater than, less than, or equal to, zero and store such determination in the flip flop register 1011 (FIG. 49b).

The γ operation, for pulse distribution for an arc, in the fourth cycle of operation of the third selection control counter 1002 (FIG. 49a), when N is less than zero, when the selected operational pattern is 1589J (FIG. 54c) and the function is $Y+1$, is first to add 1 to the data of the register unit 865B (FIG. 42a) and to store the result in the register unit 865B, and then to provide a feed pulse Y when the signal provided by the flip flop register 1011 (FIG. 49b) is not equal to 1.

The δ operation, for the square of the cutter offset magnitude, in the second cycle of operation of the third selection control counter 1002 (FIG. 49a), when the selected operational pattern is 1589O (FIG. 54c) and the N function is $R^2+2R+1$, is to add two times the data of the register unit 865B (FIG. 42a) to the data of the register unit 865J (FIG. 42b) and to add 1 and to store the result in the register unit 865J.

The δ operation, for the square of the cutter offset magnitude, in the third cycle of operation of the third selection control counter 1002 (FIG. 49a), when the selected operational pattern is 1589I (FIG. 54c) and the function is $R+1$, is to add 1 to the data of the register unit 865B (FIG. 42a) and to store the result in the register unit 865B.

The δ operation, for the square of the cutter offset magnitude, in the fourth cycle of operation of the third selection control counter 1002 (FIG. 49a), when the selected operational pattern is 1589J (FIG. 54c) and the function is $R-1$, is first to subtract the data of the register unit 865D (FIG. 42a) from the data of the register unit 865B (FIG. 42a), and then to determine if the function is greater than, less than, or equal to, zero and store such determination in the flip flop register 1008 (FIG. 49b).

As hereinbefore described, the K code (FIG. 13) indicates by its KA signals that the operational pattern is a counterclockwise extending arc, its KB signals indicate that the operational pattern is a clockwise extending arc and its KC signals indicate that the operational pattern is a straight line. The Roman numbers indicate the quadrant in which the arc or line is positioned. The LB signal of the L code (FIG. 13) controls the cutter offset operation, −R indicates the cutter offset direction. The X and Y pulses previously provided, are redistributed in the A, B coordinate system (FIGS. 3, 6 and 7). The first gate circuit of FIG. 57 redistributes the X, Y pulses in the A, B coordinate system under the control of the foregoing signals.

In the K code, only the KC signals have a code bit in the I4 position, only the KB signals have a code bit in the I3 position and only the KA signals have no code bit in either the I3 or the I4 position. Since the cutter offset magnitude R, the KCI signal and the LC signal have been provided and utilized in the aforedescribed manner, the distributed X pulses are redistributed in the +A axis direction. The principal function of the first gate circuit of FIG. 57, as hereinbefore described, is the transposition of the coordinate axes in accordance with the type of pattern to be cut and in accordance with the quadrant in which such pattern is positioned. Each arc is replaced by an arc extending in a counterclockwise direction and each line is repositioned in the first quadrant. These transposition operations are described in detail in the aforementioned copending application Ser. No. 114,267. The pulse redistribution is slightly varied when the direction of the cutter offset is −R and when the LB signal of the L code is indicated.

The second gate circuit of FIG. 58 functions to redistribute ±A pulses and ±B pulses (FIGS. 3, 6 and 7), which are distributed in the A, B coordinate system in accordance with the J code (FIG. 13), in a three-dimensional X, Y, Z coordinate system as ±X, ±Y and ±Z pulses, as hereinbefore described. Since the XY signal of the J code controls, the +A pulses are redistributed as +X pulses.

The distributed ±X, ±Y and ±Z pulses are supplied to the pulse motor driving unit 36 of FIG. 12. The pulse motor driving unit is shown in FIG. 26 wherein the positive X pulses are supplied to the input terminal 121A, the negative X pulses are supplied to the input terminal 121B, the positive Y pulses are supplied to the input terminal 123A, the negative Y pulses are supplied to the input terminal 123B, the positive Z pulses are supplied to the input terminal 125A and the negative Z pulses are supplied to the input terminal 125B. The pulses ±X, ±Y and ±Z thus drive the electrohydraulic pulse motors 24, 19 and 16 (FIGS. 4 and 5) via pulse motor driving unit 36 (FIG. 12).

Since +X pulses are transferred at the fourth frequency provided by the feed pulse generator of FIG. 39 at the output terminal 644D, said feed pulse generator being the feed pulse generator 164 of FIG. 29, the pulse motor 24 (FIGS. 4, 5, 12 and 26) is rotated in the +X axis direction. The work platform 23 (FIGS. 4 and 5) is moved a distance, in the +X axis direction, determined by the number of +X pulses and the rotation of the pulse motor 24. The work platform 23 and its associated components (FIGS. 4 and 5) may be adjusted to be moved 0.01 mm. for each distributed +X pulse. Thus, the work platform 23 is displaced 30 mm. upon the distribution of 3000 +X pulses.

In FIG. 59, the initial point or cutting origin P0 is the starting point of the cutting operation. The point P1 is a distance of 30 mm. from the point P0 and is joined thereto by a straight line P0P1. The number of pulses distributed is determined by subtraction of the cutter offset magnitude from the distance P0 to P1. The work platform 23 (FIGS. 4 and 5), which supports the workpiece, is thus moved or displaced 30−R mm. in the negative X axis direction. The speed of displacement of the work platform 23 is 1.5 mm./sec. initially and is then increased to 10 mm./sec. as determined by the H4 signal of the H code (FIG. 13) and the feed pulse which is at the fourth frequency (FIG. 39) of the feed pulse generator 164 (FIG. 29) which is 1000 pulses per second.

The symmetrical milling cutter 27 (FIGS. 4 and 5) rotates about its axis which is parallel to the Y axis and which passes through the center of the point P0 of FIG. 59. The reversing switch 97 of the dial switchboard of FIGS. 24a and 24b indicates the position of the cutter relative to the workpiece with reference to the start point. If the reversing switch 97 is in its position shown in FIG. 24a, a "1" signal, which is ground potential, is provided at the output terminal 98a and a "0" signal, which is −5 volts, is provided at the output terminal 98b. When the reversing switch 97 is reversed in position, the "0" signal is provided at the output terminal 98a and the "1" signal is provided at the output terminal 98b. The signals provided at the output terminals 98a and 98b (FIG. 24a) are supplied to the pulse motor driving unit 36 (FIG. 12).

In any suitable circuit arrangement, not shown in the figures, the sequence of pulses supplied to the pulse motor 24 (FIG. 26) in the X axis direction is changed and the direction of rotation of said pulse motor is reversed. The pulses distributed as a result of the information or data stored in the tape 41 (FIG. 18) are utilized and the direction of rotation of the pulse motor 24 (FIG. 26), determined by the pulses in the direction of the X axis, may be reversed by the signals provided at the output terminals 98a and 98b of the dial switchboard of FIGS. 24a and 24b. The axis of the cutter may be positioned at the center of the initial point P0 of FIG. 59 in accordance with the provided data or information.

An AZ signal is supplied to the input terminal 1848 of the input register of FIG. 33a. A BA signal is provided at the output terminal 578 of the decoder of FIG. 35b. A BB signal is supplied to the input terminal 597 of the numerical data register of FIG. 36 and to the input terminal 1574 of the gate control signal generator of FIGS. 54a, 54b and 54c.

While the invention has been described by means of specific examples and in a specific embodiment, we do not wish to be limited thereto, for obvious modifications will occur to those skilled in the art without departing from the spirit and scope of the invention.

We claim:

1. A digital control system for machine tools and the like including a workpiece, a movable work platform supporting said workpiece, a cutter in operative proximity with the workpiece rotating about an axis of rotation and motor means coupled to said work platform for moving said work platform relative to said cutter under control by said digital control system for cutting said workpiece in a predetermined pattern, said digital control system comprising:

first input means for supply numerical data of a determined cutting pattern from a first source;

second input means for supplying cutter offset magnitude data and cutter offset direction data of said cutter from a second source; and pulse distributor and control means having a first input connected to said first input means, a second input connected to said second input means and outputs connected to and supplying distributed pulses to said motor means for providing and distributing pulses in accordance with supplied data for actuating said motor means to move said work platform along a determined cutting pattern in a determined coordinate system, said pulse distributor and control means comprising an input register having inputs connected to said first and second inputs, a first output and a second output, a plurality of registers having outputs and inputs connected to the first output of said input register for storing the data supplied to said pulse distributor and control means, decoder means having an input connected to the second output of said input register and an output connected to the inputs of said plurality of registers for decoding selected data stored in said input register, operation control means having outputs and inputs connected to the outputs of said plurality of registers, computer means having an input connected to the first output of said input register and an input connected to an output of said operation control means, and output connected to an input of said operation control means and another output, said computer means comprising a plurality of register units each having input and output means for storing and restoring data supplied to said computer means and arithmetic means connected between the input and output means of said register units for making predetermined calculations with data supplied thereto, said predetermined calculations including a revised cutting pattern based upon said determined cutting pattern but corrected for the magnitude and direction of offset of said cutter relative to the axis of rotation of said cutter, said operation control means restoring the results of selected calculations of said computer means in selected ones of said plurality of registers, and gate means connected between said operation control means, selected ones of said plurality of registers and the outputs of said pulse distributor and control means for controlling the transfer of distribution pulses from said operation control means to said outputs.

2. A digital control system as claimed in claim 1, further comprising control means having an input connected to the output of said decoder means, an input connected to an output of said operation control means and an output connected to said first source for controlling the starting and stopping of said pulse distributor and control means and the starting and stopping of said first source.

3. A digital control system as claimed in claim 2, wherein the plurality of registers of said pulse distributor and control means store data indicating the magnitude and direction of the cutter offset, the coordinates in the determined coordinate system of said cutter offset, the coordinates in the determined coordinate system of determined points of said cutting pattern and the square of the cutter offset magnitude, said registers including a plurality of registers for converting selected data supplied to said pulse distributor and control means to a plurality of code control signals for controlling the operation of said pulse distributor and control means, and wherein said operation control means comprises a plurality of selection control counter means for controlling the operation of said gate means.

References Cited
UNITED STATES PATENTS

| | | |
|---|---|---|
| 2,820,187 | 1/1958 | Parsons et al. |
| 2,833,941 | 5/1958 | Rosenberg et al. |
| 3,073,998 | 1/1963 | Bower. |
| 3,105,142 | 9/1963 | Tripp. |
| 3,148,317 | 9/1964 | Tripp. |

ORIS L. RADER, *Primary Examiner.*

T. E. LYNCH, *Assistant Examiner.*

U.S. Cl. X.R.

318—18

UNITED STATES PATENT OFFICE
CERTIFICATE OF CORRECTION

Patent No. 3,430,121 February 25, 1969

Norito Yoshitake et al.

It is certified that error appears in the above identified patent and that said Letters Patent are hereby corrected as shown below:

In the heading to the printed specification, line 12, "36/8,869" should read -- 36/8,669 --.

Signed and sealed this 14th day of April 1970.

(SEAL)
Attest:

Edward M. Fletcher, Jr.                WILLIAM E. SCHUYLER, JR.

Attesting Officer                         Commissioner of Patents